(12) United States Patent
Powers et al.

(10) Patent No.: US 10,395,435 B2
(45) Date of Patent: Aug. 27, 2019

(54) SYSTEM FOR MULTIMEDIA SPATIAL ANNOTATION, VISUALIZATION, AND RECOMMENDATION

(71) Applicant: Occipital, Inc., Boulder, CO (US)

(72) Inventors: Jeffrey Roger Powers, San Francisco, CA (US); Vikas Reddy, Boulder, CO (US); Alex Schiff, San Francisco, CA (US)

(73) Assignee: Occipital, Inc., Boulder, CO (US)

( * ) Notice: Subject to any disclaimer, the term of this patent is extended or adjusted under 35 U.S.C. 154(b) by 0 days.

(21) Appl. No.: 15/988,687

(22) Filed: May 24, 2018

(65) Prior Publication Data

US 2018/0374276 A1    Dec. 27, 2018

Related U.S. Application Data

(63) Continuation-in-part of application No. 15/479,242, filed on Apr. 4, 2017, now Pat. No. 10,163,271.

(60) Provisional application No. 62/317,973, filed on Apr. 4, 2016, provisional application No. 62/317,980, filed on Apr. 4, 2016, provisional application No. 62/317,988, filed on Apr. 4, 2016, provisional application No. 62/317,998, filed on Apr. 4, 2016, (Continued)

(51) Int. Cl.
| | | |
|---|---|---|
| *G06T 17/20* | (2006.01) | |
| *G06T 19/20* | (2011.01) | |
| *G06T 7/62* | (2017.01) | |
| *G06T 15/10* | (2011.01) | |
| *G06T 15/50* | (2011.01) | |
| *G06Q 30/06* | (2012.01) | |
| *G06T 15/00* | (2011.01) | |

(52) U.S. Cl.
CPC ......... *G06T 19/20* (2013.01); *G06Q 30/0631* (2013.01); *G06Q 30/0643* (2013.01); *G06T 7/62* (2017.01); *G06T 15/005* (2013.01); *G06T 15/10* (2013.01); *G06T 15/50* (2013.01); *G06T 17/205* (2013.01); *G06T 2210/04* (2013.01); *G06T 2215/16* (2013.01); *G06T 2219/004* (2013.01); *G06T 2219/2004* (2013.01); *G06T 2219/2021* (2013.01)

(58) Field of Classification Search
None
See application file for complete search history.

(56) References Cited

U.S. PATENT DOCUMENTS 6,999,907 B2 * 2/2006 Smith ................. G06F 17/5004
                                                            703/1
9,213,785 B2 * 12/2015 Plewe ................. G06F 17/5004
(Continued)

OTHER PUBLICATIONS

Office Action for U.S. Appl. No. 15/479,242, dated Mar. 26, 2018, Pwers et al., "A System for Multimedia Spatial Annotation, Visualization, and Recommendation", 14 pages.

*Primary Examiner* — Said Broome
(74) *Attorney, Agent, or Firm* — Lee & Hayes, P.C.

(57) ABSTRACT

A system configured to provide a three-dimensional representation of a physical environment. The three-dimensional representation including annotation data associated with particular objects and/or viewpoints of the three-dimensional representation. In some cases, the viewpoints may be rendered using image data associated with a photograph captured from a corresponding viewpoint within the physical environment.

20 Claims, 34 Drawing Sheets

Related U.S. Application Data provisional application No. 62/318,007, filed on Apr. 4, 2016, provisional application No. 62/317,976, filed on Apr. 4, 2016.

(56) References Cited

U.S. PATENT DOCUMENTS

| | | | |
|---|---|---|---|
| 2001/0047251 A1* | 11/2001 | Kemp | G06F 17/5004 703/1 |
| 2015/0146964 A1 | 5/2015 | Tai et al. | |
| 2015/0332505 A1 | 11/2015 | Wang et al. | |

* cited by examiner

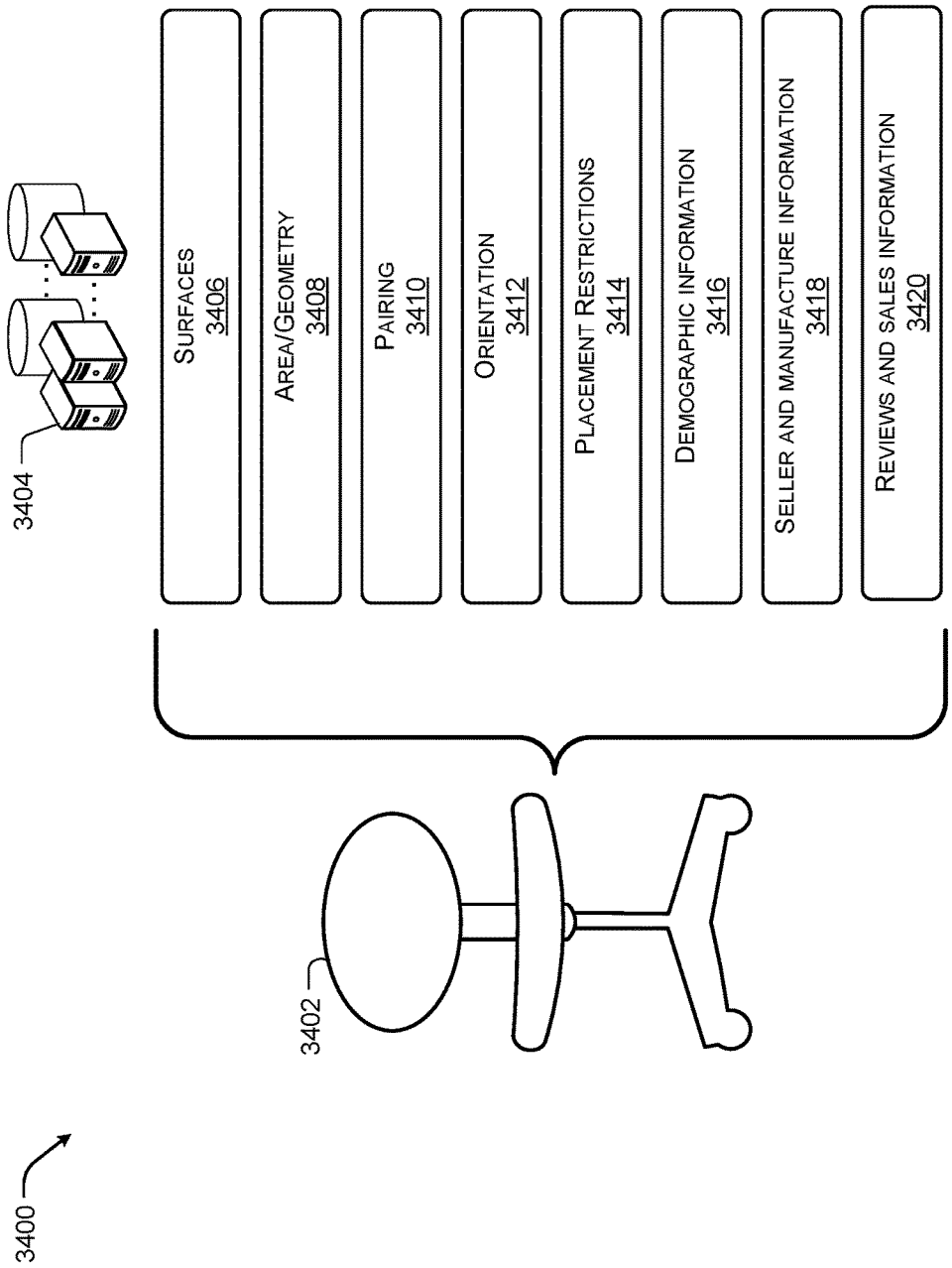

SYSTEM FOR MULTIMEDIA SPATIAL ANNOTATION, VISUALIZATION, AND RECOMMENDATION

CROSS-REFERENCE TO RELATED APPLICATION(S)

This application claim is a Continuation-in-part of U.S. application Ser. No. 15/479,242 entitled "A SYSTEM FOR MULTIMEDIA SPATIAL ANNOTATION, VISUALIZATION, AND RECOMMENDATION" filed on Apr. 4, 2017 which claims priority to U.S. Provisional Application Nos. 62/317,973 filed on Apr. 4, 2016 and entitled "MOTIVATION," 62/317,976 filed on Apr. 4, 2016 and entitled "CONVERTING A 3D RECONSTRUCTION INTO A "CLEANED" SHELL," 62/317,980 filed on Apr. 4, 2016 and entitled "HUMAN INFORMED DATA DURING A 3D SCAN TO AID LATER CONSUMPTION," 62/317,988 filed on Apr. 4, 2016 and entitled "USING THE GEOMETRY AND UNDERSTANDING OF THE SCENE TO PROVIDE REALISTIC VISUALIZATION OF VIRTUAL OBJECTS AND CHANGES," 62/317,998 filed on Apr. 4, 2016 and entitled "USING THE GEOMETRY AND UNDERSTANDING OF THE SCENE TO PROVIDE REALISTIC VISUALIZATION OF VIRTUAL OBJECTS AND CHANGES," and 62/318,007 filed on Apr. 4, 2016 and entitled "SPATIAL RETARGETING AND ARTIFICIAL INTELLIGENCE POWERED DESIGN," which are incorporated herein by reference in their entirety.

BACKGROUND

The presence of three-dimensional (3D) imaging systems and three dimensional representations of physical environments are becoming more and more commonplace. However, oftentimes, rendering or placing of virtual objects within a 3D representation of the physical environments causes the object to stand out or appear out of place due to a lack of realism.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 34 illustrates an example object model of a spatial interaction system according to some implementations.

DETAILED DESCRIPTION

Figure 1:
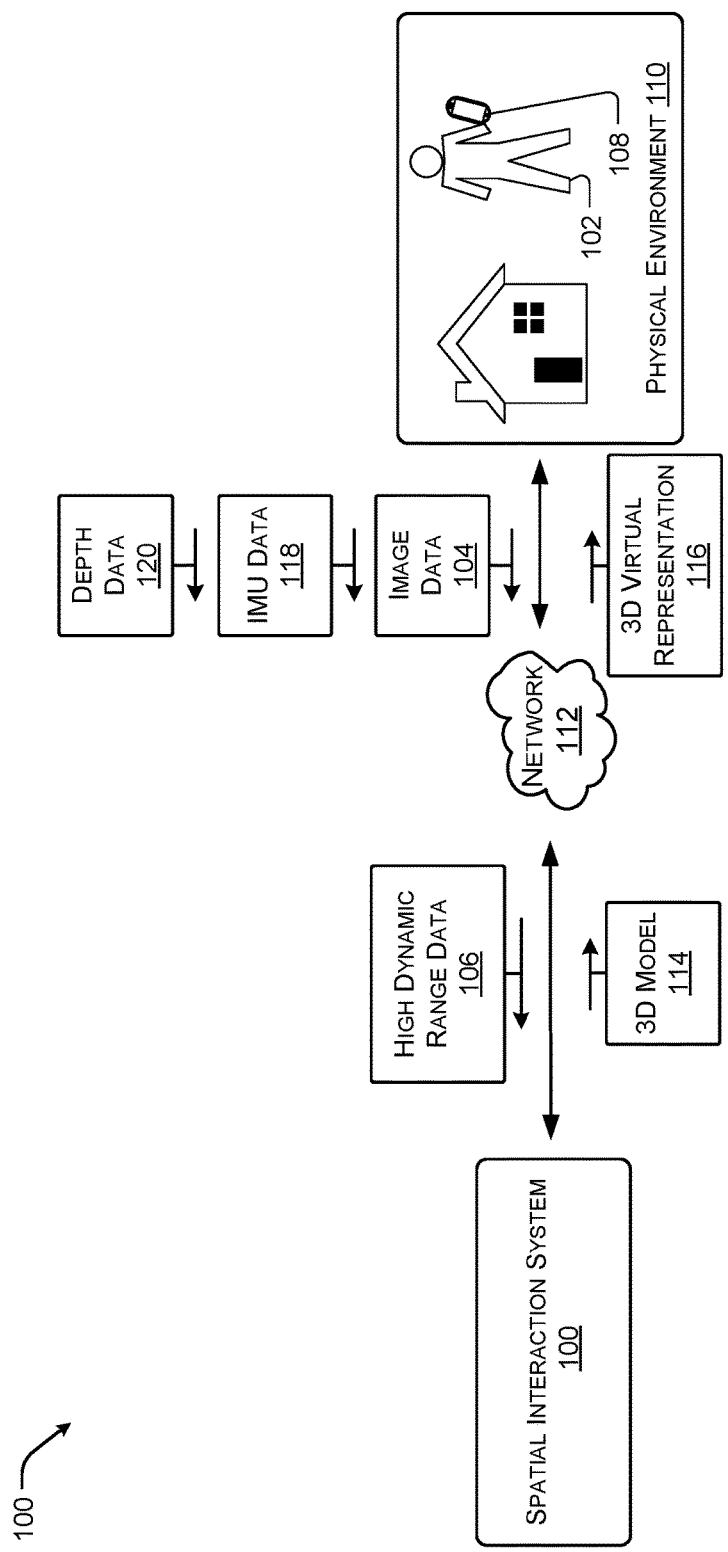
FIG. 1 illustrates an example spatial interaction system for generating 3D models associated with a physical environment according to some implementations.

This disclosure includes techniques and implementations for utilizing a three-dimensional (3D) model and image data of a physical environment to improve the visual quality and realism of a rendered object. For example, a user may capture image data associated with a home or another physical environment using a mobile device. In some cases, the mobile device may be equipped with image components capable of capturing high dynamic range data associated with the physical environment. The captured image data may be utilized by a spatial interaction system, such as a remote image system, an application associated with the mobile device, or a combination thereof, to generate the 3D model, 3D textured model, or mesh of the physical environment. In some cases, the high dynamic range data may be used to generate high dynamic range textures, lighting characteristics, occlusion characteristics, and/or color characteristics of the physical environment at a particular time and date.

In some cases, the physical environment includes multiple rooms or sub-environments. In these cases, the system may attempt to generate a doll house view or continuous 3D model (e.g., a home model) formed from sub-models representing each of the sub-environments. For instance, the system may be configured to receive image or video data captured by a user walking or otherwise traversing each of the sub-environments. In some cases, the system may be configured to identify the 3D sub-model associated with each connecting sub-environment using the 3D sub-model and the received image or video data. For example, the system may identify a first sub-environment and a second sub-environment by comparing the received image or video data to the 3D models. The system may also determine that the first and second sub-environments are adjacent based on a temporal proximity of the image or video data associated with the first and second sub-environment. In another example, the system may utilize position or pose information determined by the mobile device as the user traverses the physical environment and captures image data. For instance, the mobile device may be equipped with internal measurement units (IMU), global positioning system units (GPS), accelerometers, gyroscopes, magnetometers, or a combination thereof that may be used to collect position and/or orientation data that is usable to identify a position or pose of the mobile device as the image is captured. In some cases, the system may also analyze the image to identify which of the sub-models are associated with the position or pose of the mobile device. In another example, the system may be configured to determine the pose of the mobile device as the user traverses the physical environment and captures image data by performing simultaneous localization and mapping (SLAM) processes with respect to the captured image data and position data collected by the IMUs, GPS units, accelerometers, gyroscopes, magnetometers, or a combination thereof.

The system may orient and align the 3D models based on the received image or video data using the position information of the mobile device to construct the continuous 3D model or doll house view of the larger physical environment. In another example, the system may display each of the 3D sub-models of the sub-environments to a user and allow the user to arrange or connect the 3D sub-models to generate the continuous 3D model of the larger environment.

In some instances, once a 3D sub-model or continuous 3D model is generated of an environment, a user may capture one or more additional images of the environment from various perspectives and at various times and dates. The user may upload or otherwise provide the images to the system, discussed herein, and the system may insert or combine the image data from the various perspectives and at various times and dates using the corresponding 3D model to generate a 3D virtual representation. For example, the images may be used to generate a walkthrough or stepthrough of the 3D model in which a viewpoint may be created that is representative of the perspective of each of the images. In this manner, the objects within the 3D model may be representative of the actual look and feel (e.g., color, lighting, texture, etc.) associated with the objects of the image. In some examples, the system may also extend or utilize the image data of the captured images to generate or extend the actual look and feel to other perspectives, such that an object within a first viewpoint may include color, lighting, texture, etc. based at least in part on an image associated with a second viewpoint.

In some implementations, a walkthrough or stepthrough of the 3D model or environment, may be utilized to view a rendered object within the 3D model from multiple perspectives, such as to provide a user with an idea of how the object would look within the user's home. For example, a user may desire to purchase a vase as a decorative item within the user's living room. In this example, a 3D model of the living room may have been generated. The user may decide that the vase should be placed on a table located within the living room. Thus, the user may capture multiple images of the table within the living room each from a different perspective. The images may be received by the system and, in response, the system may generate a walkthrough of a 3D virtual representation of the living room using the 3D model of the living room and the images. The walkthrough may include a viewpoint of the table from the perspective associated with each of the images. For instance, if the user captured seven images of the table, the system may generate seven viewpoints of the table and allow the user to traverse the 3D virtual representation from viewpoint to viewpoint.

In the current example, the user may select a purple vase from a list of available vases. The system may render the purple vase from each of the viewpoints (e.g., the system may generate a view dependent rendering of the object within the 3D virtual representation of the living room). In this example, the purple vase may be rendered using the image data (e.g., color, lighting, texture, etc. associated with the images). The system may also render the purple vase using the high dynamic range data, high dynamic range textures, color characteristics, lighting characteristics, and occlusion characteristics associated with the 3D model of the living room. In some particular implementations, the high dynamic range data, high dynamic range textures, color characteristics, lighting characteristics, and occlusion characteristics utilized to render the object may be based on a particular date and time associated with the images or as selected by the user. Thus, the system described herein, may render the object from the perspective associated with each viewpoint of the walkthrough with the correct coloring, lighting, and occlusion effects that would be experienced if the purple vase was placed in the user's living room. Additionally, it should be understood, that by utilizing a walkthrough formed from images captured by the user of the user's living room, the system may also render other objects as well as background information that provides a realistic representation of the user's living room as the background information (e.g., the non-rendered objects or everything other than the purple vase in this example) may be supplied in a photorealistic manner.

In some cases, the user may decide to reject the purple vase as the aesthetics did not meet the approval of the user. In some implementations, the system may be configured to provide a suggested replacement or a second vase based on known user data and preferences. For example, the system may store user preference data obtained from third party systems, from prior interactions with the user (e.g., purchasing history, rejection of the first vase), from demographic information collected or obtained about the user, from analyzing image data captured by the user or associated with the user (e.g., the image data used to generate the model of the user's home or living room), among others. For instance, the system may determine the user prefers the color blue by identifying numerous blue objects within the user's home from the captured image data. Thus, the system may determine a blue vase may be more appealing to the user, than the purple vase previously selected by the user. In some instances, the system may also determine if the blue vase would be appealing based on the aesthetics of the user's living room based on image data associated with the 3D model or 3D virtual representation of the living room and/or the images used to create the walkthrough. For example, the system may apply known color selection techniques using the wall color or furniture color of the living room to select and recommend the blue vase. In these instances, the system may render the blue vase from each of the seven perspectives within the 3D virtual representation, such that the user may again walk through each of the seven viewpoints to visualize the blue vase within the user's living room.

In some cases, the user may approve of the blue vase. In these instances, the user may select the blue vase within the 3D model to cause the system to purchase the blue vase on behalf of the user. In some cases, the system may store purchasing information associated with the user and/or a merchant of the blue vase. In other examples, the system may allow the user to enter purchasing information and/or select the merchant from which to purchase the blue vase.

In other implementations, the system receives updated images of the user's physical environment to improve the 3D model of the user's environment. In some instances, the system may be configured to detect old versions of objects within the environment. For instance, the system may detect that the user has an old radio on a bookshelf in the user's living room from one or more of the images received. In some cases, the system may be configured to render a new version of the radio or a replacement to the radio within a 3D virtual representation being viewed by the user. In some cases, the system may alert the user to the presence of the rendered version of the radio replacement, as the radio may not be the focus of the user or reason the user is viewing the current 3D virtual representation of a physical environment. The system may also allow the user to purchase the radio replacement, as discussed above with the blue vase.

In some examples, the user may also desire to annotate (e.g., provide textual notes, video notes, audio notes, or otherwise alter a 3D virtual representation of an environment). In this example, the system may include a 3D model of a physical environment that was utilized to generate a 3D virtual representation (such as a walkthrough) of the physical environment. In some cases, the user may cause an annotation to be added to the 3D virtual representation and/or the 3D model by capturing additional images of the physical environment associated with the 3D virtual representation and the 3D model. In some cases, while capturing the additional images the user may add textual notes, visual notes, and/or audio notes at a particular location within the additional image. In some cases, the system may receive the additional image and the annotation data (e.g., the text, visual content, or audio content), and utilize the image data to locate or position the annotation within the 3D model and/or the 3D virtual representation, such that each time a user navigates to the location or position within the environment, the user experiences, views, or is otherwise alerted to the annotation. For example, the system may receive an audio annotation associated with a viewpoint or perspective of a user's living room captured from a position of a rocking chair. The system may identify the location as the location associated with the rocking chair by comparing the perspective of the image with the data of the 3D model of the user's living room. In other examples, the image capture device may be equipped with one or more sensors, such as IMUs, accelerometers, gyroscopes, magnetometers, or a combination thereof. In these examples, sensor data representative of a position of the image capture device at the time the additional image was captured may be provided to the system. Thus, the system may also utilize the sensor data to position the annotation within the 3D model and/or the 3D virtual representation. In some cases, the position data may be used in conjunction with the image data as part of a simultaneous localization and mapping process to position the image within the 3D model.

In some cases, a second user (such as a home designer or decorator) may desire to utilize the 3D model of the first user's living room to generate additional walkthroughs or a 3D virtual representation that the user may utilize to visualize the designer's vision (e.g., design scheme) for the user's home or living room. In these cases, the designer may visit the user's living room and capture images of the user's physical living room to create a walkthrough or other 3D virtual representation based on a stored 3D model of the user's living. For example, the designer may take one or more images of the physical living room based on a perspective to showcase furniture selected by the designer. The system may utilize the images and the 3D model to generate a walkthrough as discussed above. In some cases, the designer may make notes either for themselves or the user/home owner, which the system may located within a 3D virtual representation of the living room associated with the walkthrough for later viewing.

In some cases, the designer may later view the walkthrough or 3D virtual representation. The designer may then utilize the annotations to remember or revisit ideas the designer had onsite at the user's living room and the captured images. In some cases, the designer may also utilize the 3D model and the walkthrough or 3D virtual representation to cause selected objects, such as furniture, to be rendered based on the perspective of the images associated with the walkthrough, as discussed above. In some examples, the user may also be able to view and render objects within the walkthrough while the user is viewing the 3D virtual representation. Thus, the system may allow the user and the designer to collaborate on selecting furniture or other design aspects of the home based on photorealistic views of the living room and view-dependent renderings of the selected objects. In some cases, if an object or piece of furniture is agreed upon by the user and designer, the system may facilitate the purchase of the object or furniture for the living room. It should be understood, that in some cases, the user may view the 3D virtual representation or walkthrough with the designer from a location remote from the designer or via different computing devices.

In some specific examples, the user or the designer may desire to add additional perspectives or viewpoints to the walkthrough created by the designer. In this example, the user or designer may return to the physical environment and capture additional images of the physical environment. The system may receive the additional images and/or position data, and utilize the images and/or position data to relocalize the mobile device and/or the additional images within the walkthrough or 3D virtual representation. For example, the system may utilize position data, camera pose, IMU data, visual data within the image, and/or depth data associated with the image to relocalize the mobile device and the user within the 3D model or 3D virtual representation.

In some cases, the system may be configured to assist the user with selecting, updating, and purchasing of household or other goods. For example, the system may be configured to determine or obtain user information, such as demographic information (age, sex, income level, etc.), preference information (e.g., likes or dislikes, styles, tastes, etc.), purchasing history (e.g., frequency, quality level, brands, stores, etc.). The user information may be received as an input from the user, derived from the image data, or collected from past purchasing history and third party transactions/systems. The system may then utilize the user information together with the 3D model of the user's home including the objects within the home to make recommendations via, for instance, annotations, of additional products/objects the user may like or use within the home or updated products that may replace existing objects within the user's home. For example, over time the system may determine the user replaces their television every three years. Thus, the system may recommend that the user purchase a particular television based around the three-year mark of an existing television. The particular television may be selected based on user information (e.g., user size, brand, quality preferences), information known about the object (e.g., the television size, make, model, reviews, etc.), and/or other characteristics of the physical environment (such as lighting, viewing distance, viewing position, etc.).

In some implementations, the system may be configured to insert the object into the 3D virtual representation of the environment either as a walkthrough or as part of an immersive or free form 3D scene. For example, the system may determine that a lamp placed on a table in the user's living room may assist with proper lighting during the evening hours. In this example, the system may insert an object of a selected lamp onto the table with an annotation including an offer to purchase the lamp. The lamp may be selected based on the user information, such as tastes, price range, etc. and the offer may include information related to the product as well as pricing and purchase options. In various examples, the system may render the object (e.g., the lamp) using image data (e.g., color, lighting, texture, etc. associated with an image of the physical environment). For instance, the system may also render the lamp using the high dynamic range data, high dynamic range textures, color characteristics, lighting characteristics, and occlusion characteristics associated with the 3D model of the living room. In some particular implementations, the high dynamic range data, high dynamic range textures, color characteristics, lighting characteristics, and occlusion characteristics utilized to render the object may be based on a particular date and time associated with the images or as selected by the user. The system may also adjust the lighting effects of other objects, in this case, as the object being inserted (e.g., the lamp) will change the lighting within the physical environment.

In some specific implementations, the system may recommend a new product or updated product when a manufacture offers a new version of a product in the user's home. For example, the system may identify using the 3D model or image data a product, such as a speaker, that the user has in their home and uses on a regular basis. The system may receive from the manufacture or obtain from the manufacture data indicating that a new model of the speaker has been released. In this example, the system may notify the user via an annotation in the 3D scene or as part of a walkthrough to the availability of the new version of the speaker. In another example, the system may detect that the user's refrigerator is out of date and recommend a new one.

In another example, the system may use geolocation, compass data, directions, or exterior environmental characteristics (such as average temperature, rain fall metrics, evaluation, air quality measurements, or other climate related data) to recommend objects or items. For example, the system may recommend UV lamps if you are in a colder area such as Norway, or plant placements to optimize sun/shade for the particular specifies.

In the current example, since the object is a speaker system, the system may also simulate the listening or acoustic environment experienced by the user within the physical environment if the speaker was placed. For instance, since the system is able to model the acoustic characteristics of the physical environment (e.g., materials, object placement, user position, etc.) and the audio capabilities of the speaker are known, the system came substantially reproduce the actual listening experience.

In some cases, the system may also detect or identify objects/products within the 3D model that have outstanding safety issues or recalls. For example, if the system determines that the user's toaster has a fire warning recall issued by the manufacture, the system may display the recall as an annotation as well as provide a suggested replacement product. In some instances, the system may provide product review information or product concerns (such as overheating) as annotations associated with objects within the 3D scene of the user's home.

To provide some illustrative examples, the system discussed herein may be utilized in a variety of situations. For instance, the user may generate a 3D model of the physical environment. The user may then use the system to communicatively connect within the 3D model to a service provider. For example, both the user and the service provider may be remote from each other but appear to be proximate to each other within the 3D virtual environment or scene). In this manner, the user and the service provider may interact with each other (e.g., via audio and visual cues, such as speaking or pointing) as well as with the 3D scene (e.g., listening to environmental sounds, traversing the 3D scene, touching objects, replacing objects, editing characteristics of objects, etc.).

In one specific example, the service provider may be assisting with design and decor or decoration of the physical environment represented by the 3D model. For instance, the service provider may be an interior decorator, interior or exterior designer, landscaper, builder, decorating consultant, eco designer, home organizer, home stager, space planner, architect, among others. In the current example, by having both the user and the service provider or just the service provider in the 3D model, the service provider is able to understand current style and utilization of the user or the corresponding physical environment (e.g., understand the user's likes, dislikes, preferences, tasks, etc.). The service provider may also use the 3D model to insert changes for viewing by the user (e.g., add furniture, paint, wallpaper, flooring, finishes, accent pieces, lighting, etc.). The service provider may also use other 3D models to illustrate to the user other options for design, other looks and feels, gain ideas, or to understand what goes well together stylistically, or to train younger designers.

In another example, the service provider may be a repair/maintenance personnel (e.g., cabinet expert, plumber, electrician, lawn service expert, etc.), architect, engineer (e.g., a structural engineer or civil engineer), among others. For example, the service provider may utilize the 3D model to view an extent of damage or to prepare prior to coming on site (e.g., to acquire necessary parts or select tools). In this manner, the service provider may make fewer trips to the physical location and save on time and costs associated with the repair job. In other cases, the engineer or architect may utilize a 3D model of a bridge, skyscraper, or difficult/danger to access locals to reduce risk of injury to a person. For instance, a bridge may be scanned using a drone, autonomous aerial vehicle, autonomous aquatic vehicle, or other autonomous vehicles equipped with image components and/or the system discussed herein. The service provider may then utilize a 3D model of the bridge to evaluate structure integrity, damage from an impact or incident, corrosion, seismic activity risk or damage, etc. without having to access the dangerous physical location. The service provider may also utilize the 3D model to preview and plan renovations, educate or train younger service providers, demo possible issues resulting from natural disasters (such as an earthquake) to users of the system, etc.

In other situations, the service provider may be a real-estate agent, insurer, appraiser, potential buyer or other real-estate expert. For example, an appraiser may utilize the 3D model to provide an initial valuation of a home or other property, such that the user may evaluate a listing price. In another example, a potential buyer may use the 3D model to prescreen homes or to purchase a home if the user is not a local (such as a relocation to another city). The potential buyer may also use the 3D model of a property to discuss pros and cons of a purchase with relatives and friends that are unable to visit the property due to distance (such as a parent in another state). In some cases, the system may be configured to utilize the 3D model of multiple properties to compare and contrast the value or purchase prices for the potential buyer. In one specific example, the system may use the 3D model to recommend upgrades to an existing home, such as 9 out of 10 homes in your area have four car garages, you could increase the value by adding two additional garage spaces or a four car garage is not desirable in your area, more value may be gained on your home by converting two of the spaces into living quarters.

In still other cases, the system may allow service providers such as eco consultants to assist with making recommendation to improve energy efficiency, reduced resource consumption, or reduced environmental impact of a user's home. In some cases, the eco consultant may utilize the 3D model to show the user or homeowner not only the current environmental impact of the proposed changes but the aesthetic affect and longer term changes the to the property (such as how reducing run off water may affect the landscape) as well.

In some cases, the personal service provider may also be associated with assisting a user in purchasing, upgrading, and/or installing heating and cooling systems in a home or other property. For example, the 3D model may allow the heating and cooling specialist to visually indicate to a user also in the 3D model the effect of different heating and cooling system on the home. For instance, the system may overlay projected heatmaps onto the 3D model to show the user how different heating and cooling system may operating in their home. In other cases, the system may present other types of environmental overlays on the 3D model, such as energy usage maps, lighting maps, sound maps, etc.

In still other instances, the service provider may be insurance agents that may use the 3D model to determine a value of the contents of the home (e.g., the furniture, electronics, and personal belongings). In some cases, the system may use the 3D model to provide an estimate to the insurance agents or insurer while in other cases, the system may allow the insurance agents to view the contents and determine a valuation. In some cases, the system may allow multiple insurers to view the property corresponding to the 3D model, such that a user may receive multiple quotes. The system may also help insurers by allowing them to view and value damage to a property in the case of a claim.

In some instance, the service provider may be associated with a moving company that may enter the 3D model to help in assist in selecting a move truck size, number of boxes, cost quotes, etc. In still other instances, the system may be used by cleaners or security providers to assist the user in selecting security systems and/or obtain cleaning quotes, determine square footage, etc.

FIG. 1 illustrates an example spatial interaction system 100 for generating 3D models, 3D textured models, or a mesh associated with a physical environment according to some implementations. In the illustrated example, a user 102 may capture image data 104 and/or high dynamic range data 106 via a mobile device 108 of a physical environment 110. The mobile device 108 may provide the image data 104 and/or high dynamic range data 106 to a spatial interaction system 100 via one or more networks 112. The system 100 may be configured to generate a 3D model or mesh 114 of the physical environment 110 based at least in part on the image data 104 and/or high dynamic range data 106. In some cases, the mobile device 108 may also capture IMU data 118 and/or depth data 120 that may be used by the spatial interaction system 10 to generate the 3D model or mesh 114. In some cases, the system 100 may also be configured to generate high dynamic range textures, lighting characteristics, color characteristics, occlusion characteristics, among other characteristics associated with the 3D model.

In one particular example, the high dynamic range data 106 may be configured to generate the 3D model 114 as well as the high dynamic range textures, lighting characteristics, color characteristics, occlusion characteristics, etc. In this example, the image data 104 may include a series or time ordered set of images from varying perspectives within the physical environment 110. In this example, the spatial interaction system 100 may generate a 3D virtual representation or walkthrough 116 of the physical environment 110 based on the 3D model, the perspective of the image of the set of images relative to the 3D model, and/or position data/pose of the mobile device 108. For instance, the 3D virtual representation or walkthrough 116 may allow the user 102 to traverse the 3D model by navigating from image to image based on the temporal order or order in which the images were captured. In this manner, the 3D model may be represented to the user via the 3D virtual representation or walkthrough 116 in a photorealistic manner, as each of the perspectives viewed during the walkthrough 116 are generated based on the image data 104 are actual photographs.

Figure 2:
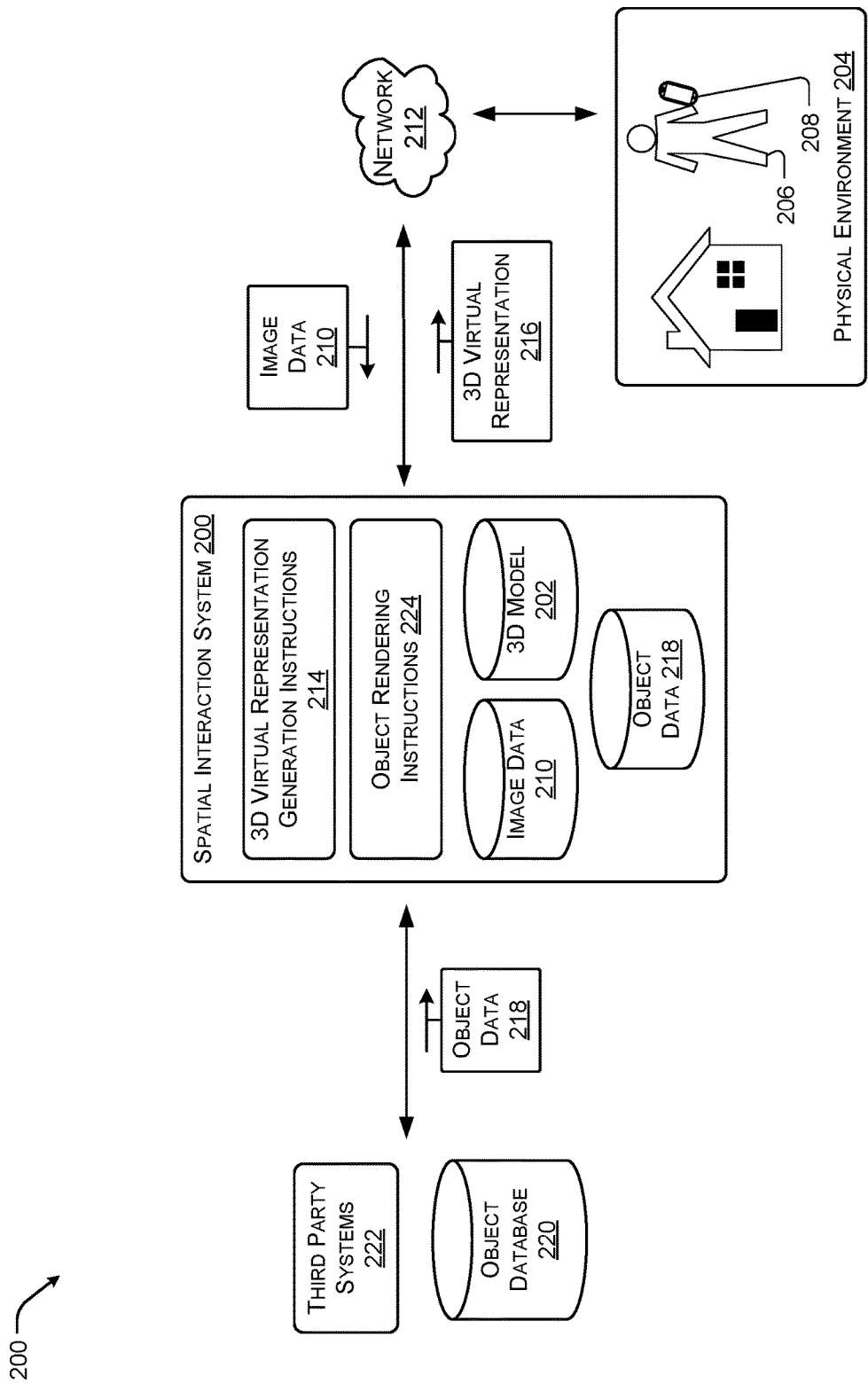
FIG. 2 illustrates an example spatial interaction system for providing perspective based virtual object rendering within a 3D model associated with a physical environment according to some implementations.

FIG. 2 illustrates an example spatial interaction system 200 for providing perspective based virtual object rendering within a 3D model or mesh 202 associated with a physical environment 204 according to some implementations. In some situations, a user 206 may capture a series of related images of the physical environment 204 via a mobile device 208. For instance, the user 206 may utilize a camera of a smart phone or tablet to capture the series of images. The image data 210 associated with the series of images may be provided to the spatial interaction system 200 via a network 212 (e.g., via the Internet®).

As discussed above, the spatial interaction system 200 may include walkthrough generating instructions 214 to cause the spatial interaction system 200 to generate a 3D virtual representation or walkthrough 216 of the physical environment 204 using the 3D model 202 and the perspective of the set of images relative to the 3D model 202, and the pose or position of the mobile device 208 at the time each image of the set of images was captured. For instance, the 3D virtual representation or walkthrough 216 may allow the user 206 to traverse the 3D model 202 by navigating from image to image based on the temporal order or order in which the images were captured.

In some cases, the user 206 or the system 200 may insert or cause a virtual representation of an object to be rendered within the 3D virtual representation or walkthrough 216. In these cases, the spatial interaction system 200 may obtain object data 218 either from an internal storage device or an external associated database 220 or a third-party system 222. The spatial interaction system 200 may also include object rendering instructions 224 configured to render the virtual object based on the object data 218 using the 3D model 202. For example, the 3D model 202 may include corresponding lighting characteristics, color characteristics, occlusion characteristics, texture characteristics etc. determined based in part on the high dynamitic range data of the physical environment 204. Thus, the spatial interaction system 200 may render the virtual representation of the object in a manner that appears real based on the perspective of each of the images of the series of images and the physical characteristics of the physical environment 204.

For instance, when conventional systems, render virtual objects within a 3D image, the objects often appear out of place or fake as the object rendering fails to consider lighting effects or occlusion effects caused by the environment onto the object. However, in the system 200 discussed herein, the object may be rendered using the lighting characteristics, color characteristics, occlusion characteristics, texture characteristics associated with the model as well as using data derived from the series of images, such as perspective and position. For instance, in one example, the system 200 may receive pose information or sensor data associated with a position of the mobile device 208 at the position from which each image was captured. The system 200 may utilize the position information and the lighting characteristics, color characteristics, occlusion characteristics, texture characteristics to cause the object to be rendered as if the object was present in the physical environment 204. For instance, if the object was reflective, the spatial interaction system 200 may cause a reflection of physical objects in the physical environment to be reflected on the surface of the rendered object, including occlusions effects associated with physical objects reflected on the surface.

In one particular example, the system 200 may determine lighting conditions based on an analysis of a particular image and utilize the 3D model to apply lighting effects and occlusion effects to the virtual object based on the lighting conditions associated with the captured image from the perspective of the captured image, as discussed above. Thus, in this example, the spatial interaction system 200 may render the object using dawn lighting effects from a window to the right of the perspective of the image while taking into account that the light received via the window is diffused by a lamp located between the position of the rendered object and the window to the right of the perspective of the image.

Figure 3:
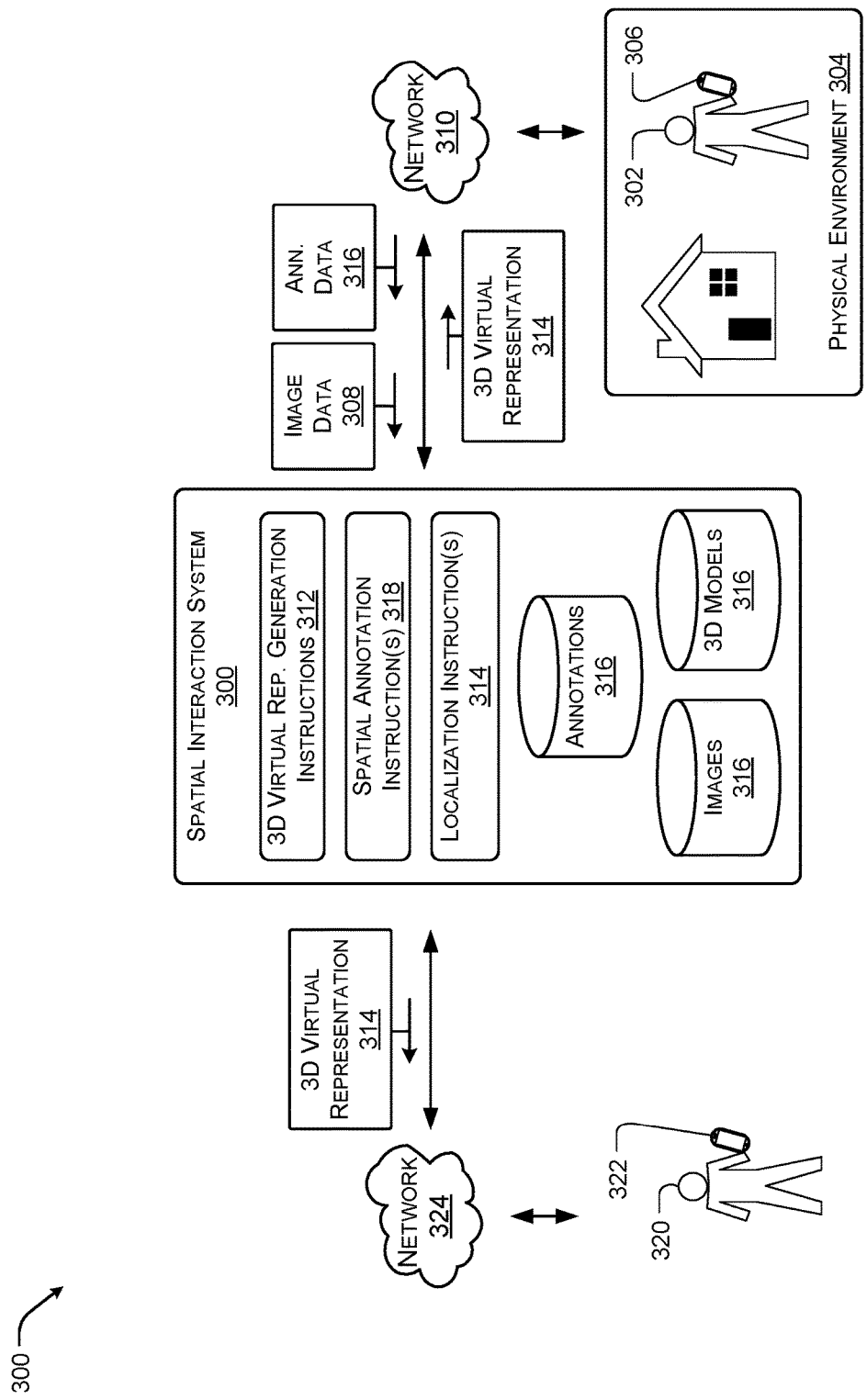
FIG. 3 illustrates an example spatial interaction system for providing perspective based annotations to a three-dimensional environment according to some implementations.

FIG. 3 illustrates an example spatial interaction system 300 for providing perspective based annotations to a three-dimensional environment according to some implementations. In the illustrated example, a user 302 may capture images and/or video of a physical environment 304, such as a home, via a mobile device 306. The image data 308 (e.g., the captured images and/or video) may be provided to the spatial interaction system 300 via one or more networks 310. As discussed above, the spatial interaction system 300 may include walkthrough generating instructions 312 to cause the spatial interaction system 300 to generate a 3D virtual representation or walkthrough 314 based on a stored 3D model or mesh 316 of the physical environment 304. For instance, the 3D virtual representation or walkthrough 314 may allow the user 302 to traverse the 3D model, such as the 3D model 202 of FIG. 2, by navigating from image to image.

In the illustrated example, the image data 308 may include associated annotation data 316. For instance, individual images of the series of images used to generate the walkthrough 314 may have an associated annotation (e.g., visual content, textual content, or audio content). In some instances, the annotation data 316 associated with each individual image may be presented to a viewer when the viewer traverses to the particular viewpoint of the 3D virtual representation or walkthrough 314 associated with the individual image.

In other instances, the spatial interaction system 300 may include spatial annotation instructions 318 to allow the user 302 to position particular annotations at particular locations within the 3D model. For example, the user 302 may apply an annotation to a particular object, such as a piece of furniture. In these instances, the spatial annotation instructions 318 may cause an observer of the 3D virtual representation or walkthrough 314 to experience the particular annotation when the observer is presented with a viewpoint that includes a depiction of the particular object. For example, the annotation may include an audio recording of wind blowing outside a window. The user 302 may cause the audio associated with the wind blowing to be positioned on the window, such that each time the observer views the window, the observer's computing device outputs the wind blowing audio.

In some cases, the 3D virtual representation or walkthrough 314 may also be provided to additional users or observers 320 other than the user 302 that captured the image data 308 and/or the annotation data 316. For instance, the spatial interaction system 300 may provide the 3D virtual representation or walkthrough 314 to a second mobile device 322 associated with the user 320 via a network 324 (e.g., the Internet®). In these cases, the user 320 may also view or experience the physical environment 304 according to the image data 308 and the annotation data 316 provided by the mobile device 306 to the spatial interaction system 300. For example, the user 302 may be a real-estate broker that is generating the 3D virtual representation or walkthrough 314 for a potential buyer (e.g., user 320).

In some examples, the user 302 or 320 may desire to update the 3D virtual representation or walkthrough 314 at a later time. Thus, the user 302 or 320 may provide additional images to the spatial interaction system 300. In these instances, the spatial interaction system 300 may include localization instructions 326 which is configured to determine the location or position of the additional images with respect to the 3D model 316 as well as the 3D virtual representation or walkthrough 314. For example, the spatial interaction system 300 may determine a position of the additional images within the 3D virtual representation or walkthrough 314 or the 3D model 306 based at least in part on the position data associated with the mobile device 308 or 322, respectively, and/or by analyzing the image data associated with the additional image to identify a position within the 3D model 306. In some cases, the spatial interaction system 300 may insert or add the additional images to the 3D virtual representation or walkthrough 314 based on the position determined by executing the localization instructions 326.

In the discussion above, the 3D virtual representation 314 is discussed with respect to a walkthrough of the 3D model based on viewpoints generated by images captured of the environment that may include annotation data 316. However, in other examples, the 3D virtual representation 314 may be represented as an overhead view or doll house view of the physical environment. The overhead, doll house view, top down view, or floor plan view may include graphical representations of the annotations at the location associated with the particular annotation or the corresponding image. In some cases, the user 302 may be able to traverse the 3D virtual representation 314 by selecting the annotation and a viewing application associated with the spatial interaction system 300 may, in response, cause the viewpoint associated with the annotation to be displayed in a photorealistic manner. In this manner, the user 302 may consume the content associated with the annotation while viewing the corresponding image within the 3D virtual representation 314.

In some cases, the spatial interaction system 300 may be configured to assist the user with selecting, updating, and purchasing of household or other goods. For example, the spatial interaction system 300 may insert an object available for purchase into the 3D virtual representation 314 sent to the first user 302 or the second user 320. The inserted object may also include annotations generated by the spatial interaction system 300 in addition to the annotation data 316 provided by the user 302. For example, the system may determine that a vase placed on a table within the physical environment 304 may be aesthetically pleasing. In this example, the system may insert an object of a vase onto the table with an annotation including an offer to purchase the vase and/or an indication of why the spatial interaction system 300 believe the vase is of interest to the user 302, the user 320, or the physical environment 304.

Figure 4:
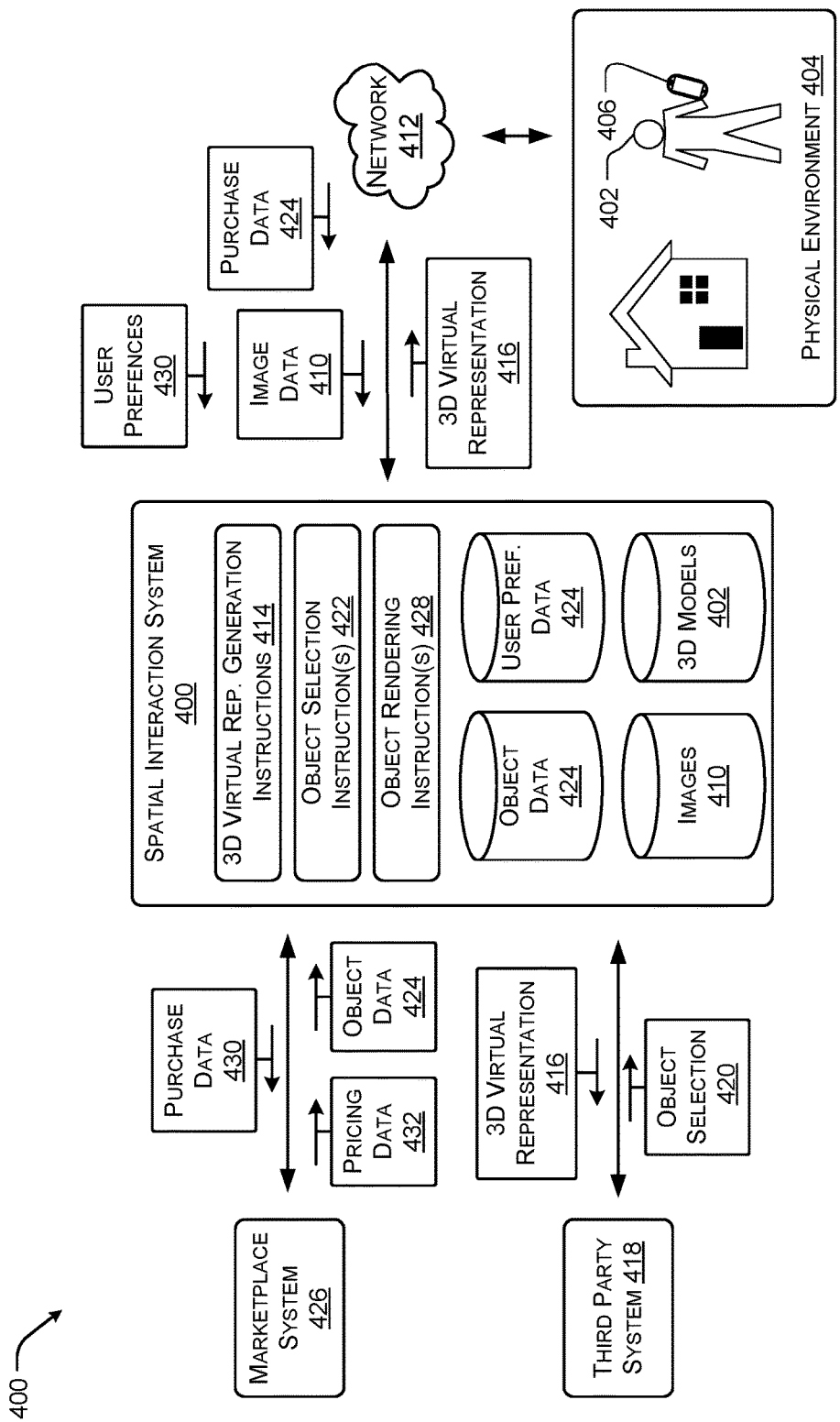
FIG. 4 illustrates an example spatial interaction system for rendering a virtual object within a 3D model associated with a physical environment according to some implementations.

FIG. 4 illustrates an example spatial interaction system 400 for selecting objects rendered within a 3D model or mesh 402 associated with a physical environment 404 according to some implementations. As discussed above, a user 406 may capture a series of related images of the physical environment 404 via a mobile device 408. For instance, the user 406 may utilize a camera of a smart phone or tablet to capture the series of images. The image data 410 associated with the series of images may be provided to the spatial interaction system 400 via a network 412 (e.g., via the Internet®).

As discussed above, the spatial interaction system 400 may include walkthrough generating instructions 414 to cause the spatial interaction system 400 to generate a 3D virtual representation or walkthrough 416 of the 3D model. For instance, the walkthrough 416 may allow the user 406 to traverse the 3D model 402 by navigating from image to image based on the temporal order or order in which the images were captured.

In the illustrated example, the 3D virtual representation or walkthrough 416 may be provided to a third-party system 418, such as a designer, interior decorator, CAD professional, furniture sales store, etc. In some cases, the third-party system 418 may provide an object selection 420, such as an object recommended for a position associated with the viewpoints of the 3D virtual representation or walkthrough 416 or a position within a 3D scene of the physical environment 404. In other cases, the spatial interaction system 400 may include object selection instructions 422 to identify objects to insert or render based at least in part on the 3D virtual representation or walkthrough 416 or the 3D model 402. For instance, the spatial interaction system 400 may be configured to receive object data 424 as well as pricing data 432 associated with the object from marketplace system 426 (e.g., merchants that offer the object for sale). The spatial interaction system 400 may be configured to determine based on the image data 410, 3D model data, known user preferences 434 (e.g. stored or received from the mobile device 406) and/or buying habits associated with the user 402, and/or the object data 424, that the user 402 may desire to purchase the object.

For example, the spatial interaction system 400 may select the object to assist the user 402 with selecting, updating, and purchasing of household or other goods. For example, the spatial interaction system 400 may be configured to determine or obtain user information, such as demographic information (age, sex, income level, etc.), preference information (e.g., likes or dislikes, styles, tastes, etc.), purchasing history (e.g., frequency, quality level, brands, stores, etc.). The user information may be received as an input from the user (such as user preferences 430), derived from the image data, or collected from past purchasing history and third-party transactions/systems (such as the pricing data 432 and/or the object data 424).

The spatial interaction system 400 may utilize the user information together with the 3D model of the physical environment 404 to select and insert objects and annotations associated with products the user 402 may like or use within the physical environment 404. For example, over time the spatial interaction system 400 may determine the user 402 enjoys art work from a particular artist and that the user 402 spends within a determined price range on art work within the physical environment 402. The spatial interaction system 400 may then insert an object of newly available paintings from the artist within the price range to allow the user 402 to order the painting from the artist via the spatial interaction system 400. In some cases, the spatial interaction system 400 may present the object as a pre-order or limited time order.

In some implementations, the spatial interaction system 400 may recommend the product via an inserted object and annotation within the 3D virtual representation 416 in response to a known or unknown need of the user 402. For example, the spatial interaction system 400 may determine that a lamp placed on a table in the physical environment 404 may assist with proper lighting during the evening hours or that upgrading a speaker system may improve the audio quality based on a rooms dimensions. In this example, the system may insert an object of a selected lamp onto the table with an annotation including an offer to purchase the lamp and an explanation as to the lighting concerns. In this example, the spatial interaction system 400 may allow the user 404 to experience the changes in lighting caused by the insertion of the lamp with respect to other objects in the 3D virtual representation 416. Thus, the user 404 is able to experience the effect of purchasing and placing the lamp within the physical environment 404 as suggested by the spatial interaction system 400. Likewise, the spatial interaction system 400 may allow the user 402 to experience the audio effects of the new speaker via an audio based annotation (e.g., a virtual representation of an audio track played via the new speaker system and the old speaker system and heard from a particular position, such as a viewpoint). In some cases, the user 402 may be able to move the lamp or speaker through the 3D virtual representation 416 to experience the effects of the object at different locations.

In some specific implementations, the spatial interaction system 400 may recommend a new product or updated product when a manufacture offers a new version of a product already within the physical environment 404. For example, the spatial interaction system 400 may identify using the 3D model 402 or images 410 a product, such as a blender, that the user 402 has in their home and uses on a regular basis. The spatial interaction system 400 may receive from the manufacture (e.g., a marketplace system 426) that a new model of the blender has been released. In this example, the spatial interaction system 400 may notify the user 402 via an annotation in the 3D virtual representation 416.

In some cases, the spatial interaction system 400 may also detect or identify objects/products within the 3D virtual representation 416 that have outstanding safety issues or recalls. For example, if the spatial interaction system 400 determines that the fire alarm has a warning recall issued by the manufacture, such that the alarm fails in a particular situation. In this example, the spatial interaction system 400 may display the recall as an annotation as well as provide a suggested replacement products via inserted objects. In some instances, the spatial interaction system 400 may provide product review information or product concerns (such as overheating) as annotations associated with objects within the 3D virtual representation 416 of the physical environment 404.

Once an object is selected either by the system 400 or by a third-party system 418, the spatial interaction system 400 may render the object in one or more of the viewpoints associated with the 3D virtual representation or walkthrough 416 by executing object rendering instructions 428. In the illustrated example, the object rendering instructions 428 are configured to cause the object to be rendered as a virtual object within the walkthrough 416. For example, the 3D model 402 may include corresponding lighting characteristics, color characteristics, occlusion characteristics, texture characteristics etc. determined based in part on the high dynamitic range data of the physical environment 404. Thus, the spatial interaction system 400 may render the virtual representation of the object in manner that appears real based on the perspective of at least one of the images captured by the mobile device 406. As discussed above, when conventional systems render virtual objects within a 3D image, the objects often appear out of place or fake as the object rendering fails to consider lighting effects or occlusion effects caused by the environment onto the object. However, in the system 400, discussed herein, the object may be rendered using the lighting characteristics, color characteristics, occlusion characteristics, texture characteristics associated with the model as well as using data derived from the series of images, such as perspective and position.

In the current example, the spatial interaction system 400 may alert the user 406 that the object has been rendered within the 3D virtual representation or walkthrough 416. In some cases, the spatial interaction system 400 may cause additional object data 424, such as price, availability, dimensions, specifications, among others, to be displayed by the mobile device 406 in response to a user input associated with the virtual object (e.g., in response to a user selection of the virtual object within the 3D virtual representation or walkthrough 416). For instance, the spatial interaction system 400 may provide purchase data 430 (e.g., credit authorization, delivery information, identification information, etc.) to the marketplace system 426 to purchase the object for the user 406.

It should be understood that while FIGS. 1-4 illustrates the spatial interaction system as external to the mobile device, in some instances the spatial interaction system may be implemented as an application operating on the mobile device, such that the user may capture image data using the mobile device and generate a 3D virtual representation or walkthrough in substantially real time. In another implementation, the spatial interaction system may be implemented in part on the mobile device as an application and in part as cloud-based or remote-based processing systems, as illustrated. In this implementation, the user may be able to capture images using the mobile device and generate the 3D virtual representation or walkthrough in substantially real time on the mobile device. The remote or cloud-based processing may then be utilized to refine or update the 3D virtual representation or walkthrough.

Figure 5:
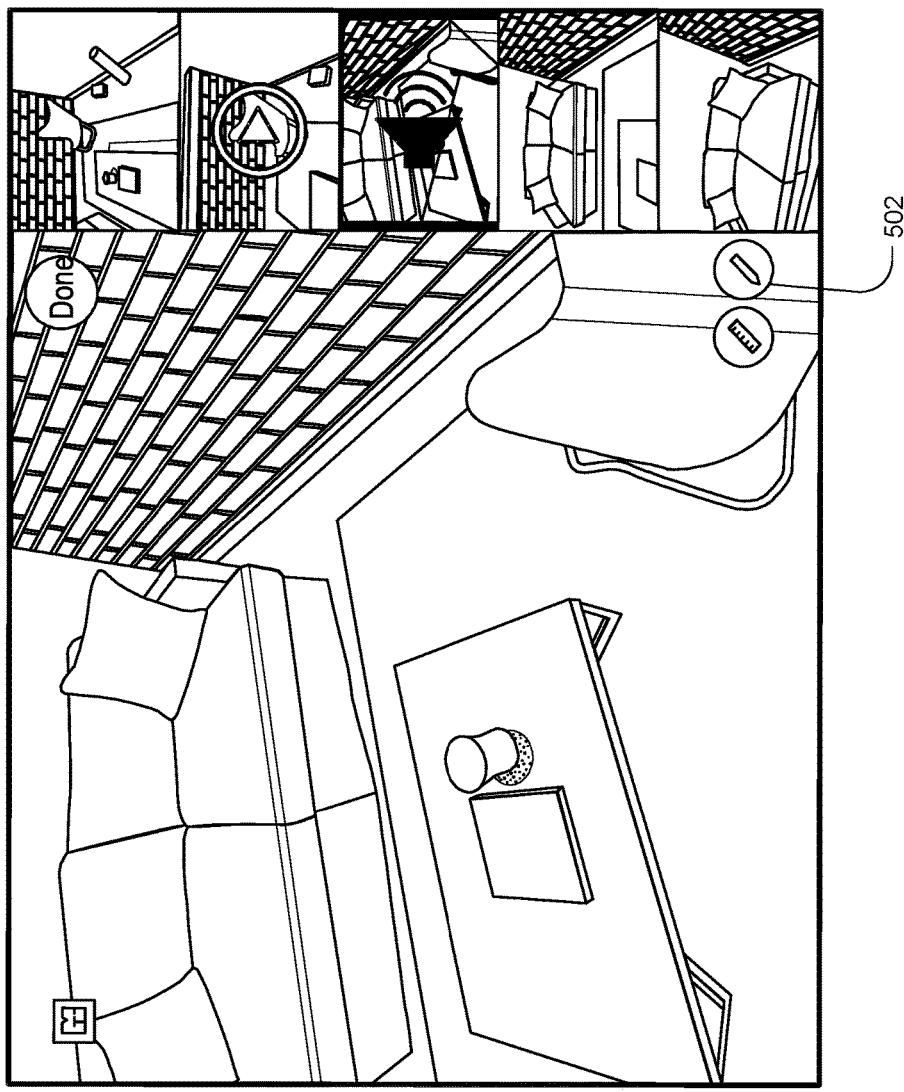
FIG. 5 illustrates an example viewpoint of a 3D virtual representation of a physical environment according to some implementations.

FIG. 5 illustrates an example viewpoint 500 of a 3D virtual representation of a physical environment according to some implementations. In the current example, a user may have uploaded a series of images associated with a physical environment, such the living room depicted in the viewpoint 500. For instance, a mobile device may be equipped with an image or video components capable of capturing color images. In one example, the mobile device may store and execute an application configured to cause the image and/or video components to capture images of a physical environment and to provide the images as a temporal sequence of images to a spatial interaction system, such as the spatial interaction system of FIGS. 1-4. In some cases, the application may cause the device to save or store video content as a series of still color images that are then assigned an order and uploaded to the spatial interaction system. The spatial interaction system may generate a series of perspectives or viewpoints associated with a virtual walkthrough of the physical environment using a stored 3D model or mesh of the living room, as discussed above.

In general, the walkthrough may be generated by applying the image data from the perspective of the mobile device or camera that captured the image at the time the image was captured. In some cases, the perspective may be determined by the mobile device by using IMU data, GPS data, or other sensor data collected by the device itself. In this example, the spatial interaction system may utilize the coordinates, IMU data, GPS data or other sensor data to orient and position the image data within the 3D model. By overlaying the image data on the 3D model, the walkthrough that is generated may have a photorealistic feel, as the user is viewing multiple still images of the physical environment as the user traverses from viewpoint to viewpoint. In some cases, by utilizing video data as a series of images, the walkthrough may include sufficient viewpoints as to enable the user to experience a substantially seamless navigation of the 3D model with respect to a given walkthrough. In some specific cases, the application and spatial interaction system may be configured to update or add images to a particular walkthrough of a physical environment, such that the walkthrough eventually includes photorealistic images from each perspective associated with the corresponding 3D model.

In the current example, the user may also add additional annotations while viewing the viewpoint 500. For example, the user may interact with annotation selection option 502 to cause the system to enter an annotation creating session.

Figure 6:
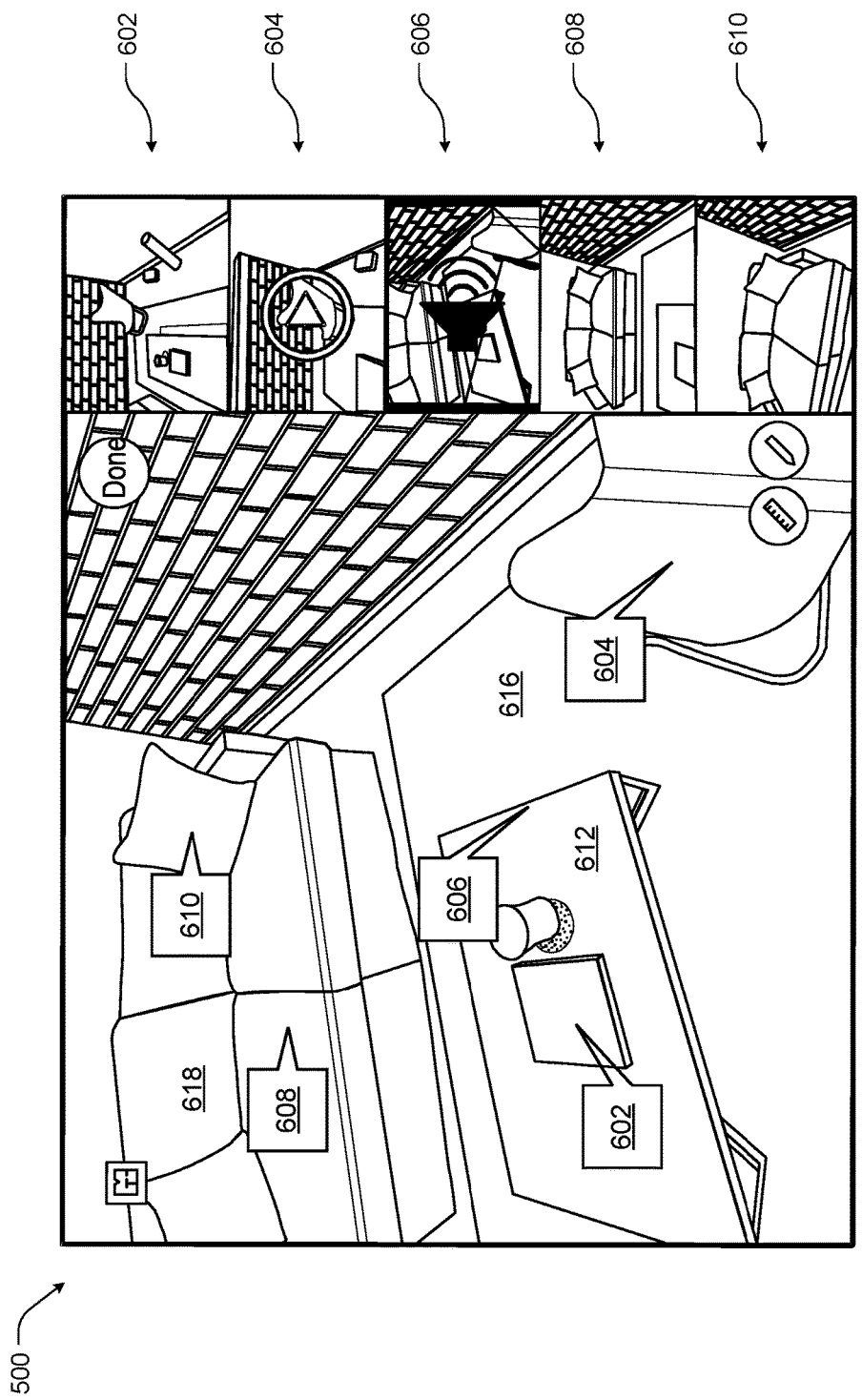
FIG. 6 illustrates the example viewpoint of FIG. 5 including annotations according to some implementations.

FIG. 6 illustrates the example viewpoint 500 of FIG. 5 including annotations 602-610 according to some implementations. For instance, in the illustrated example, the annotations associated with the viewpoint 500 of a 3D virtual representation or walkthrough are shown on the left-hand side of the display, such as a display associated with a mobile device of FIGS. 1-4. In this example, the annotations 602 and 604 may include visual content. For instance, the annotation 602 may include still image content while the annotation 604 may include video content. In this example, the annotation 602 may include a 360° view of the table 612 and the annotation 604 may include a video of an individual sitting in the chair 614.

The annotations 606 and 608 may both contain audio content. For instance, the annotation 606 may include audio content associated with an object falling from the table 612 to the floor 616 and the annotation 608 may include audio content associated with an individual sitting on the sofa 618. The annotation 610 may include textual content associated with pillow 618. For instance, the textual content may include product information (e.g., make, model, price, availability) associated with the pillow 618.

Figure 7:
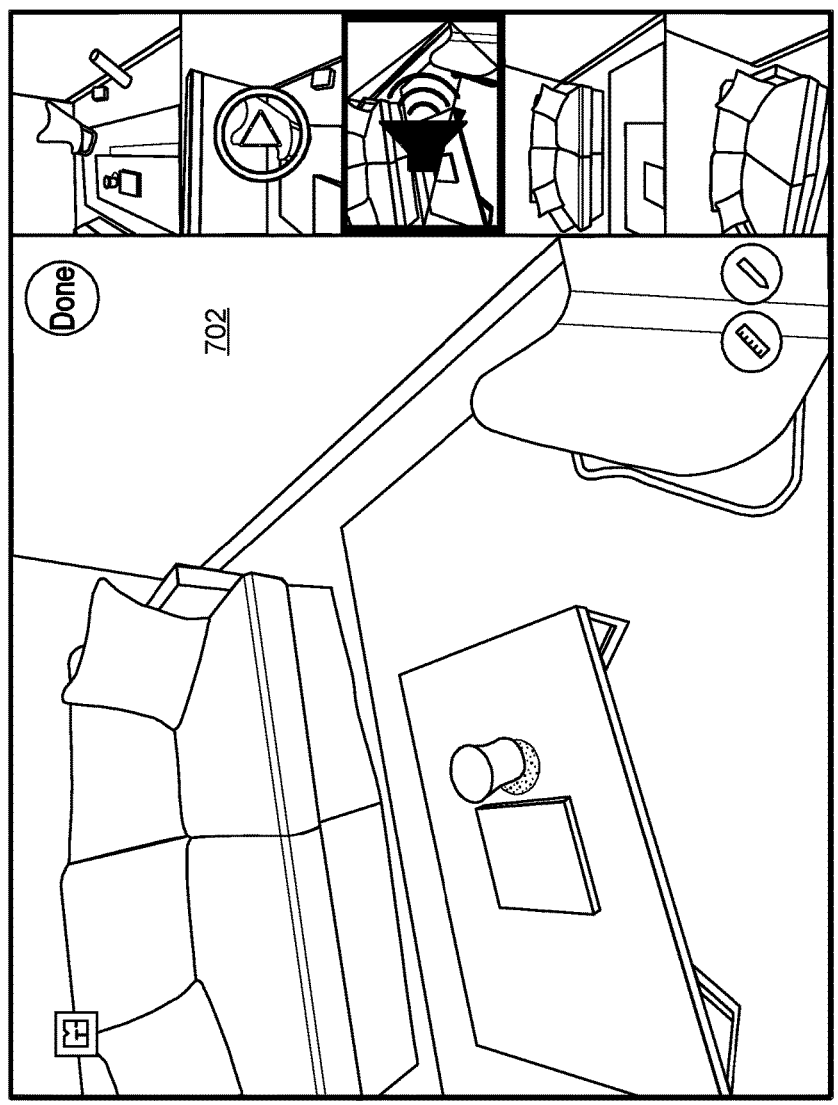
FIG. 7 illustrates an example edited version of the viewpoint of FIG. 5 according to some implementations.

FIG. 7 illustrates an example edited version 700 of the viewpoint 500 of FIG. 5 according to some implementations. For example, a user may desire to visualize a change to the wall 702. Thus, in this example, the user has caused the brick wall to be covered by stucco. As discussed above, the spatial interaction system either operating on a remote server or as a local application may utilize the 3D model or mesh including lighting characteristics, color characteristics, occlusion characteristics from the perspective of the viewpoint within the 3D model to render the stucco covered wall including coloring, shading, and lighting effects from the perspective of the viewpoint in order to give the user a more realistic sense of how the stucco wall would look.

While FIGS. 5-7 illustrate specific viewpoints within a 3D model or 3D virtual representation of a physical environment that are associated with a photograph or photorealistic quality, it should be understood, that in some instances, the viewpoints of the 3D model or 3D virtual representation may not correspond directly to a camera pose. Thus, the spatial interaction system may generate some background content as textured content using the 3D model. For example, in one implementation, the user may select any point or position within a 3D model or 3D virtual representation and the spatial interaction system may display to the user a viewpoint associated with that point or position.

Figure 8:
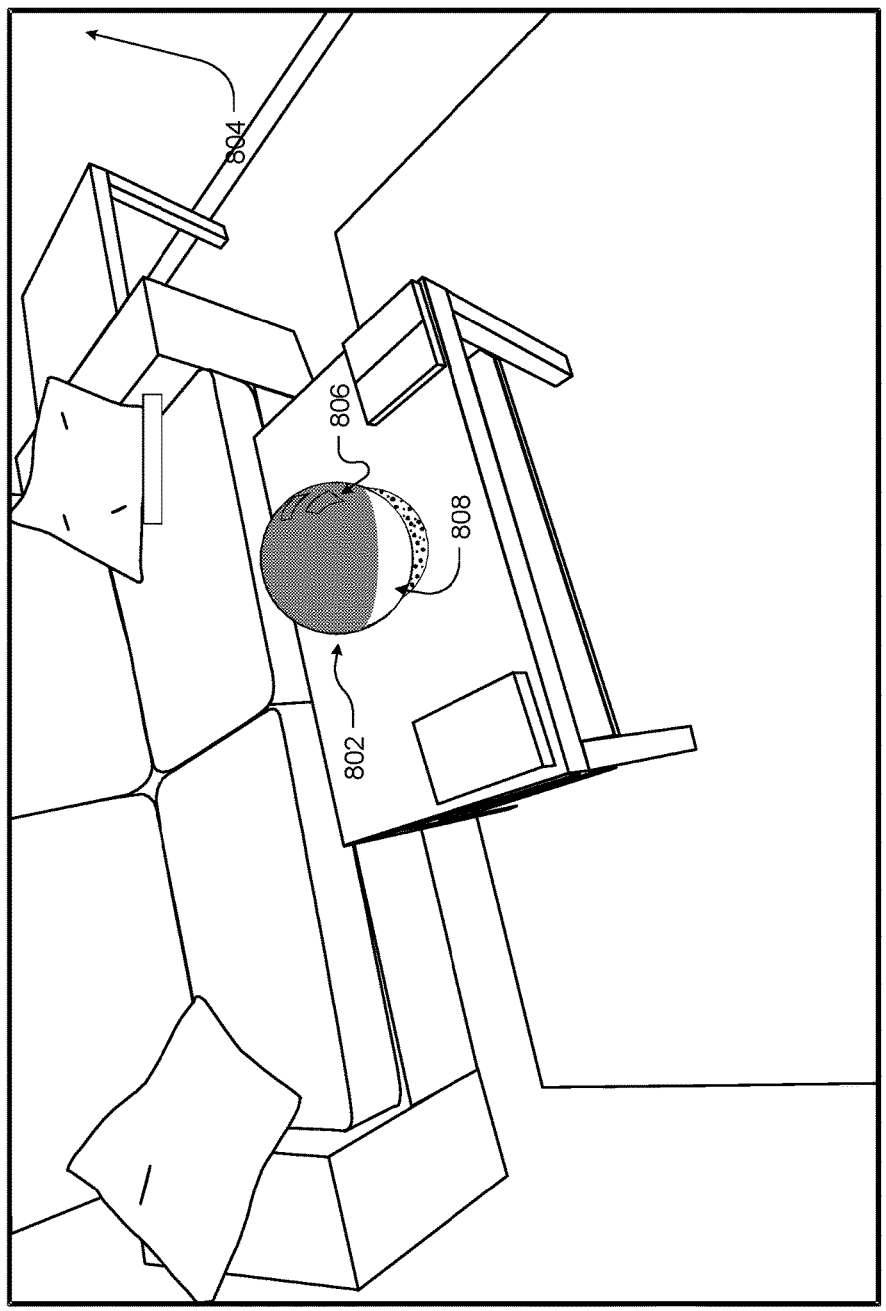
FIG. 8 illustrates a first example viewpoint of a 3D virtual representation of a physical environment including a rendered object according to some implementations.

FIG. 8 illustrates a first example viewpoint 800 of a 3D virtual representation of a physical environment including a rendered object 802 according to some implementations. In the illustrated example, the rendered object 802 has a curved metallic or reflective surface and the viewpoint 800 is to the left of a window, generally at a location indicated by 804 within the physical environment. In this example, since the object 802 has a curved and reflective surface, the surface of the object 802 should correctly represent the reflection of the window 806. By utilizing the 3D model or mesh of the physical environment and the pose of the camera (e.g., the position of the camera at the time the image associated with the viewpoint 800 was captured), the spatial interaction system may determine lighting effects, occlusion effects, and coloring effects associated with the rendered object 802. Additionally, if the 3D model was generated or supplemented with high dynamic range data, the spatial interaction system may apply high dynamic range textures, lighting characteristics, and occlusion characteristics to the rendered object 802. In some specific instances, the spatial interaction system may determine the lighting effects based on a time of day or date associated with the captured image (e.g., natural lighting during the day, artificial lighting during the night, the position of the sun relative to the environment based on the time of year, the location of the light sources such as windows, lamps, overhead lights, etc.).

Further, in addition to the reflection of the window 806, the reflective surface of the rendered object 802 may also reflect or depict the furniture or fixtures 808 located behind the camera position or the position of the viewpoint 800. Thus, the spatial interaction system may render the object taking into consideration the lighting, surrounding environment, and occlusion effects 360° around the object using the 3D model and applying the rendering based on the perspective of the viewpoint 800 or the camera pose at the time the image of the viewpoint 800 was captured.

Figure 9:
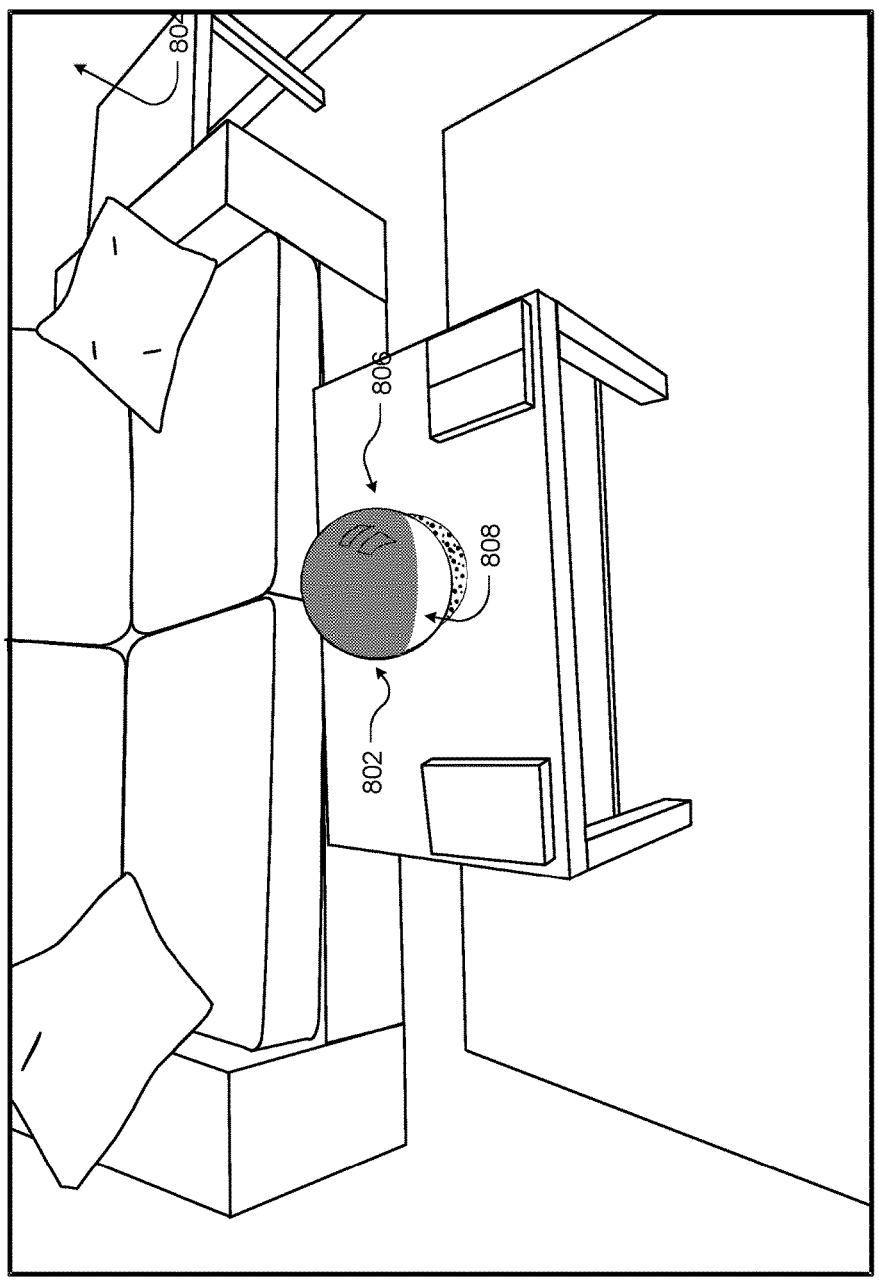
FIG. 9 illustrates a second example viewpoint of the 3D virtual representation of the physical environment including the rendered object according to some implementations.

FIG. 9 illustrates a second example viewpoint 900 of the 3D virtual representation of the physical environment including the rendered object 802 according to some implementations. As discussed above, the object 802 is rendered using a 3D model or mesh of the environment including high dynamic range data that may be utilized to characterize lighting effects, color effects, occlusion effects, etc. from the surrounding environment. In this example, the perspective has changed from the viewpoint 800 to the viewpoint 900. Thus, the rendering of the reflections of the window 806 and the room fixtures 808 on the surface of the object 802 are shifted to reflect the change in position or perspective associated with moving from viewpoint 800 to viewpoint 900.

Figure 10:
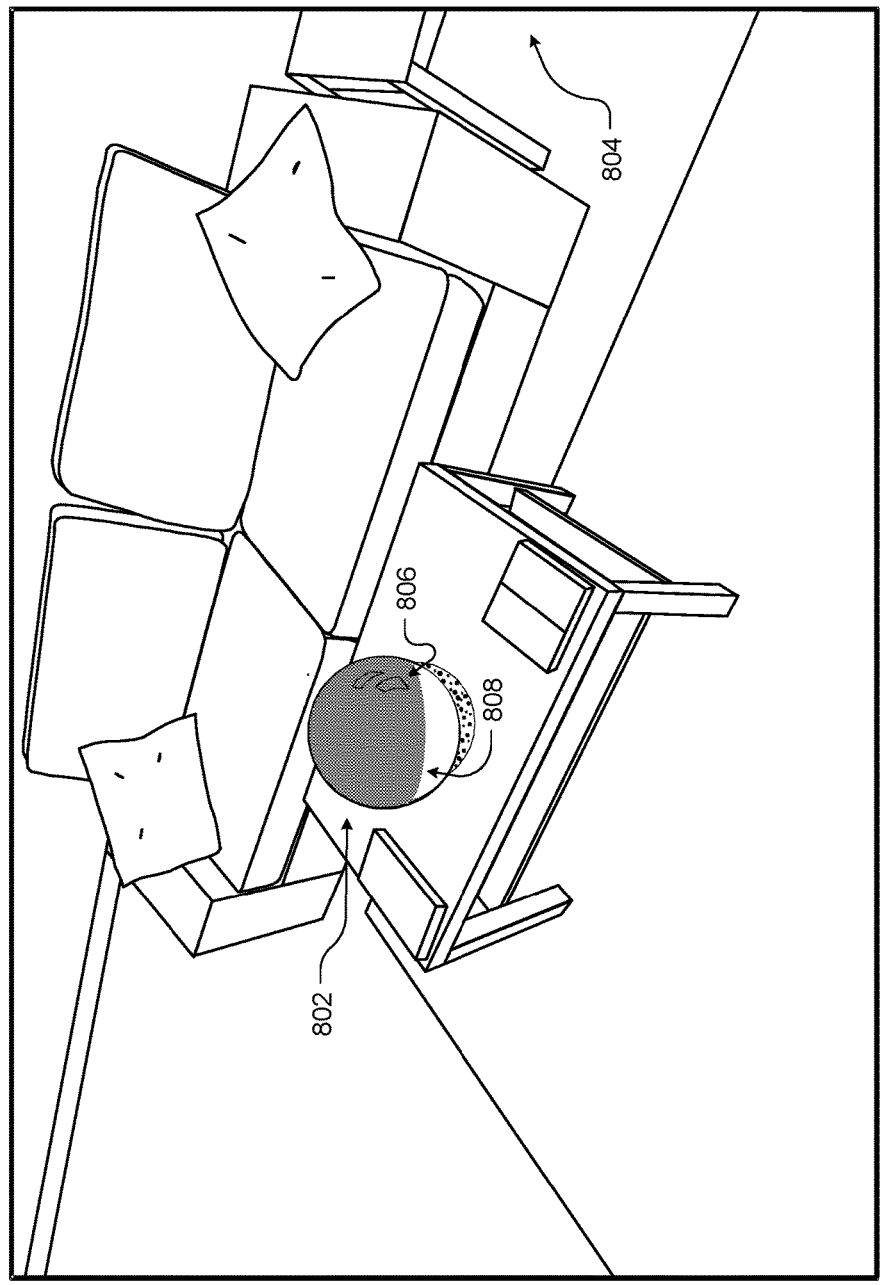
FIG. 10 illustrates a third example viewpoint of the 3D virtual representation of the physical environment including the rendered object according to some implementations.

FIG. 10 illustrates a third example viewpoint 1000 of the 3D virtual representation of the physical environment including the rendered object according to some implementations. Again, the shifting of the perspective from the viewpoint 900 to the viewpoint 1000 causes the reflections 806 and 808 on the surface of the rendered object 802 to have shifted. The system utilizes the 3D model or mesh and the camera pose at the time the image associated with the viewpoint 1000 was captured to render the reflections 806 and 808 in a more realistic manner than other 3D rendered objects.

Figure 11:
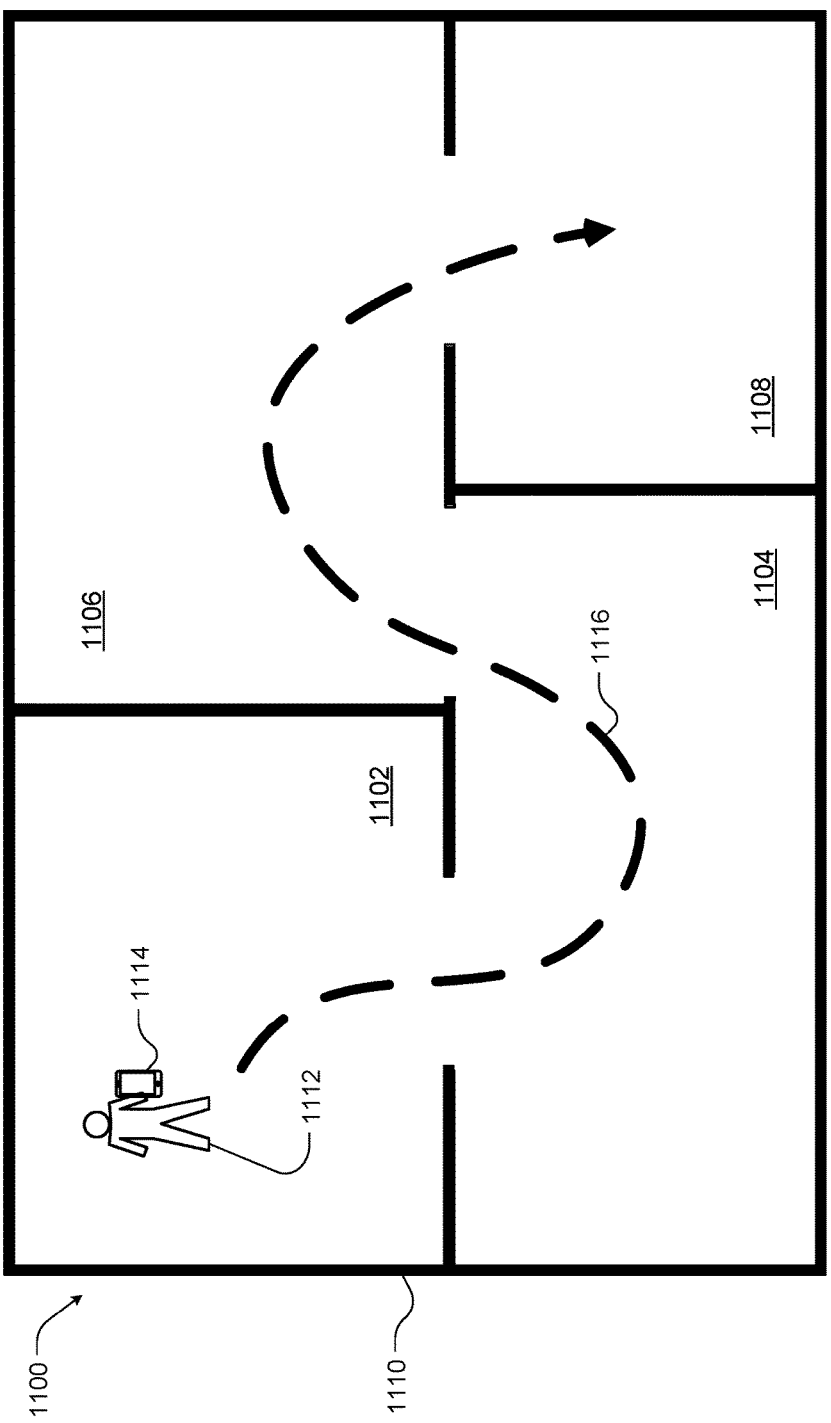
FIG. 11 illustrates an example process for combining 3D sub-models into a larger 3D model according to some implementations.

FIG. 11 illustrates an example process 1100 for combining 3D sub-models, such as 3D models or meshes of rooms 1102-1108, into a larger 3D model of the larger environment, such as the home 1110, according to some implementations. For example, the user 1112 may have generated the individual 3D sub-models of the rooms 1102-1108 by capturing image or video data from various angles, views, perspectives, and camera poses while traversing within the room. The spatial interaction system, such as the systems of FIGS. 1-4, may generate the 3D sub-model from the image or video data for each room 1102-1108. However, the user 1112 may desire to connect or generate a larger 3D model of an entire physical environment, such as the home 1110.

In these instances, the user 1112 may capture video or successive still image data using a camera, or the mobile device 1114 as the user 1112 walks or moves from room 1102 to room 1108, such as along path 1116. In this example, the mobile device 1114 may collect sensor data and/or position data associated with each image captured by the mobile device 1114. The spatial interaction system, either as an application on the mobile device 1114 or operating on a remote server, may then determine a camera pose relative to the 3D sub-models. The spatial interaction system may then utilize the pose and the image data to align and orient each 3D sub-model with each other to generate the larger 3D model of the full physical environment or home 1110. In another example, the spatial interaction system may analyze the image data collected to identify the 3D sub-models in a successive order corresponding to the order the image data was captured. In this example, the spatial interaction system may utilize the image data to orient each 3D sub-model with each other to generate the larger 3D model of the full physical environment or home 1110.

Figure 12:
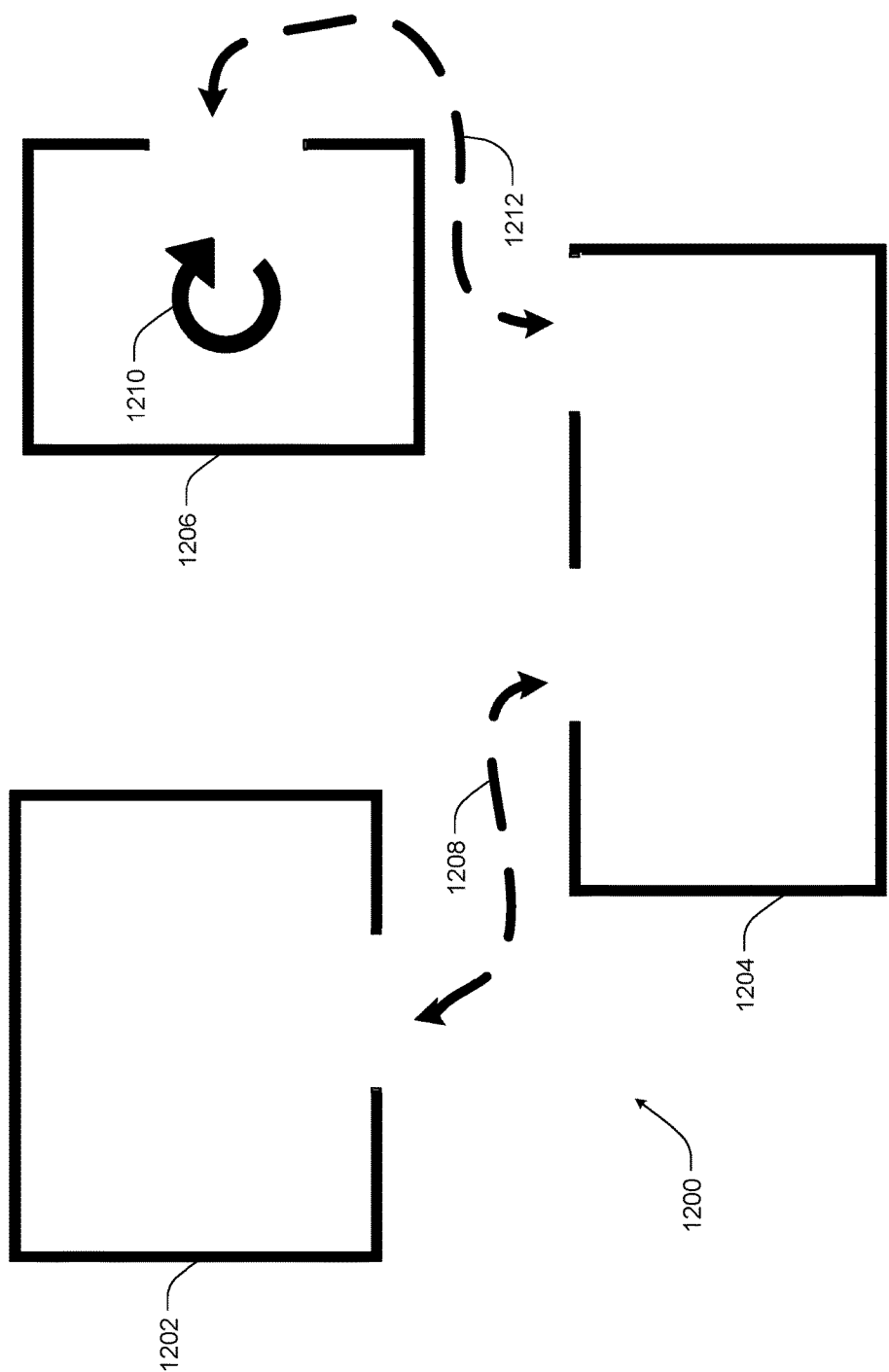
FIG. 12 illustrates another example process for combining 3D sub-models into a larger 3D model according to some implementations.

FIG. 12 illustrates another example process 1200 for combining 3D sub-models, such as 3D sub-models 1202-1206, into a larger 3D model or mesh according to some implementations. In the current example, the spatial interaction system, either as an application on the mobile device or operating on a remote server, may display to a user the 3D sub-models 1202-1206. For instance, the user may select the 3D sub-models 1202-1206 form a list or database of 3D models.

Once the 3D sub-models 1202-1206 are displayed to the user on an electronic device, the user may connect the 3D sub-models in a desired manner. For instance, in the current example, the user may have connected 3D sub-model 1202 and 1204 by drawing a line 1208 between the 3D sub-model 1202 and the 3D sub-model 1204 or dragging and dropping the 3D sub-model 1202 next to the 3D sub-model 1204. In some instances, the user may indicate connecting doorways or opening of the 3D sub-models 1202 and 1204 to cause the 3D sub-models 1202 and 1204 to correctly align with each other. In other instances, the user may place the 3D sub-models proximate to each other and the spatial interaction system may complete the larger model or doll house view of the larger 3D model.

In some situations, such as the illustrated example of FIG. 12, some of the 3D sub-models, such as 3D sub-model 1206, may be need to be rotated prior to connecting. In this example, the user may select and rotate the 3D sub-model 1206, generally indicated by 1210, prior to drawing the connecting line 1212 to connect the 3D sub-model 1206 with the 3D sub-model 1204 as shown. In other instances, the spatial interaction system may be configured to correctly align and/or orient the 3D sub-models 1204 and 1206 in response to receiving a user input selection connecting doorways or openings, such as is shown with respect to line 1212.

Figure 13:
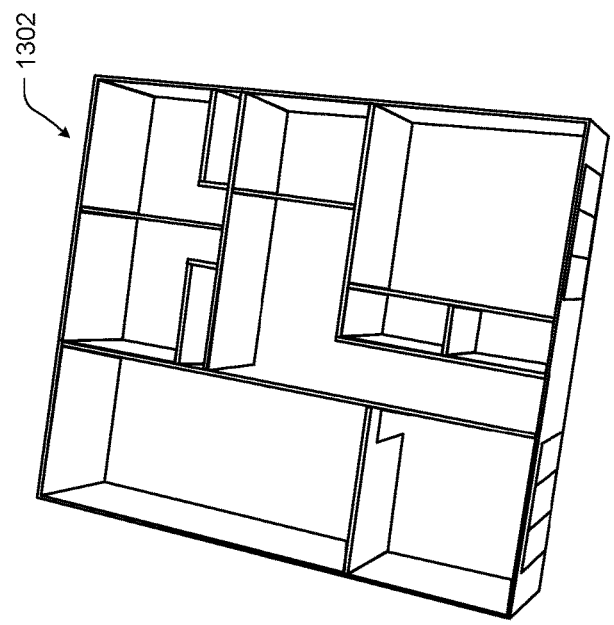
FIG. 13 illustrates an example of a larger 3D model, such as a doll house view and connecting image data collected by a user for connecting 3D sub models according to some implementations
Figure 13:
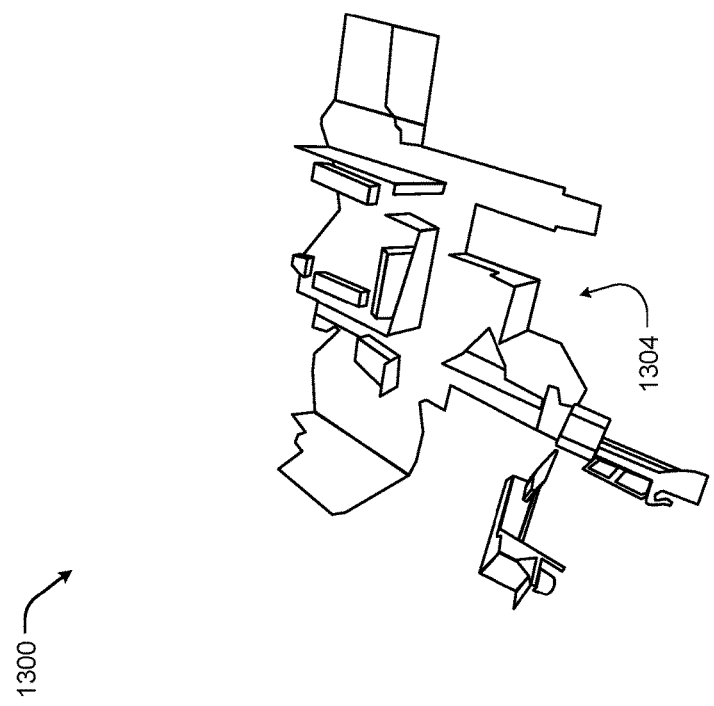

FIG. 13 illustrates an example 1300 of a larger 3D model or mesh, such as a doll house view 1302, and connecting image data 1304 collected by a user for connecting 3D sub models according to some implementations. For example, the doll house view 1302 may be of an individual room or generated from one 3D sub-model. For example, the image data 1304 may be representative of connecting image data collected as a user physically traverses an environment and the doll house view 1302 may be one view of a 3D model that is representative of a larger 3D model of home. In some cases, the image data 1304 may be used by the spatial interaction system to generate the doll house view or to connect multiple 3D sub-models to form the doll house view 1302.

In other examples, such as the doll house view 1302 of the illustrated example may be of a larger physical environment. In some cases, the doll house view 1302 may be created by connecting 3D sub-models as discussed above with respect to FIGS. 11 and 12. However, in other examples, the doll house view 1302 may be generated by using a scanned mesh as input (e.g., the scan associated with generating a 3D model). The spatial interaction system may then utilize the scanned mesh to detect major planar segments using a plane detection technique, such as a Hough voting scheme or random sample consensus. Then the spatial interaction system may for each segment, compute the segment's planar normal and offsets. The spatial interaction system then utilizes at least one of clustering, iterations over pairs of segments, or iteration over normal or offsets to identify pairs of segments with approximately the same planar normal and offsets. In some examples, the spatial interaction system may apply one or more thresholds to determine if a pair of segments are within the same planar normal and offsets.

In this example, for each pair of segments identified, the spatial interaction system determines that the pair is connected and completes the missing geometry between the segments of the pair. For instance, the spatial interaction system may find the lowest and highest points within the two segments, the right most edge of the left-most segment, and the left-most edge of the right-most segment and then complete the intermediate region with a selected mesh.

The spatial interaction system may continue to cycle or loop to connect other geometries in the doll house view 1302 by determining if each pair of geometries intersect and completing the geometry by selecting a mesh. The filled-in geometry. In some specific examples, the spatial interaction system may determine whether a potential completed plane has a hole by detecting errors within the depth data of surfaces of a geometry when viewed from the front.

In some situations, a geometry may not connect to the ground plane. In this situation, the spatial interaction system may extrapolate rays of lines from the camera at a plurality of locations and, if no lines intersect with the observed geometry beyond where the wall is to be extended, the spatial interaction system may extend the wall to the ground plane.

In some instances, such as when a 3D virtual representation of the 3D model, such as a walkthrough, is generated using image data, the doll house view 1302 may include indications or markers associated with each image of the walkthrough and the doll house view 1302 may be used as a map to navigate through the walkthrough (e.g., the user may be able to select viewpoints of the walkthrough using the floor plan 1302 view). Similarly, the doll house view 1302 may be used to display annotations associated with particular locations or positions within a 3D model to a user, such that the user may select a desired annotation on the doll house view 1302 to cause the system to zoom or otherwise display the image data together with the annotation to the user.

Figure 14:
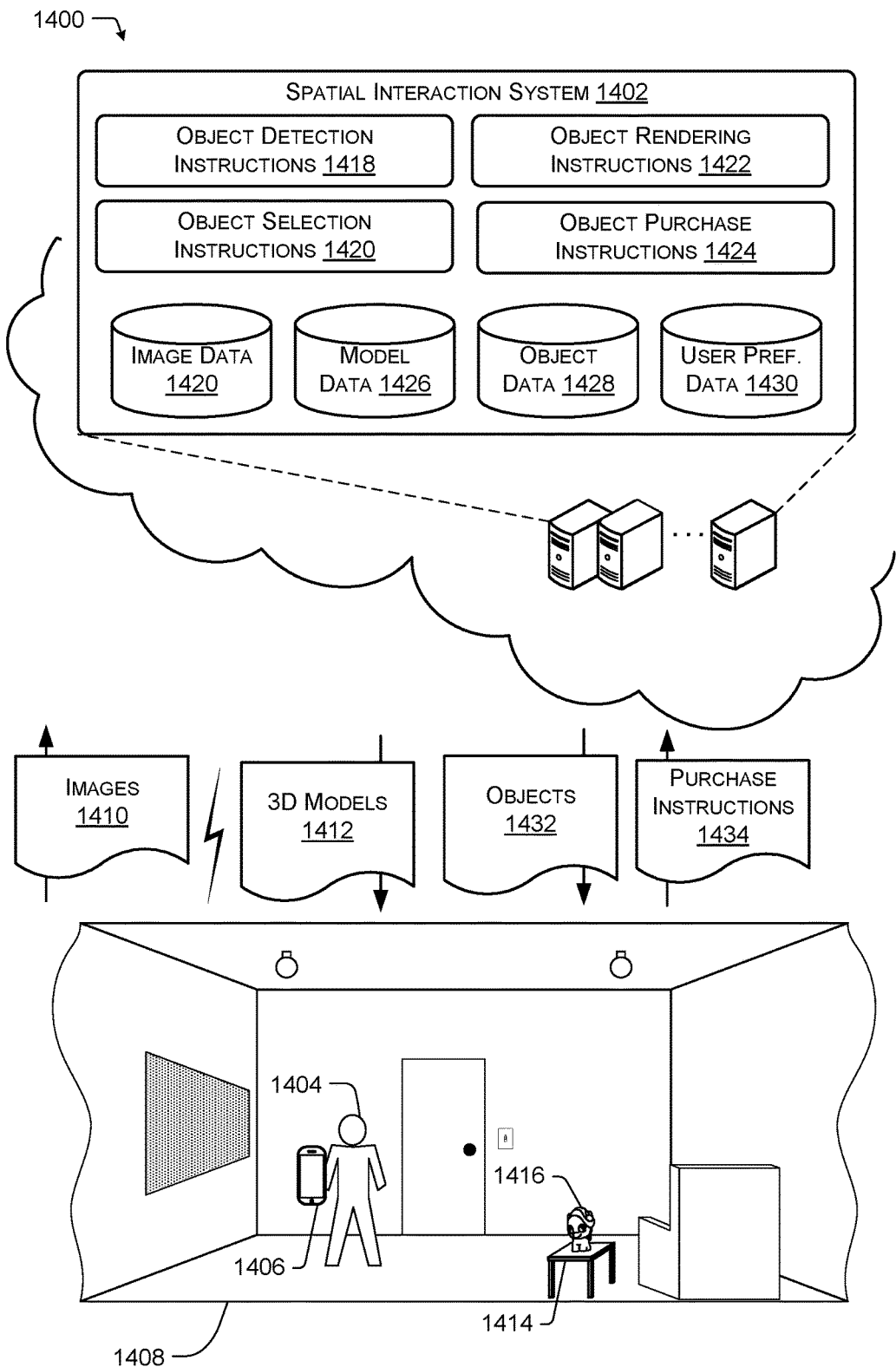
FIG. 14 illustrates an example system for facilitating object purchasing according to some implementations.

FIG. 14 illustrates an example 1400 of a system 1402 for facilitating render object purchasing according to some implementations. In general, the spatial interaction system 1402 may allow a user 1404 to captures images using a mobile device 1406 of a physical environment 1408 and to transmit the image data to the spatial interaction system 1410 to the spatial interaction system 1402 to cause the spatial interaction system 1402 to generate 3D models or meshes 1412.

In the illustrated example, a user 1404 may be capturing images using a mobile device 1406 to generate a 3D virtual representation of the physical environment 1408. In this example, the user 1404 may be taking multiple images of a newly purchased table 1414 from various camera poses of the mobile device 1406 to generate a walkthrough showing the table 1414 to a friend from multiple perspectives.

The spatial interaction system 1402 may also store instructions, such as object detection instructions 1418, object selection instructions 1420, object rendering instructions 1422, and object purchase instructions 1424. The spatial interaction system 1402 may also store data useful when executing the instructions 1418-1424, such as image data 1410, model data 1426, object data 1428, and user preference data 1430. The image data 1410 may include images associated with various physical environments and 3D models, the model data 1426 may include data such as lighting characteristics, color characteristics, occlusion characteristics, high dynamic range textures, etc. useful for rendering objects using a 3D model, the object data 1428 may include information associated with various objects, such as price, CAD files, object identifies, availability at various merchants, model, make, etc., and the user preference data 1430 may include information know about the user 1404, such as buying habits, demographic information, employment information, etc.

The object detection instructions 1418 may be configured to detect objects within the image data 1410 received from a physical environment, such as physical environment 1408. In some cases, the objects within the image data 1410 may be isolated and an object identity may be determined, such as a make and model of a television. For instance, the object detection instructions 1418 may detect any visible labels for identification information visible in the image data 1410, access third party systems to compare image data 1410 of the object with images of objects or products associated with the third-party systems, or compare the image data 1410 to stored image data 1410 and object data 1428.

The object selection instructions 1420 may be configured to select an object 1428 based on the user preference data 1430 and the object data 1428 to render within a 3D virtual representation of an environment being generated for the user 1404. In some cases, the object selection instructions 1420 may select an object 1428 to render within the 3D virtual representation based at least in part on the objects detected within the image data 1410 by the object detection instructions 1418.

The object rendering instructions 1422 may be configured to render objects within the 3D virtual representation from a viewpoint specific position or perspective. For example, an object 1428 selected by the object selection instructions 1420 may be rendered using the model data 1426 (e.g., color, lighting, texture, etc.) based on at least one camera pose associated with the image data 1410 being used to create the 3D virtual representation or walkthrough. In some cases, the object rendering instructions 1422 may cause the selected object 1428 to be rendered using the high dynamic range data, high dynamic range textures, color characteristics, lighting characteristics, and occlusion characteristics associated with a corresponding 3D model. Thus, the object rendering instructions 1422 may render the object 1428 from the perspective associated with each viewpoint of a walkthrough with the correct coloring, lighting, and occlusion effects.

The object purchase instructions 1424 may be configured to purchase the selected object on behalf of the user 1404 in response to receiving purchase instructions 1430 from the mobile device 1406 associated with the user 1404. In some cases, an application operating on the mobile device 1406 may cause the user 1404 to be alerted to the object 1428 within the 3D virtual representation and to allow the user 1404 to view data (e.g., make, model, price, specification, etc.) of the object while viewing the 3D virtual representation. In some cases, the application may allow the user 1404 to enter purchase instructions 1434 (e.g., credit or debit card information) and to transmit the purchase instructions 1434 to the spatial interaction system 1402.

In some cases, the object purchase instructions 1424 may also include retargeting or object purchase follow up instructions. For example, in some cases, a user may view data related to the object within the 3D virtual representation but fail to purchase the object itself. In these examples, the object purchase instruction 1424 may be configured to generate an online advertising campaign to cause ads for the object to appear in third-party systems or webpages, cause an email campaign related to the object to be directed to the user of the 3D model, or provide information to a third party to conduct a retargeting campaign. In some instances, the object purchase instructions 1424 may also provide information to purchase related objects or services when the user is viewing the object information within the 3D model or 3D virtual representation. For example, the system 1402 may promote the user 1404 to connect to an interior decorate to assist with selecting furniture for the user's home.

As discussed above, the user 1404 may be capturing images using a mobile device 1406 to generate the 3D virtual representation of the physical environment 1408. In this example, the table 1414 may incidentally have an object, such as a horse 1416, located on top. The image data of the table 1414 and the horse 1416 may be sent to the spatial interaction system 1402. In this example, the object detection instructions 1418 may identify the horse 1416 as a collector's item. The object selection instructions 1420 may then in turn know that the user 1404 has a preference for collecting horse figurines and identify the availably of a new collector edition horse at select retailers. The object selection instructions 1420 may also select the new collector edition horse to be rendered on the table 1414 with respect to the walkthrough being generated by the spatial interaction system 1402.

In this example, the object rendering instructions 1422 may cause the new collector edition horse to be rendered within one or more viewpoints of the table 1414. The user 1404 may see the new collector edition horse when navigating through the walkthrough and select the new collector edition horse to see more information. The user 1404 may decide that the new collector edition horse would be an excellent table mate to the horse 1416 based on the aesthetics in the 3D virtual representation being viewed. Thus, the user 1404 may cause purchase instructions 1434 to be provided to the spatial interaction system 1402 and the object purchase instruction 1430 may cause the new collector edition horse to be purchased on behalf of the user 1404.

In another example, the spatial interaction system 1402 may present other objects to the user together with annotations or additional content useful for purchasing the object or simulating the look and feel of the object. For example, the spatial interaction system 1402 may render a speaker system into the 3D model of the physical environment 1408 and include annotations to allow the user to listen to or simulate the speaker system from a current viewpoint based on data associated with the speaker characteristics and placement within the 3D model. The system may first infer textures and/or materials from the image data (e.g., acoustic absorbing material, acoustic reverberating material, etc.). The spatial interaction system 1402 may then model the acoustics of the 3D model by applying a head related transfer function (HRTF) acoustic simulation to the 3D model given the relative positions of the speakers, textures, and materials within the environment with respect to the viewpoint. In the current example, a speaker or sound outputting device is mentioned, however, audio associated with any device, such as an appliance (e.g., fan, coffee maker, etc.) or other objects such as a water fixture may also be simulated using the system described herein.

FIGS. 15-21 are flow diagrams illustrating example processes associated utilizing a 3D model of a physical environment to generate 3D virtual representations according to some implementations. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

Figure 15:
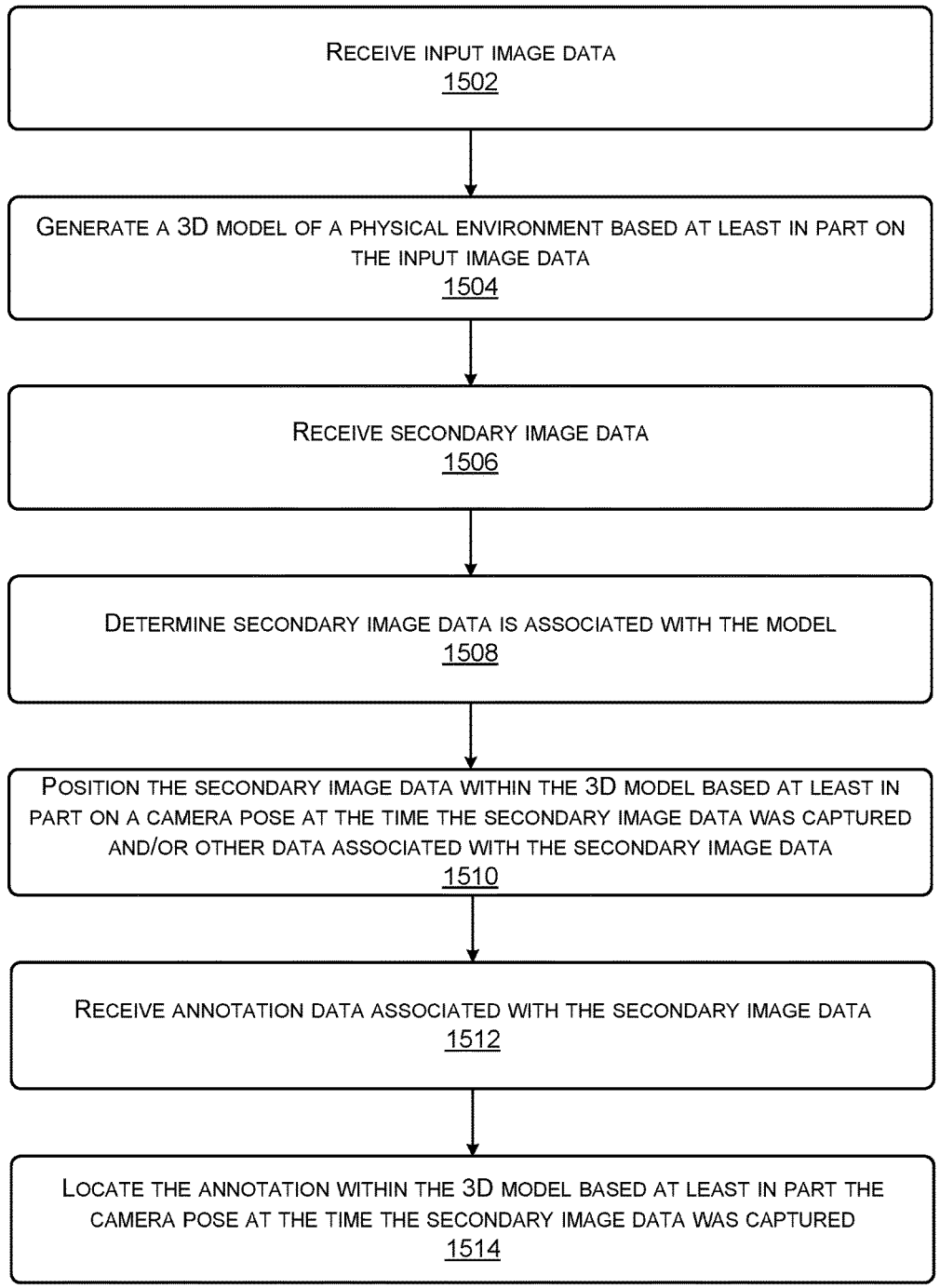
FIG. 15 is an example flow diagram showing an illustrative process for generating an annotated 3D virtual representation of a physical environment according to some implementations.

FIG. 15 is an example flow diagram showing an illustrative process 1500 for generating an annotated 3D virtual representation, such as a walkthrough or doll house view mitigatable representation, of a physical environment according to some implementations. For example, the spatial interaction system described herein may be configured to generate a 3D virtual representation of a physical environment based on a 3D model of the physical environment and image data collect in the physical environment. For example, the spatial interaction system may utilize the camera pose or position within the physical environment to position the image data within the 3D model to generate a viewpoint of a walkthrough. In some cases, each of the viewpoints may also include annotations (e.g., textual content, visual content, or audio content obtained at the time the image used to generate the viewpoint was captured).

At 1502, the spatial interaction system, either operating on a local device (e.g., a mobile device capturing the images or a cloud based server system), may receive input image data associated with a physical environment. For example, the input image data may include high dynamic range data or video data captured as the user moves throughout the physical environment.

At 1504, the spatial interaction system may generate a spatial model (e.g., a 3D model) of the physical environment based at least in part on the input image data. For example, the spatial interaction system may utilize the high dynamic range data together with a camera pose determined by, for instance, simultaneous localization and mapping techniques to determine lighting characteristics, occlusion characteristics, color characteristics, etc. at various positions or perspectives within the 3D model.

At 1506, the spatial interaction system may receive secondary image data. For instance, a user may revisit the physical location to generate a 3D virtual representation or walkthrough of the physical environment by capturing a series of images of the physical environment. In some instances, the device capturing the images may again provide position data, such as IMU data, that may be used for simultaneous localization and mapping techniques to determine a position within the 3D model for each of the secondary images captured.

At 1508, the spatial interaction system may determine that the secondary image data is associated with the 3D model. For example, the spatial interaction system may utilize the camera pose or position to determine the secondary image data is associated with the 3D model of the environment. In another example, the spatial interaction system may analyze the image data to determine that the image data is similar to, or part of, the image data of the 3D model. In one particular example, the 3D model may include GPS data and the secondary image data may be received by the spatial interaction system in conjunction with GPS data of the location at which the secondary images were captured. In this example, the spatial interaction system may determine the secondary image data is associated with the 3D model based on the GPS data.

At 1510, the spatial interaction system may position the secondary image data within the spatial model based at least in part on a camera pose at the time the secondary image data was captured and/or other data associated with the secondary image data. For example, the spatial interaction system may generate the walkthrough by placing each image at a position or from a perspective indicated by the camera pose such that the viewer of the walkthrough navigates from camera pose to camera pose and the image data presented is photorealistic, as it is a photograph of the physical environment.

At 1512, the spatial interaction system may receive annotation data associated with the secondary image data. For example, as the spatial interaction system receives each of the images, the spatial interaction system may receive annotation data collected at the time the image was captured. In other examples, a user of the system may add the annotations to the viewpoints of the walkthrough following the capture of the secondary image data.

At 1514, the spatial interaction system may locate the annotation within the spatial model based at least in part the camera pose at the time the secondary image data was captured. For example, if an annotation was captured substantially contemporaneously (e.g., audio is recorded as video data of the physical environment is captured) with an image of the secondary image data, the camera pose associated with the image and the annotation may be the same. In this example, the spatial interaction system may associate the annotation and the image with the same viewpoint and/or position within the 3D virtual representation and/or the walkthrough based on the 3D model. In this manner, an individual that consumes the content associated with the 3D virtual representation may experience the annotation while viewing the same visual content (e.g., the state of the physical environment at the time and date the annotation was captured) as the individual that captured the image data.

In the current example, the annotations are captured at a time after the 3D model has been created or a time following the receipt of the input image data. However, it should be understood that, in other examples, annotations may be captured and associated with the 3D model at the time the 3D model is generated.

Figure 16:
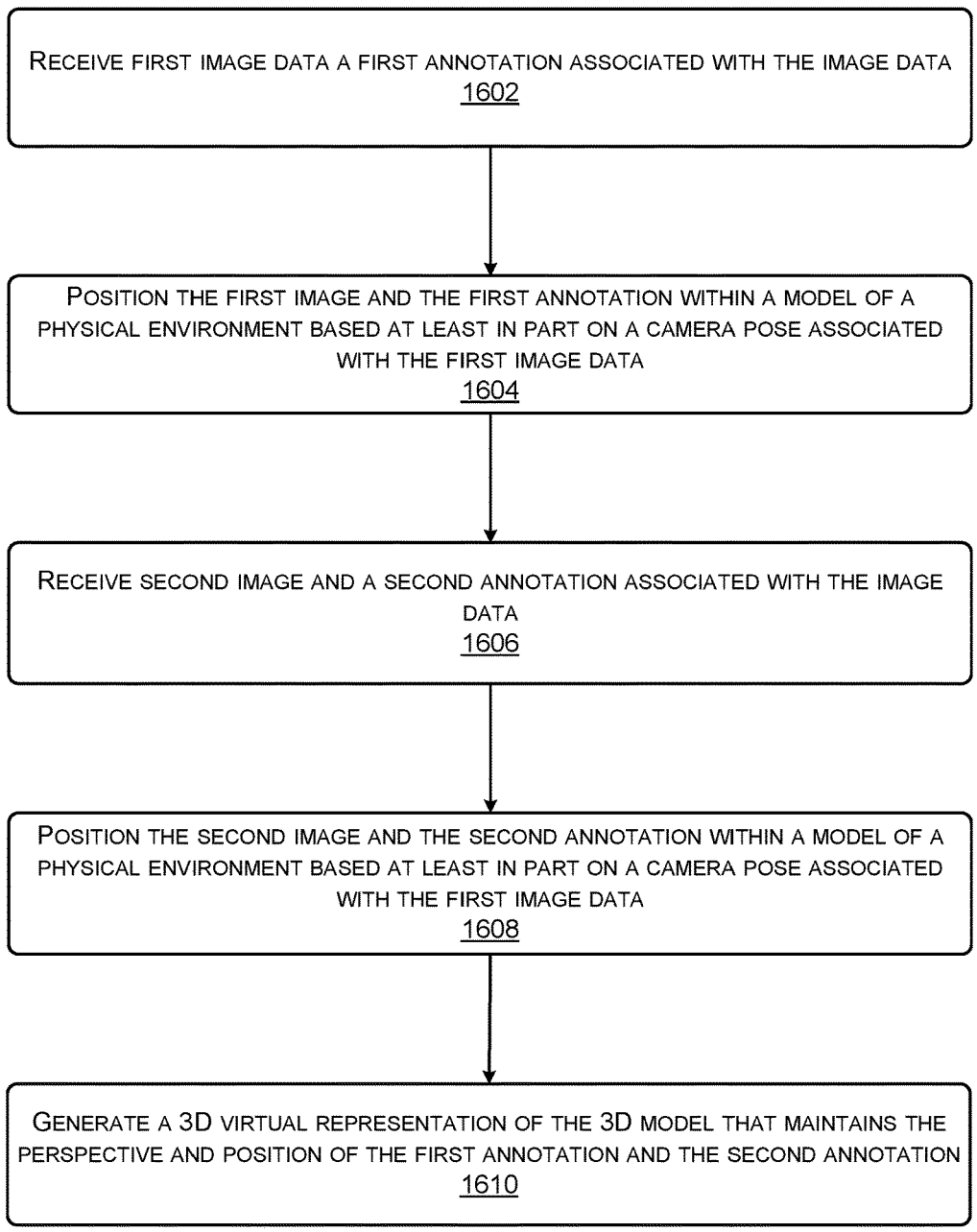
FIG. 16 is another example flow diagram showing an illustrative process for generating an annotated 3D virtual representation of a physical environment according to some implementations.

FIG. 16 is another example flow diagram showing an illustrative process 1600 for generating an annotated 3D virtual representation of a physical environment according to some implementations. For example, the spatial interaction system described herein may be configured to generate a 3D virtual representation of a physical environment based on a 3D model of the physical environment and image data collected in the physical environment. For example, the spatial interaction system may utilize the camera pose or position within the physical environment to position the image data within the 3D model to generate a viewpoint of a walkthrough. In some cases, each of the viewpoints may also include annotations (e.g., textual content, visual content, or audio content obtained at the time the image used to generate the viewpoint was captured).

At 1602, a spatial interaction system, either a local application hosted by an electronic device accessible to a user or at a remote cloud based server system, may receive first image and a first annotation associated with the image data. For instance, the user may be generating a walkthrough or 3D virtual representation of a physical environment by capturing a series of images of the physical environment. In some cases, the user may also capture or obtain annotation data (e.g., textual content, visual content, or audio content) that is supplemental to the first image. For example, the user may record an audio file of the user's thoughts while capturing the first image.

At 1604, the spatial interaction system may position the first image and the first annotation within a model of a physical environment based at least in part on a camera pose associated with the first image data. For instance, the device capturing the images may provide position data, such as IMU data, that may be used for simultaneous localization and mapping techniques to determine a position or camera pose within a 3D model of the physical environment associated with the first image. By positioning the first image and the first annotation based on the camera pose associated with the first image, the annotation may be consumed by an individual while the individual is viewing the first image within a 3D virtual representation of the physical environment.

At 1606, a spatial interaction system may receive a second image and a second annotation associated with the image data. For instance, the second image may be another image associated with the walkthrough of the physical environment being generated by the user. In some cases, the user may also capture or obtain annotation data (e.g., textual content, visual content, or audio content) that is supplemental to the second image. For example, the user may associate a 360° image of a piece of furniture within the second image to the second image.

In some cases, prior to associating the annotation to the viewpoint of the second image within the 3D virtual representation of the physical environment, the spatial interaction system may relocalize a photo or an annotation within the 3D model. For example, the spatial interaction system may relocalize the photo or the annotation based on visual content or image data of the photo or annotation (e.g., matching visual content to content within the 3D model), use of camera pose data (e.g., IMU data, position data, GPS data, etc.), and/or use of depth information associated with the photo (e.g., as captured using a depth sensor).

At 1608, the spatial interaction system may position the second image and the second annotation within a model of a physical based at least in part on a camera pose associated with the second image data. Again, the device capturing the images may provide position data, such as IMU data, that may be used for simultaneous localization and mapping techniques to determine a position or camera pose within a 3D model of the physical environment associated with the second image. By positioning the second image and the second annotation based on the camera pose associated with the second image, the annotation may be consumed by an individual while the individual is viewing the second image within a 3D virtual representation of the physical environment. In this case, the individual may view the second image including the piece of furniture while at the same time viewing the piece of furniture from a plurality of angles.

At 1610, the spatial interaction system may generate the walkthrough including a first viewpoint associated with the first image and the first annotation and a second viewpoint associated with the second image and the second annotation. In the current example, the first image is associated with a single annotation, however, it should be understood that any number of annotations may be associated with the first image and/or the second image. Additionally, while the process 1600 discusses annotations associated with two images used to generate a walkthrough of a physical environment, it should be understood that any number of images may be included some or all of which may have associated annotations.

Figure 17:
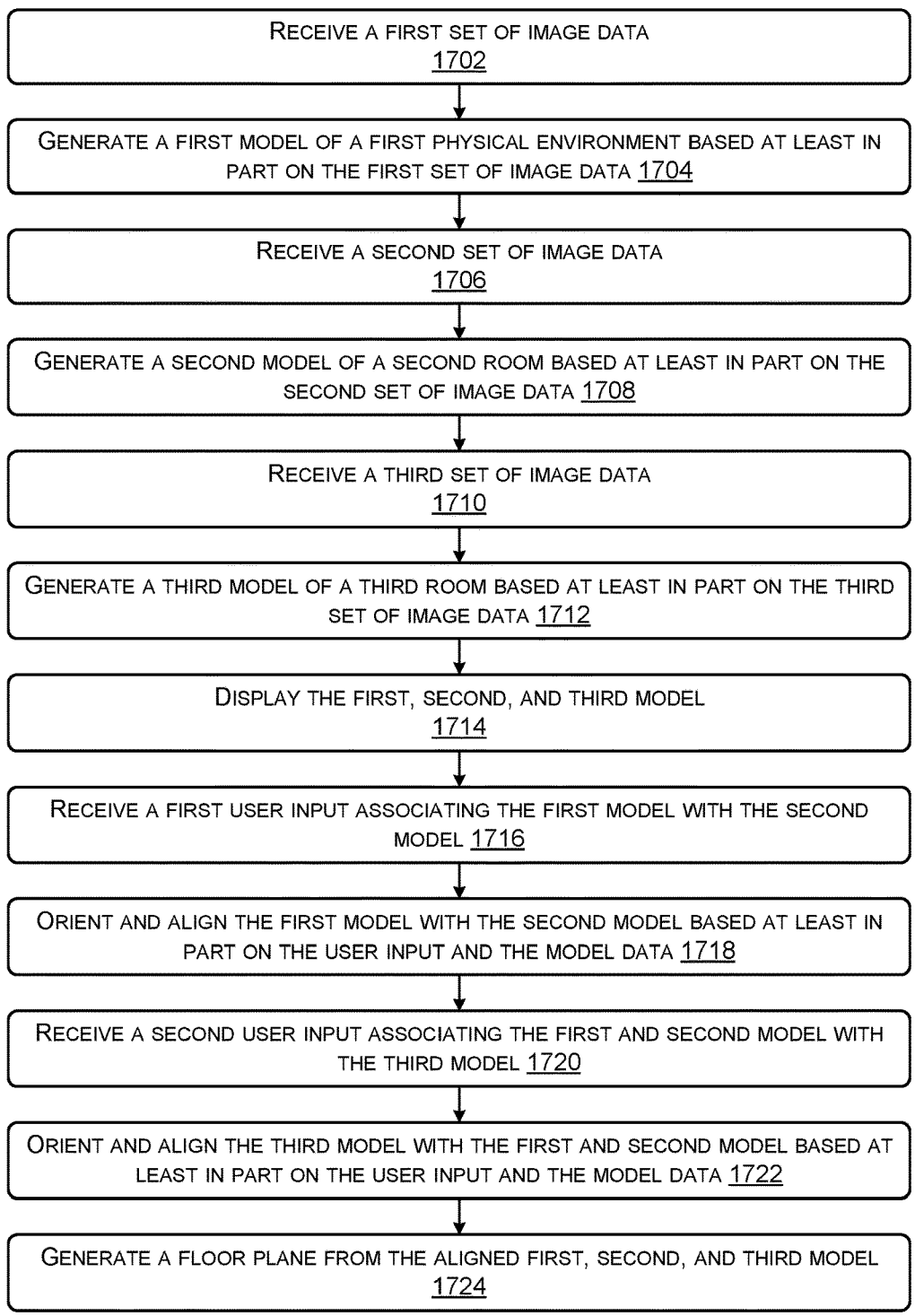
FIG. 17 is an example flow diagram showing an illustrative process for connecting or combining 3D models according to some implementations.

FIG. 17 is an example flow diagram showing an illustrative process 1700 for connecting or combining 3D models according to some implementations. For example, in some instances, the spatial interaction system may generate 3D sub-models or 3D models of individual rooms based on captured image data. In some situations, a user may desire to connect or otherwise combine the 3D sub-models into a larger 3D model, such as when generating a doll house view or walkthrough of a home.

At 1702, the spatial interaction system, either operating on a local device (e.g., a mobile device capable of capturing image data) or on a remote cloud based server, may be configure to receive a first set of image data of a first physical environment, such as a first room of a home. In some cases, the first set of image data may contain high dynamic range data that may be used to characterize lighting, color, textures, and occlusion effects of objects within the first room.

At 1704, the spatial interaction system may generate a first spatial or 3D model of the first physical environment (e.g., the first room) using the first set of image data. For example, the first 3D model may be formed by generating a scanned mesh from the first set of image data. The spatial interaction system may then utilize the scanned mesh to detect major planar segments using a plane detection technique, such as a Hough voting scheme or random sample consensus. Then the spatial interaction system may for each segment, compute the segments planar normal and offsets. The spatial interaction system then utilizes at least one of clustering, iterations over pairs of segments, or iteration over normal or offsets to identify pairs of segments with approximately the same planar normal and offsets. In some examples, the spatial interaction system may apply one or more thresholds to determine if a pair of segments are within the same planar normal and offsets. In this example, for each pair of segments identified, the spatial interaction system determines that the pair is connected and completes the missing geometry between the segments of the pair. For instance, the spatial interaction system may find the lowest and highest points within the two segments, the right most edge of the left-most segment, and the left-most edge of the right-most segment and then complete the intermediate region with a selected mesh. The spatial interaction system may continue to cycle or loop to connect other geometries in the first 3D model by determining if each pair of geometries intersect and competing the geometry by selecting a mesh. the filled-in geometry. In some specific examples, the spatial interaction system may determine whether potential completed plane has a hole by detecting errors within the depth data of surfaces of a geometry when viewed from the front. In some situations, a geometry may not connect to the ground plane. In this situation, the spatial interaction system may extrapolate rays of lines from the camera at a plurality of locations and, if no lines intersect with the observed geometry beyond where the wall is to be extended, the spatial interaction system may extend the wall to the ground plane.

At 1706, the spatial interaction system may be configure to receive a second set of image data of a second physical environment, such as a second room of the home. In some cases, the second set of image data may contain high dynamic range data that may be used to characterize lighting, color, textures, and occlusion effects of objects within the second room.

At 1708, the spatial interaction system may generate a second spatial or 3D model of the second physical environment (e.g., the second room) using the second set of image data. For example, the second 3D model may be formed in a manner similar to that of the first 3D model discussed above.

At 1710, the spatial interaction system may be configured to receive a third set of image data of a third physical environment, such as a third room of the home. In some cases, the third set of image data may again contain high dynamic range data that may be used to characterize lighting, color, textures, and occlusion effects of objects within the second room.

At 1712, the spatial interaction system may generate a third spatial or 3D model of the third physical environment (e.g., the third room) using the second set of image data. For example, the third 3D model may be formed in a manner similar to that of the first 3D model discussed above.

At 1714, the spatial interaction system may display the first 3D model, the second 3D model, and the third 3D model to the user. For example, the user may indicate that the first, second, and third 3D models are each associated with the same larger physical environment (e.g., the home). In another example, the spatial interaction system may determine from the image data that the first, second, and third 3D models are each associated with the same larger physical environment.

At 1716, the spatial interaction system may receive a user input associating the first model with the second model and, at 1718, the spatial interaction system may orient and align the first model with the second model based at least in part on the user input and the model data. For example, the user may draw align connecting a doorway associated with the first model to a doorway associated with the second model. The spatial interaction system may then align the first 3D model with the second 3D model by aligning the doorways. In another example, the user may select and rotate the second 3D model to align correctly with the first 3D model and then drag and drop the second 3D model into place adjacent to the first 3D model.

At 1720, the spatial interaction system may receive a user input associating the first and second model with the third model and, at 1722, the spatial interaction system may orient and align the third 3D model with the first and second 3D model based at least in part on the user input and the model data. For example, the user may draw align connecting a doorway associated with the first or second model to a doorway associated with the third model. The spatial interaction system may then align the first or second 3D model with the third 3D model by aligning the doorways. In another example, the user may select and rotate the third 3D model to align correctly with the first or second 3D model and then drag and drop the third 3D model into place adjacent to the first and/or second 3D model.

At 1724, the spatial interaction system may generate a doll house view or connected 3D model from the aligned first, second, and third 3D model. For example, the lager or combined 3D model may be converted to an overhead view that always a user to view the 3D model as a doll house view.

Figure 18:
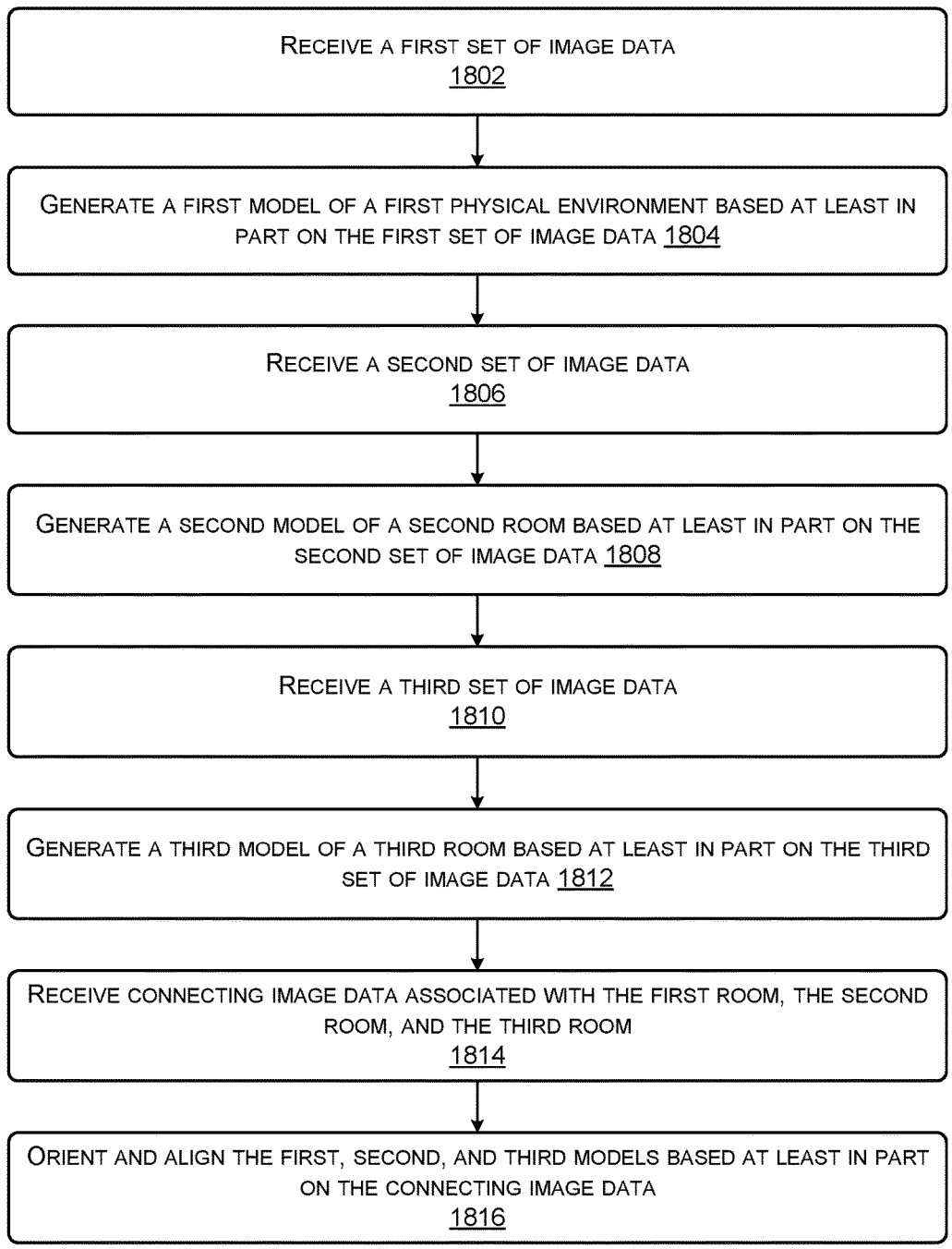
FIG. 18 is another example flow diagram showing an illustrative process for connecting or combining 3D models according to some implementations.

FIG. 18 is another example flow diagram showing an illustrative process 1800 for connecting or combining 3D models according to some implementations. For example, as discussed above, the spatial interaction system may generate 3D sub-models or 3D models of individual rooms based on captured image data. In some situations, a user may desire to connect or otherwise combine the 3D sub-models into a larger 3D model, such as when generating a doll house view or walkthrough of a home. In the current example, the spatial interaction system may be configured to connect the 3D sub-models into a larger 3D model using connecting image data collected as the user moves from room to room while capturing video data or a series of images.

At 1802, the spatial interaction system, either operating on a local device (e.g., a mobile device capable of capturing image data) or on a remote cloud based server, may be configure to receive a first set of image data of a first physical environment, such as a first room of a home. In some cases, the first set of image data may contain high dynamic range data that may be used to characterize lighting, color, textures, and occlusion effects of objects within the first room.

At 1804, the spatial interaction system may generate a first spatial or 3D model of the first physical environment (e.g., the first room) using the first set of image data. For example, the first 3D model may be formed by generating a scanned mesh from the first set of image data. The spatial interaction system may then utilize the scanned mesh to detect major planar segments using a plane detection technique, such as a Hough voting scheme or random sample consensus. Then the spatial interaction system may for each segment, compute the segments planar normal and offsets. The spatial interaction system then utilizes at least one of clustering, iterations over pairs of segments, or iteration over normal or offsets to identify pairs of segments with approximately the same planar normal and offsets. In some examples, the spatial interaction system may apply one or more thresholds to determine if a pair of segments are within the same planar normal and offsets. In this example, for each pair of segments identified, the spatial interaction system determines that the pair is connected and completes the missing geometry between the segments of the pair. For instance, the spatial interaction system may find the lowest and highest points within the two segments, the right most edge of the left-most segment, and the left-most edge of the right-most segment and then complete the intermediate region with a selected mesh. The spatial interaction system may continue to cycle or loop to connect other geometries in the first 3D model by determining if each pair of geometries intersect and competing the geometry by selectin a mesh. the filled-in geometry. In some specific examples, the spatial interaction system may determine whether potential completed plane has a hole by detecting errors within the depth data of surfaces of a geometry when viewed from the front. In some situations, a geometry may not connect to the ground plane. In this situation, the spatial interaction system may extrapolate rays of lines from the camera at a plurality of locations and, if no lines intersect with the observed geometry beyond where the wall is to be extended, the spatial interaction system may extend the wall to the ground plane.

At 1806, the spatial interaction system may be configure to receive a second set of image data of a second physical environment, such as a second room of the home. In some cases, the second set of image data may contain high dynamic range data that may be used to characterize lighting, color, textures, and occlusion effects of objects within the second room.

At 1808, the spatial interaction system may generate a second spatial or 3D model of the second physical environment (e.g., the second room) using the second set of image data. For example, the second 3D model may be formed in a manner similar to that of the first 3D model discussed above.

At 1810, the spatial interaction system may be configured to receive a third set of image data of a third physical environment, such as a third room of the home. In some cases, the third set of image data may again contain high dynamic range data that may be used to characterize lighting, color, textures, and occlusion effects of objects within the second room.

At 1812, the spatial interaction system may generate a third spatial or 3D model of the third physical environment (e.g., the third room) using the second set of image data. For example, the third 3D model may be formed in a manner similar to that of the first 3D model discussed above.

At 1814, the spatial interaction system may receive connecting image data associated with the first room, the second room, and the third room. For instance, the user may capture connecting image data by collecting video or a series of images of the physical enjoinment (e.g., the home) as the user moves from room to room.

At 1816, the spatial interaction system may orient and align the first, second, and third models based at least in part on the connecting image data. For example, the spatial interaction system may execute a matching algorithm to analyze the connecting image data to determine which 3D model scans are associated with the connecting image data. Once the 3D models (e.g., the first, second, and third models) are matched to the connecting image data, the coordinates of the connecting image data and first, second, and third models are matched or aligned based on a global reference axis associated with the connecting image data (or a 3D model generated from the connecting image data). Once, the coordinates are aligned each of the first, second, and third models may be positioned with respect to each other.

Figure 19:
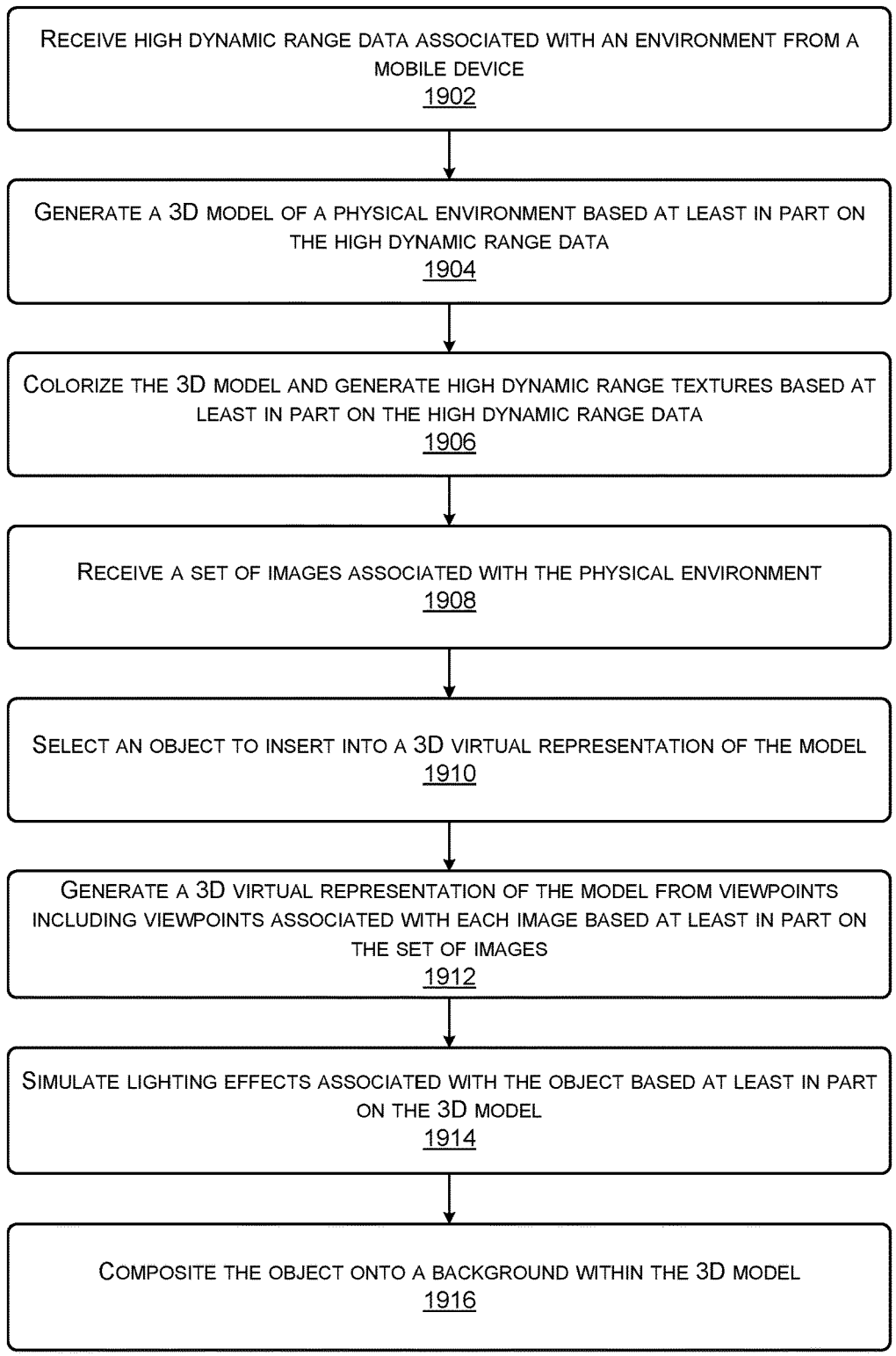
FIG. 19 is another example flow diagram showing an illustrative process for rendering a viewpoint specific object within a 3D virtual representation according to some implementations.

FIG. 19 is another example flow diagram showing an illustrative process 1900 for rendering a viewpoint specific object within a 3D virtual representation according to some implementations. For example, in some instances, objects other than those existing the physical environment may be added to a 3D virtual representation of the physical environment. For instance, to allow a user or homeowner to visual the object within their home prior to purchasing.

At 1902, the spatial interaction system, either operating on a local device (e.g., a mobile device capable of capturing image data) or on a remote cloud based server, may receive high dynamic range data associated with an environment from a mobile device. For example, the user may scan or capture images of the physical environment using a mobile device or a scanner system attached or coupled to a mobile device to capture the high dynamic range data. In some cases, the high dynamic range data may be captured using a high dynamic range camera. In other cases, the mobile device may be equipped with shutter speed, aperture size, and ISO setting instructions, which may cause the mobile device to capture high dynamic range data using a conventional camera by adjusting the shutter speed, aperture size, and ISO settings based at least in part on detected lighting conditions within the physical environment at the time the image data is captured.

At 1904, the spatial interaction system may generate a 3D model of the physical environment based at least in part on the high dynamic range data. For example, the spatial interaction system may generate a scanned mesh from the high dynamic range data. The spatial interaction system may then utilize the scanned mesh to detect major planar segments using a plane detection technique, such as a Hough voting scheme or random sample consensus. Then the spatial interaction system may for each segment, compute the segments planar normal and offsets. The spatial interaction system then utilizes at least one of clustering, iterations over pairs of segments, or iteration over normal or offsets to identify pairs of segments with approximately the same planar normal and offsets. In some examples, the spatial interaction system may apply one or more thresholds to determine if a pair of segments are within the same planar normal and offsets. In this example, for each pair of segments identified, the spatial interaction system determines that the pair is connected and completes the missing geometry between the segments of the pair. For instance, the spatial interaction system may find the lowest and highest points within the two segments, the right most edge of the left-most segment, and the left-most edge of the right-most segment and then complete the intermediate region with a selected mesh. The spatial interaction system may continue to cycle or loop to connect other geometries in the first 3D model by determining if each pair of geometries intersect and competing the geometry by selectin a mesh. the filled-in geometry. In some specific examples, the spatial interaction system may determine whether potential completed plane has a hole by detecting errors within the depth data of surfaces of a geometry when viewed from the front. In some situations, a geometry may not connect to the ground plane.

In this situation, the spatial interaction system may extrapolate rays of lines from the camera at a plurality of locations and, if no lines intersect with the observed geometry beyond where the wall is to be extended, the spatial interaction system may extend the wall to the ground plane.

At 1906, the spatial interaction system may colorize the 3D model and generate high dynamic range textures based at least in part on the high dynamic range data and, at 1908, the spatial interaction system may determine lighting characters and occlusion characterizes associated with the 3D model based at least in part on the high dynamic range textures. In this example, 1906 and 1904 are shown as independent blocks, however, in some implementations, the spatial interaction system may be configured to colorize the 3D model at the time the 3D model is generated. In other implementations, the 3D model may be generated, then colorized, then the 3D model may be retouched or regenerated based at least in part on the colorization that occurred at 1906.

At 1908, the spatial interaction system may receive a set of image associated with the physical environment, such as a first room of a home. For example, the user may desire to generate a 3D virtual representation or walkthrough of the physical environment using the 3D model generated from the high dynamic range data.

At 1910, the spatial interaction system may select an object to inset into the 3D virtual representation. For example, the spatial interaction system may select the object based on information known about the user (e.g., user preferences, demographic information, buying habits, etc.), data associated with the set of image or 3D model, information known about the object, information about the user or object received from a third-party.

At 1912, the spatial interaction system may generate a 3D virtual representation of the model from viewpoints including viewpoints associated with each image based at least in part on the set of image. For example, the spatial interaction system may locate or position each image within the 3D model based on a camera pose determined based on position data, such as IMU data, obtained at the time each image was captured. Thus, each image may be used to create a 3D experience in which the visual quality is photorealistic as each viewpoint may be formed from the camera pose and show the content of the captured image. In some cases, images may be overlapped on top of each other show the same perspective or viewpoint at different times of day or dates of the year. In this manner, the viewpoint may be able to represent the lighting effects and colorations at night, at high noon, and in the evening. Additional, the viewpoints may represent the environment both in the winter and during the summer as the position of the sun relative to the windows changes day to day and during each seasons. In some cases, the walkthrough may contain viewpoints that are unrelated to the set of images. In these cases, the spatial interaction system may render the background information based on the viewpoint and the 3D model.

At 1914, the spatial interaction system may simulate lighting effects caused by the rendering or insertion of the object into the environment. For example, the spatial interaction system may utilize ray tracing based on the 3D model (e.g., lighting position, lighting type, information about articles surrounding the rendered object, etc.) and data known about the object (e.g., texture, surface shape, surface material, etc.). in other examples the spatial interaction system may utilize geometries of the articles in the surrounding environment, radiosity techniques, ray casting, image based lighting techniques, among others.

In some cases, simulate lighting effects caused by the rendering or insertion of the object into the environment may include simulating lighting effects, including rendering the object using realistic lighting based at least in part on the 3D model and associated high dynamic range data, as well as simulating the effects of the object's presence on other illumination in the real scene. Further, in this example, 1912 and 1914 are shown as independent blocks, however, in some implementations, the spatial interaction system may be configured to perform operations associated with 1912 and 1914 in conjunction.

At 1916, the spatial interaction system may composite the object onto a background within the 3D model. For example, the spatial interaction system may generate a viewpoint dependent rendering of the object for each view point of the walkthrough containing the object based at least in part on the lighting characteristics, occlusion characteristics, color characteristics. For example, since the camera pose or position within the 3D model is know for each viewpoint of the walkthrough and the lighting characteristics, occlusion characteristics, color characteristics of the camera pose and/or position is also known within the 3D model, the object may be rendered with substantially photorealistic quality by applying the perspective, lighting effects, color effects, and/or occlusion effects to the object. In some cases, if the object has a reflective surface, the reflection on the surface may also be generated with substantially photorealistic quality by utilizing the lighting characteristics, occlusion characteristics, color characteristics as viewed from the position of the camera pose within the 3D model. In some cases, compositing the object into a background may also include simulating effects of shadowing and other effects caused by the introduction of the virtual object into the model on other objects and surfaces within the 3D model. For example, the object may block light falling onto a surface from a nearby window which would require updating the surface to reflect the shadowing caused by the object.

Figure 20:
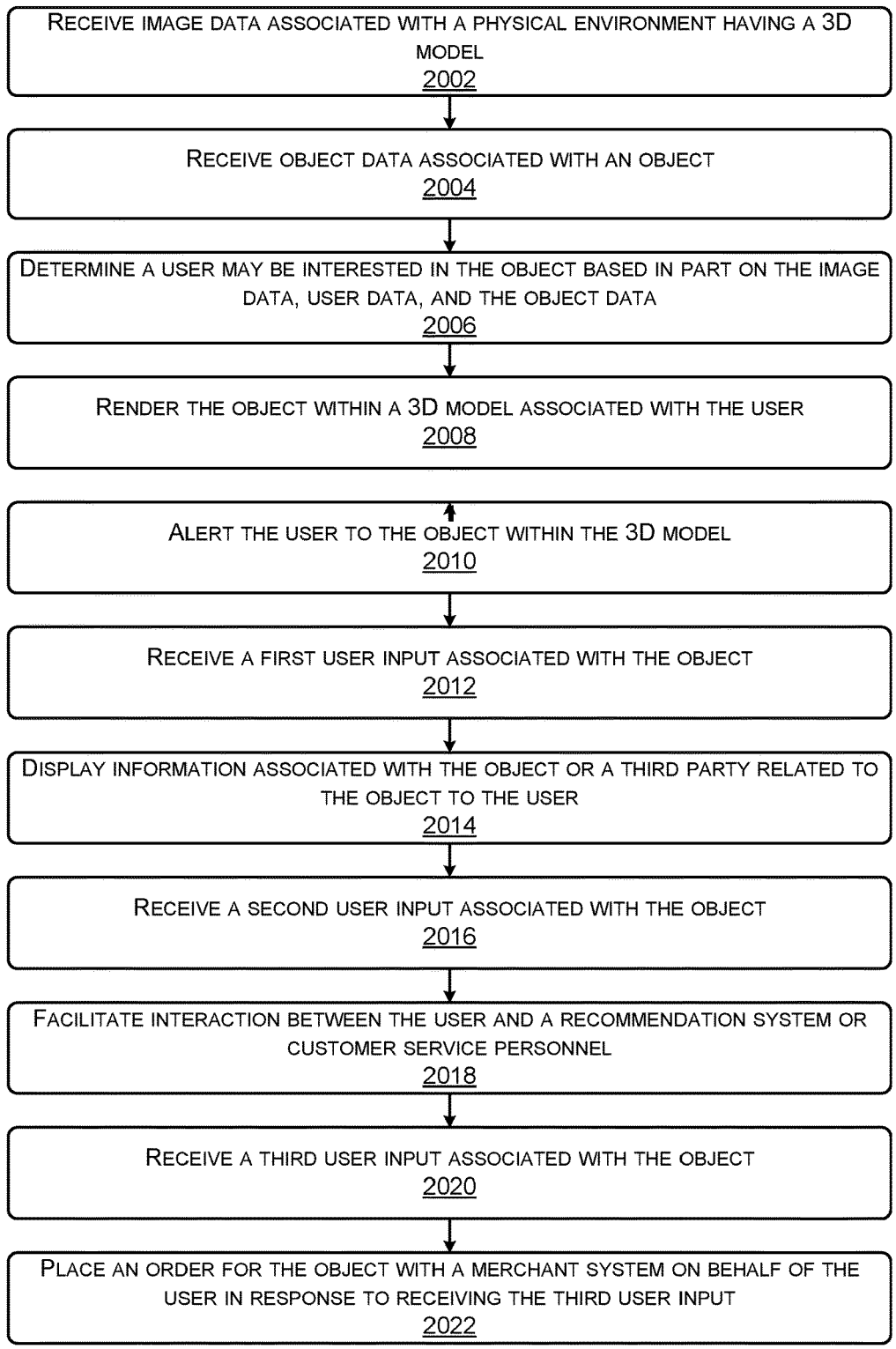
FIG. 20 is another example flow diagram showing an illustrative process for rendering a viewpoint specific object within a 3D virtual representation according to some implementations.

FIG. 20 is another example flow diagram showing an illustrative process 2000 for rendering a viewpoint specific object within a 3D virtual representation according to some implementations. For example, in some instances, objects other than those existing the physical environment may be added to a 3D virtual representation of the physical environment. For instance, to allow a user or homeowner to visual the object within their home prior to purchasing.

At 2002, the spatial interaction system, either operating on a local device (e.g., a mobile device capable of capturing image data) or on a remote cloud based server, may receive image data associated with a physical environment having a 3D model. For example, the user may desire to generate a 3D virtual representation or walkthrough of the physical environment using the 3D model, as discussed above.

At 2004, the spatial interaction system may receive object data associated with an object. For example, a third-party merchant system may provide the object data for an object that is available for purchase. The object data may include CAD or rendering instructions, object price, object costs, object dimensions, available styles, makes, models, etc., object specifications and characteristics, object functionally if any, object manufacture, object history, among others.

At 2006, the spatial interaction system may determine that a user may be interested in the object based in part on the image data, user data, and the object data. For example, the spatial interaction system may detect a second object related to the object (such as an older version of the object or a related object) within the image data. In other cases, the spatial interaction system may know from the user preferences or contextual information known about the user that the user has an interest in horse figurines, art work form a particular artist, or election devices from a particular manufacture. In some cases, the user preferences may include demographic information, such as age, gender, sex, social economic status, etc. that may be utilized to determine that the user may desired the object.

At 2008, the spatial interaction system may render the object within a 3D model associated with the user. For example, if the user has a walkthrough of the physical environment that the user is currently accessing, the spatial interaction system may cause the object to be rendered within the walkthrough. In some cases, the position of the object rendered within the 3D model may be based on proximity to other objects (e.g., an outlet, window, etc.), lighting characteristics, acoustic characteristics, properties of other objects in the environment (e.g., materials, surfaces, open space, etc.).

At 2010, the spatial interaction system may alert the user to the object within the 3D model. For example, since the object may be rendered using the 3D model and the camera pose associated with various viewpoints of the walkthrough, as discussed above, the object may be rendered in a manner that the user could easily miss or overlook the insertion of the object into the walkthrough. Thus, in some cases, the spatial interaction system may highlight, annotate, or otherwise mark the rendered object to bring the object to the awareness of the user. For example, the spatial interaction system may insert an annotation to the viewpoints associated with the rendered object including 360° view, multiple images of the product, and textual content related to the object (e.g., at least some of the object data). In another example, the spatial interaction system may cause the device the user is using to consume the walkthrough to emit an audible noise to alert the user to the presence of the rendered object.

At 2012, the spatial interaction system may receive a first user input associated with the object, and at 2014, the spatial interaction system may display information associated with the object or a third party related to the user. For example, the user may select the object by touching the object on a touch sensitive surface, selecting via a control or input device, etc. and the spatial interaction system may cause a textual annotations, visual annotations, or audio annotations to be displayed to the user. In other examples, the spatial interaction system may present object data or links to third party system that the user can view additional information about the object at. In one case, the spatial interaction system may display information associated with a third party related to the object such as a designer that may help select an object for purchase or a retailer that offers the object for sale.

At 2016, the spatial interaction system may receive a second user input associated with the object, and at 2018, the spatial interaction system facilitate interaction between the user and a recommendation system or customer service personnel. For example, in some cases, the object may be of interest to the user but not quite the right ascetics or exactly the product the user is looking for. In these examples, the spatial interaction system may connect the user with a recommendation system or individual that may help with the selection of an object (such as furniture for the user's environment).

may place an order for the new version of the object with a merchant system on behalf of the user in response to receiving the third user input. For example, the spatial interaction system may contact a third-party system that provided the object data to request that the object be purchased by the user and delivered to an address associated with the user.

At 2022, the spatial interaction system may receive a third user input associated with the object, and at 2022, the spatial interaction system may place an order for the new version of the object with a merchant system on behalf of the user in response to receiving the third user input. For example, the spatial interaction system may contact a third-party system that provided the object data to request that the object be purchased by the user and delivered to an address associated with the user.

Figure 21:
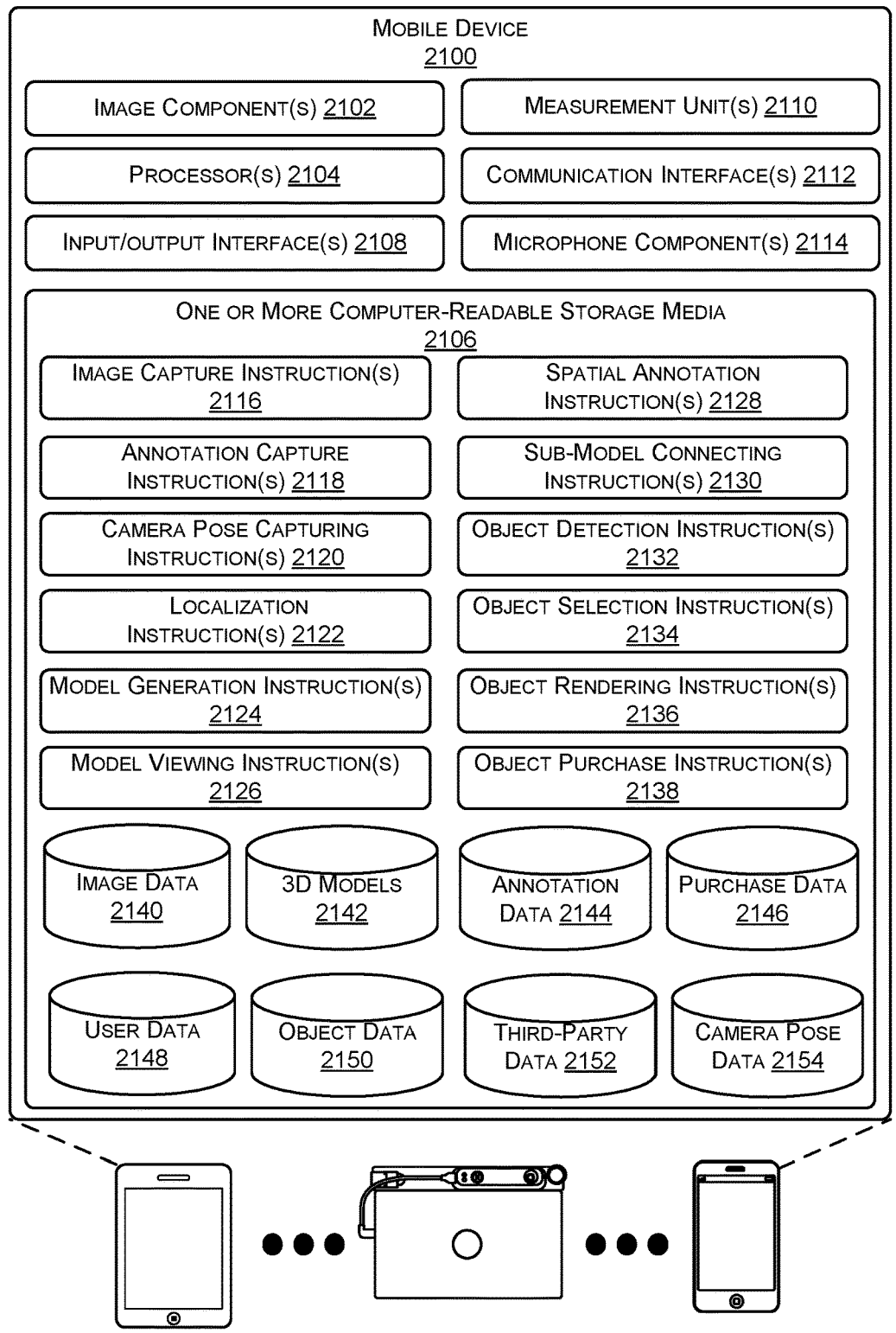
FIG. 21 is an example mobile device configured to generate 3D models and/or 3D virtual representations of a physical environment according to some implementations.

FIG. 21 is an example mobile device 2100 configured to generate 3D models and/or 3D virtual representations of a physical environment according to some implementations. In the current example, the mobile device 2100 is a portable electric device, such as tablets, netbooks, laptops, cell phones, mobile phones, smart phones, etc. that includes image capture components 2102, processing and storage resources, such as processors 2104, and storage devices, such as computer-readable storage media 2106, and at least one display 2108.

In the current example, the mobile device 2100 may include image components 2102 for capturing visual data, such as images or frames, from a physical environment. For example, the image components 2102 may be positioned to capture multiple image from the perspective of the mobile device 2100. As discussed above, the image components 2102 may be of various sizes and quality, for instance, the image components 2102 may include one or more wide screen cameras, 3D cameras, high definition cameras, video cameras, among other types of cameras. In some instances, the image components 2102 may include components capable of capturing high dynamic range data and/or depth data. In other instances, the image components 2102 may be configured to capture low dynamic range data.

In the illustrated example, the mobile device 2100 also includes one or more input/output interfaces 2108. The input/output interfaces 2108, generally, are for presenting information or data and for receiving user inputs. The input/output interfaces 2108 may include one or more output components, such as a display or touch screen, and one or more input components, such as keyboards, keypads, joysticks, a mouse, a touch screen, touch pad, drawing pad, or control buttons. In some implementations, the output components and input components are combined in a single input/output interfaces 2108 to provide a touch-sensitive display, or touch screen display. For instance, in the illustrated example, the input/output interfaces 2108 includes one or more displays for presenting information, such as electronic content items, to a user, one or more sensors for accepting input resulting from contact and/or application of incident force, such as a user finger or stylus pressing upon one of the sensor. In some specific implementations, the mobile device 2100 may be configured to receive user inputs by communicating with an active stylus. For example, the active stylus and the input/output interfaces 2108 may actively exchange data related to the user inputs. In some cases, the sensors may be a touch sensor couple to a touch layer. In this case, the touch sensor is configured to determine characteristics of user interaction with the input/output interfaces 2108. These characteristics may include the location of the touch on the input/output interfaces 2108, magnitude of the force, shape of the touch, and so forth. In some implementations, the input/output interfaces 2108 may present content in a human-readable format to a user (e.g., a 3D virtual representation of an environment and/or 3D model).

The input/output interfaces 2108 may be reflective, emissive, or a combination of both.

As discussed above, in some cases, such as when the camera pose is utilized to position image data within a 3D model, the mobile device 2100 may be equipped with one or more measurement units 2110. The measurement units 2110 may be configured to collect data (e.g., the position data) associated with the camera pose at the time an image is captured by the image components 2102. In some cases, the position data may include acceleration data, angular momentum data, pitch data, roll data, yaw data, etc. In one example, the measurement units 2110 may include one or more IMUs, one or more accelerometers, one or more gyroscopes, one or more magnetometers, and/or one or more pressure sensors, as well as other sensors. In one particular example, the measurement units 2110 may include three accelerometers placed orthogonal to each other, three rate gyroscopes placed orthogonal to each other, three magnetometers placed orthogonal to each other, and a barometric pressure sensor.

The mobile device 2100 may also include one or more communication interfaces 2112 configured to facilitate communication between one or more networks, one or more cloud-based system, and/or one or more image systems, such as image system 104 of FIG. 1. The communication interfaces 2112 may also facilitate communication between one or more wireless access points, a master device, and/or one or more other computing devices as part of an ad-hoc or home network system. The communication interfaces 2112 may support both wired and wireless connection to various networks, such as cellular networks, radio, WiFi networks, short-range or near-field networks (e.g., Bluetooth®), infrared signals, local area networks, wide area networks, the Internet, and so forth. In some cases, the communication interfaces 2112 may be configured to send image data, annotation data, and/or camera poses associated with a physical environment to a remote processing system.

The mobile device 2100, generally, includes one or more speakers (not shown) to reproduce audio signals as sound into an environment and one or more microphones 2114 to capture sound from the environment and convert the sound into audio signals. The microphones 2114 may be a microphone array, a calibrated group of microphones, or multiple microphone arrays or calibrated groups. In some examples, microphones 2114 may be incorporated with an analog-to-digital converter to convert the sound into digital microphone output signals for processing. In generally, the microphones 2114 may be configured to activate in response to the image components 2102 capturing image data of a physical environment, such that the audio data may be utilized as an annotation to the image data within a 3D model.

The one or more processors 2104, such as at least one or more access components, control logic circuits, central processing units, or processors, as well as one or more computer-readable media 2106 to perform the function associated with the virtual environment. Additionally, each of the processors 2104 may itself comprise one or more processors or processing cores.

Depending on the configuration, the computer-readable media 2106 may be an example of tangible non-transitory computer storage media and may include volatile and non-volatile memory and/or removable and non-removable media implemented in any type of technology for storage of information such as computer-readable instructions or modules, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processors 2104.

Several modules such as instruction, data stores, and so forth may be stored within the computer-readable media 2106 and configured to execute on the processors 2104. For example, as illustrated, the computer-readable media 2106 may store image capture instructions 2116, annotation capture instructions 2118, camera pose capturing instruction 2120, location instructions 2122, model generation instructions 2124, model viewing instructions 2126, spatial annotation instruction 2128, sub-model connecting instructions 2130, object detection instructions 2132, object selection instructions 2134, object rendering instructions 2136, and object purchase instructions 2138. In some cases, the computer readable storage media 2106 may also store data, such as image data 2140 captured by the image components 2102, 3D models 2142, annotation data 2144 such as data captured by the microphone 2114, purchasing data 2146 (e.g., credit card information), user data 2148, object data 2150, third-party data 2152, and/or camera pose data 2154.

The capture instructions 2116 may be configured to control the image components 2102 to cause the image components to capture high dynamic range data, annotation data 2144, or other information about an physical environment. For example, the image capture instructions 2116 may control the shutter speed, aperture size, and ISO setting based on lighting at the time the image is being captured to simulate or replicate using a high dynamic range camera to capture the image. In some cases, capture instructions 2116 may control a low-dynamic-range capture device to acquire images in different parts of the scene's dynamic range (adjusting exposure, gain), and be combined to form high dynamic range data The annotation capture instructions 2118 may cause the microphones 2114 or other components of the mobile device 2100 to capture supplemental information to an image being capture by the image components 2102. For example, the annotation capture instructions 2118 may activate the other components of the mobile device 2100 in response to the camera components 2102 capturing an image or video data of an environment.

The camera pose capturing instruction 2120 may be configured to cause the measurement units 2110 to capture position data associated with the mobile device 2100 at the time the mobile device 2100 captures an image. In the manner, the mobile device 2100 may utilize the position data and the image data 2140 to determine the camera pose data 2154 for each image captured. In some cases, the camera pose capturing instruction 2120 may utilize as a simultaneous localization and mapping technique to determine the camera pose 2154 at the time an image is captured.

The location instructions 2122 may receive the images data 2140 and/or camera pose data 2154, and utilize the image data 2140 and/or camera pose data 2154 to localize the mobile device 2100 and within a 3D model or 3D virtual representation. For example, the location instructions 2122 may utilize position data, camera pose, IMU data, visual data within the image, and/or depth data associated with the image to determine a viewpoint within the 3D model associated with each image captured by the mobile device 2100.

The model generation instructions 2124 may generate the 3D models 2142 using the high dynamic range data captured by the image components 2102. The model generation instructions 2124 may then utilize the scanned mesh to detect major planar segments using a plane detection technique, such as a Hough voting scheme or random sample consensus. Then the model generation instructions 2124 may for each segment, compute the segments planar normal and offsets. The spatial interaction system then utilizes at least one of clustering, iterations over pairs of segments, or iteration over normal or offsets to identify pairs of segments with approximately the same planar normal and offsets. In some examples, model generation instructions 2124 may apply one or more thresholds to determine if a pair of segments are within the same planar normal and offsets. In this example, for each pair of segments identified, the spatial interaction system determines that the pair is connected and completes the missing geometry between the segments of the pair. For instance, model generation instructions 2124 may find the lowest and highest points within the two segments, the right most edge of the left-most segment, and the left-most edge of the right-most segment and then complete the intermediate region with a selected mesh. The model generation instructions 2124 may continue to cycle or loop to connect other geometries in the doll house view by determining if each pair of geometries intersect and competing the geometry by selectin a mesh. the filled-in geometry. In some specific examples, the model generation instructions 2124 may determine whether potential completed plane has a hole by detecting errors within the depth data of surfaces of a geometry when viewed from the front. In some situations, a geometry may not connect to the ground plane. In this situation, the model generation instructions 2124 may extrapolate rays of lines from the camera at a plurality of locations and, if no lines intersect with the observed geometry beyond where the wall is to be extended, the model generation instructions 2124 may extend the wall to the ground plane.

The model viewing instructions 2126 may cause a 3D virtual representation or 3D model to be displayed on the input/output interface 2108. For example, the model viewing instructions 2126 may allow the user to control an experience of navigating or traversing the 3D virtual representation or 3D model. In some cases, the model viewing instructions 2126 may allow the user to interact with objects within the 3D virtual representation or 3D model.

The spatial annotation instruction 2128 may be used to position annotation data 2144 using the camera pose 2120. For example, the annotation data 2144 may be placed on an object within a 3D model 2140 or with respect to a particular viewpoint within the 3D model. In one specific example, the spatial annotation instruction 2128 may locate an annotation such as a video or audio sequence with a trajectory within the 3D model. For example, if a user captures video and/or audio data as the user moves through the physical environment, the spatial annotation instruction 2128 may tie the video data and/or audio data to a trajectory matching the trajectory of the mobile device 2100 through the physical environment, such that the viewer experiences the video content and audio content as an annotation to the 3D model as the trajectory is traversed within the virtual environment.

The sub-model connecting instructions 2130 receive video or successive still image data from the camera components 2102, as the user walks or moves from room to room (e.g., sub-model to sub-model). In this example, the sub-model connecting instructions 2130 may determine a camera pose 2154 relative to the 3D sub-models. The sub-model connecting instructions 2130 may then utilize the pose and the image data to align and orient each 3D sub-model with each other to generate the larger 3D model of the full physical environment. In another example, the sub-model connecting instructions 2130 may analyze the image data collected to identify the 3D sub-models in a successive order corresponding to the order the image data was captured. In this example, the sub-model connecting instructions 2130 may utilize the image data to orient each 3D sub-model with each other to generate the larger 3D model of the full physical environment.

In another example, the sub-model connecting instructions 2130 may cause 3D sub-models to be displayed to the user on the input/output interfaces 2108, the user may connected the 3D sub-models in a desired manner using the input/output interfaces 2108. For instance, in the current example, the user may have connected 3D sub-model by drawing a line between a first 3D sub-model and a second sub-model or dragging and dropping the first 3D sub-model next to the second 3D sub-model. In some instance, the user may indicate connecting doorways or opening of the first 3D sub-models and the second 3D sub-model to cause the 3D sub-models to correctly align with each other.

The object detection instructions 2132 may be configured to detect objects within the image data 2140 received from a physical environment, such as physical environment. In some cases, the objects within the image data 2140 may be isolated and an object identify may be determined, such as a make and model of a television. For instance, the object detection instructions 2132 may detect any visible labels for identification information visible in the image data 2150, access third party systems to compare image data 2150 of the object with images of objects or products associated with the third-party systems, or compare the image data 2140 to stored image data 2140 and object data 2150.

The object selection instructions 2134 may be configured to select an object 1428 based on the user data 2148 and the object data 2150 to render within a 3D virtual representation of an environment being generated for the user. In some cases, the object selection instructions 2134 may select an object to render within the 3D virtual representation based at least in part on the objects detected within the image data 2140 by the object detection instructions 2132.

The object rendering instructions 2136 may be configured to render objects within the 3D virtual representation from a viewpoint specific position or perspective. For example, an object selected by the object selection instructions 2134 may be rendered using the model data 2142 (e.g., to simulate lighting, shading, color, etc.) based on at least one camera pose 2154 associated with the image data 2140 being used to create the 3D virtual representation or walkthrough. In some cases, the object rendering instructions 2136 may cause the selected object to be rendered using the high dynamic range data, high dynamic range textures, color characteristics, lighting characteristics, and occlusion characteristics associated with a corresponding 3D model. For instance, the object rendering instructions 2136 may simulate lighting effects caused by the rendering or insertion of the object into the 3D virtual representation. For example, the object rendering instructions 2136 may utilize ray tracing based on the 3D model 2142 (e.g., lighting position, lighting type, information about articles surrounding the rendered object, etc.) and the object data 2150 (e.g., texture, surface shape, surface material, etc.). In other examples the object rendering instructions 2136 may utilize geometries of the articles in the surrounding environment, radiosity techniques, ray casting, image based lighting techniques, among others to render the object. Thus, the object rendering instructions 2136 may render the object from the perspective associated with each viewpoint of a walkthrough with the correct coloring, lighting, and occlusion effects.

The object purchase instructions 2138 may be configured to purchase the select object on behalf of the user. In some cases, the mobile device 2100 may cause the user to be alerted to the object within the 3D virtual representation rendered on the input/output interface 2108 and to allow the user to view data (e.g., make, model, price, specification, etc.) of the object while viewing the 3D virtual representation. In some cases, the user to enter purchase instructions 2138 (e.g., credit or debit card information) and to transmit the purchase instructions 2138 to a third-party system.

In some cases, the object purchase instructions 2138 may also include retargeting or object purchase follow up instructions. For example, in some cases, a user may view data related to the object within the 3D virtual representation but fail to purchase the object itself. In these examples, the object purchase instruction 2138 may be configured to generate an online advertising campaign to cause ads for the object to appear in third-party systems or webpages, cause an email campaign related to the object to be directed to the user of the 3D model, or provide information to a third party to conduct a retargeting campaign. In some instances, the object purchase instructions 2138 may also provide information to purchase related objects or services when the user is viewing the object information within the 3D model or 3D virtual representation. For example, the system 1402 may promote the user to connect to an interior decorate to assist with selecting furniture for the user's home.

Figure 22:
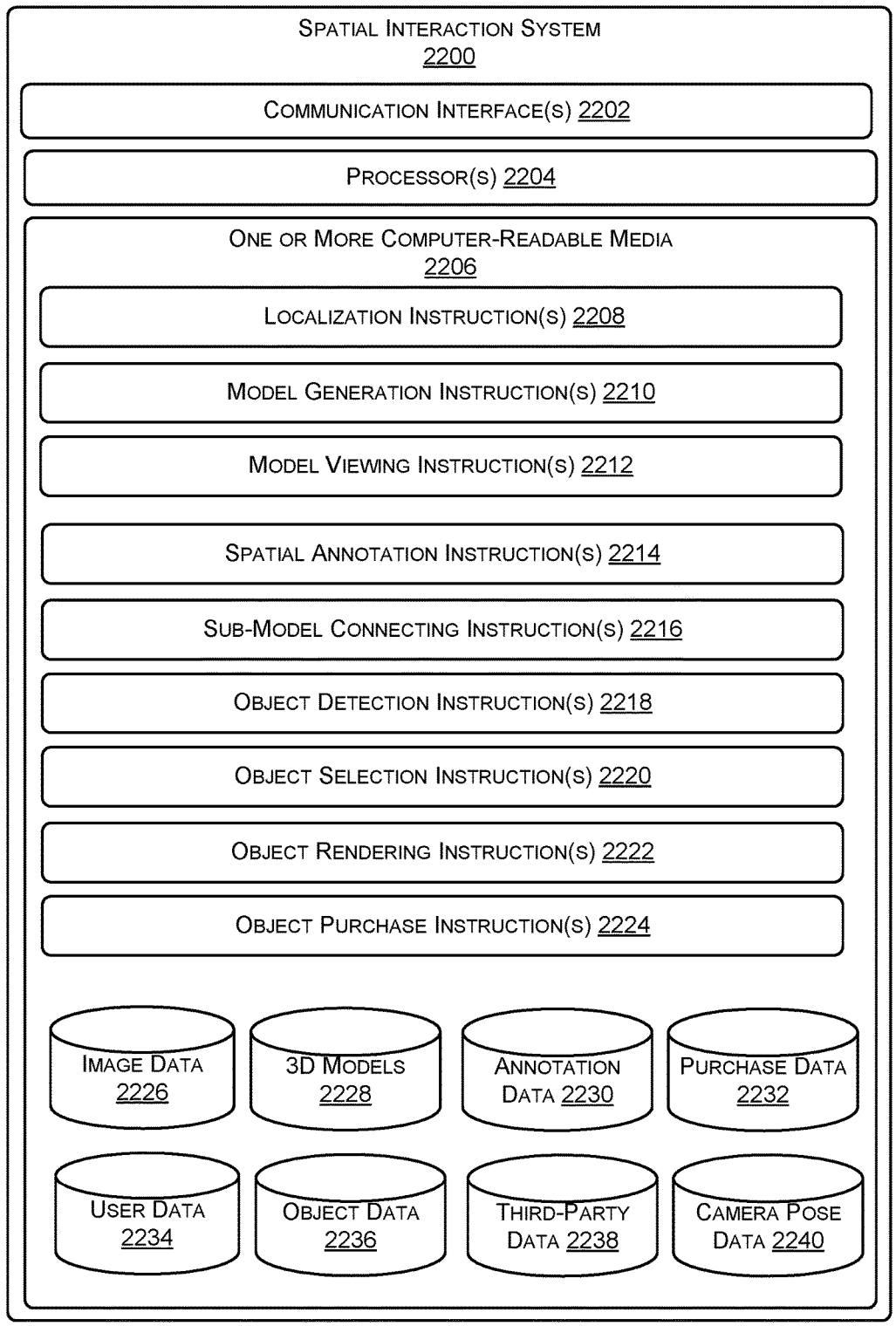
FIG. 22 is an example cloud based service associated with a spatial interaction system configured to generate 3D models and/or 3D virtual representations of a physical environment according to some implementations.

FIG. 22 is an example cloud based service associated with a spatial interaction system 2200 configured to generate 3D models and/or 3D virtual representations of a physical environment according to some implementations. In the current example, the spatial interaction system 2200 is a cloud based service that may be configured to perform some portion of the computing associated with rendering 3D virtual representations and/or 3D models discussed herein.

The spatial interaction system 2200 may also include one or more communication interfaces 2202 configured to facilitate communication between one or more networks, one or more cloud-based system, and/or one or more mobile devices. The communication interfaces 2202 may also facilitate communication between one or more wireless access points, a master device, and/or one or more other computing devices as part of an ad-hoc or home network system. The communication interfaces 2202 may support both wired and wireless connection to various networks, such as cellular networks, radio, WiFi networks, short-range or near-field networks (e.g., Bluetooth®), infrared signals, local area networks, wide area networks, the Internet, and so forth. In some cases, the communication interfaces 2202 may be configured to send image data, annotation data, and/or camera poses associated with a physical environment to a remote processing system.

The one or more processors 2204, such as at least one or more access components, control logic circuits, central processing units, or processors, as well as one or more computer-readable media 2206 to perform the function associated with the virtual environment. Additionally, each of the processors 2204 may itself comprise one or more processors or processing cores.

Depending on the configuration, the computer-readable media 2206 may be an example of tangible non-transitory computer storage media and may include volatile and non-volatile memory and/or removable and non-removable media implemented in any type of technology for storage of information such as computer-readable instructions or modules, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processors 2204.

Several modules such as instruction, data stores, and so forth may be stored within the computer-readable media 2206 and configured to execute on the processors 2204. For example, as illustrated, the computer-readable media 2206 may store location instructions 2210, model generation instructions 2212, model viewing instructions 2214, spatial annotation instruction 2216, sub-model connecting instructions 2218, object detection instructions 2220, object selection instructions 2222, object rendering instructions 2224, and object purchase instructions 2226. In some cases, the computer readable storage media 2206 may also store data, such as image data 2226 captured by the image components 2228, 3D models 2230, annotation data 2232 such as data captured by a microphone, purchasing data 2236 (e.g., credit card information), user preference data 2238, object data 2240, third-party data 2242, and/or camera pose data 2244.

The location instructions 2210 may receive the images data 2226 and/or camera pose data 2154, and utilize the image data 2140 and/or camera pose data 2154 to localize the mobile device 2100 and within a 3D model or 3D virtual representation. For example, the location instructions 2122 may utilize position data, camera pose, IMU data, visual data within the image, and/or depth data associated with the image to determine a viewpoint within the 3D model associated with each image captured by a mobile device in the physical environment.

The model generation instructions 2210 may generate the 3D models 2228 using the high dynamic range data captured by a mobile device. The model generation instructions 2210 may then utilize the scanned mesh to detect major planar segments using a plane detection technique, such as a Hough voting scheme or random sample consensus. Then the model generation instructions 2210 may for each segment, compute the segments planar normal and offsets. The spatial interaction system then utilizes at least one of clustering, iterations over pairs of segments, or iteration over normal or offsets to identify pairs of segments with approximately the same planar normal and offsets. In some examples, model generation instructions 2210 may apply one or more thresholds to determine if a pair of segments are within the same planar normal and offsets. In this example, for each pair of segments identified, the spatial interaction system determines that the pair is connected and completes the missing geometry between the segments of the pair. For instance, model generation instructions 2210 may find the lowest and highest points within the two segments, the right most edge of the left-most segment, and the left-most edge of the right-most segment and then complete the intermediate region with an selected mesh. The model generation instructions 2210 may continue to cycle or loop to connect other geometries in the doll house view by determining if each pair of geometries intersect and competing the geometry by selectin a mesh. the filled-in geometry. In some specific examples, the model generation instructions 2210 may determine whether potential completed plane has a hole by detecting errors within the depth data of surfaces of a geometry when viewed from the front. In some situations, a geometry may not connect to the ground plane. In this situation, the model generation instructions 2210 may extrapolate rays of lines from the camera at a plurality of locations and, if no lines intersect with the observed geometry beyond where the wall is to be extended, the model generation instructions 2210 may extend the wall to the ground plane.

The model viewing instructions 2212 may cause a 3D virtual representation or 3D model to be displayed on a mobile device. For example, the model viewing instructions 2212 may allow the user to control an experience of navigating or traversing the 3D virtual representation or 3D model. In some cases, the model viewing instructions 2212 may allow the user to interact with objects within the 3D virtual representation or 3D model.

The spatial annotation instruction 2214 may be used to position annotation data 2230 using the camera pose 2240. For example, the annotation data 2230 may be placed on an object within a 3D model 2228 or with respect to a particular viewpoint within the 3D model.

The sub-model connecting instructions 2216 receive video or successive still image data from the mobile device, as the user walks or moves from room to room (e.g., sub-model to sub-model). In this example, the sub-model connecting instructions 2216 may determine a camera pose 2240 relative to the 3D sub-models. The sub-model connecting instructions 2216 may then utilize the pose and the image data to align and orient each 3D sub-model with each other to generate the larger 3D model of the full physical environment. In another example, the sub-model connecting instructions 2216 may analyze the image data collected to identify the 3D sub-models in a successive order corresponding to the order the image data was captured. In this example, the sub-model connecting instructions 2216 may utilize the image data to orient each 3D sub-model with each other to generate the larger 3D model of the full physical environment.

In another example, the sub-model connecting instructions 2216 may cause 3D sub-models to be displayed to the user on the mobile device 2216, the user may connect the 3D sub-models in a desired manner. For instance, in the current example, the user may have connected 3D sub-model by drawing a line between a first 3D sub-model and a second sub-model or dragging and dropping the first 3D sub-model next to the second 3D sub-model. In some instance, the user may indicate connecting doorways or opening of the first 3D sub-models and the second 3D sub-model to cause the 3D sub-models to correctly align with each other.

The object detection instructions 2218 may be configured to detect objects within the image data 2226 received from a physical environment, such as physical environment. In some cases, the objects within the image data 2226 may be isolated and an object identify may be determined, such as a make and model of a television. For instance, the object detection instructions 2218 may detect any visible labels for identification information visible in the image data 2226, access third party systems to compare image data 2226 of the object with images of objects or products associated with the third-party systems, or compare the image data 2226 to stored image data 2226 and object data 2236.

The object selection instructions 2220 may be configured to select an object 1428 based on the user data 2234 and the object data 2236 to render within a 3D virtual representation of an environment being generated for the user. In some cases, the object selection instructions 2220 may select an object to render within the 3D virtual representation based at least in part on the objects detected within the image data 2226 by the object detection instructions 2218.

In some cases, the object selected by the object selection instructions 2220 may be available to purchase via the spatial interaction system 2200. For example, the spatial interaction system 2200 may derive (for example, via the model generation instruction 2210 and/or the sub-model connecting instructions 2216) instructions layouts, geometries, and other characteristics of the physical environment associated with the 3D virtual representation. The system 2200 may also derive user information, such as purchase history, user preferences, user tastes, etc. from objects within the virtual environment and/or user interactions with the virtual environment. The spatial interaction system 2200 may also receive object or product data from third party systems, as described above, and maintain a recommendation system that includes. The object selection instructions 2220 may then select potential objects for purchase as the object to be inserted into the 3D virtual representation based on the characteristics to of the physical environment, the user information, and/or product data.

The object rendering instructions 2222 may be configured to render objects within the 3D virtual representation from a viewpoint specific position or perspective. For example, an object selected by the object selection instructions 2220 may be rendered using the model data 2228 (e.g., to simulate lighting, shading, color, etc.) based on at least one camera pose 2240 associated with the image data 2226 being used to create the 3D virtual representation or walkthrough. In some cases, the object rendering instructions 2222 may cause the selected object to be rendered using the high dynamic range data, high dynamic range textures, color characteristics, lighting characteristics, and occlusion characteristics associated with a corresponding 3D model. For instance, the object rendering instructions 2222 may simulate lighting effects caused by the rendering or insertion of the object into the 3D virtual representation. For example, the object rendering instructions 2222 may utilize ray tracing based on the 3D model 2228 (e.g., lighting position, lighting type, information about articles surrounding the rendered object, etc.) and the object data 2236 (e.g., texture, surface shape, surface material, etc.). In other examples the object rendering instructions 2222 may utilize geometries of the articles in the surrounding environment, radiosity techniques, ray casting, image based lighting techniques, among others to render the object. Thus, the object rendering instructions 2222 may render the object from the perspective associated with each viewpoint of a walkthrough with the correct coloring, lighting, and occlusion effects.

The object purchase instructions 2224 may be configured to purchase the select object on behalf of the user. In some cases, the object purchase instructions 2224 may cause the user to be alerted to the object within the 3D virtual representation rendered on the mobile device and to allow the user to view data (e.g., make, model, price, specification, etc.) of the object while viewing the 3D virtual representation. In some cases, the user to enter purchase instructions 2224 (e.g., credit or debit card information) and to transmit the purchase instructions 2224 to a third-party system.

In some cases, the object purchase instructions 2224 may also include retargeting or object purchase follow up instructions. For example, in some cases, a user may view data related to the object within the 3D virtual representation but fail to purchase the object itself. In these examples, the object purchase instruction 2138 may be configured to generate an online advertising campaign to cause ads for the object to appear in third-party systems or webpages, cause an email campaign related to the object to be directed to the user of the 3D model, or provide information to a third party to conduct a retargeting campaign. In some instances, the object purchase instructions 2224 may also provide information to purchase related objects or services when the user is viewing the object information within the 3D model or 3D virtual representation. For example, the system 2200 may promote the user to connect to an interior decorator to assist with selecting furniture for the user's home.

Figure 23:
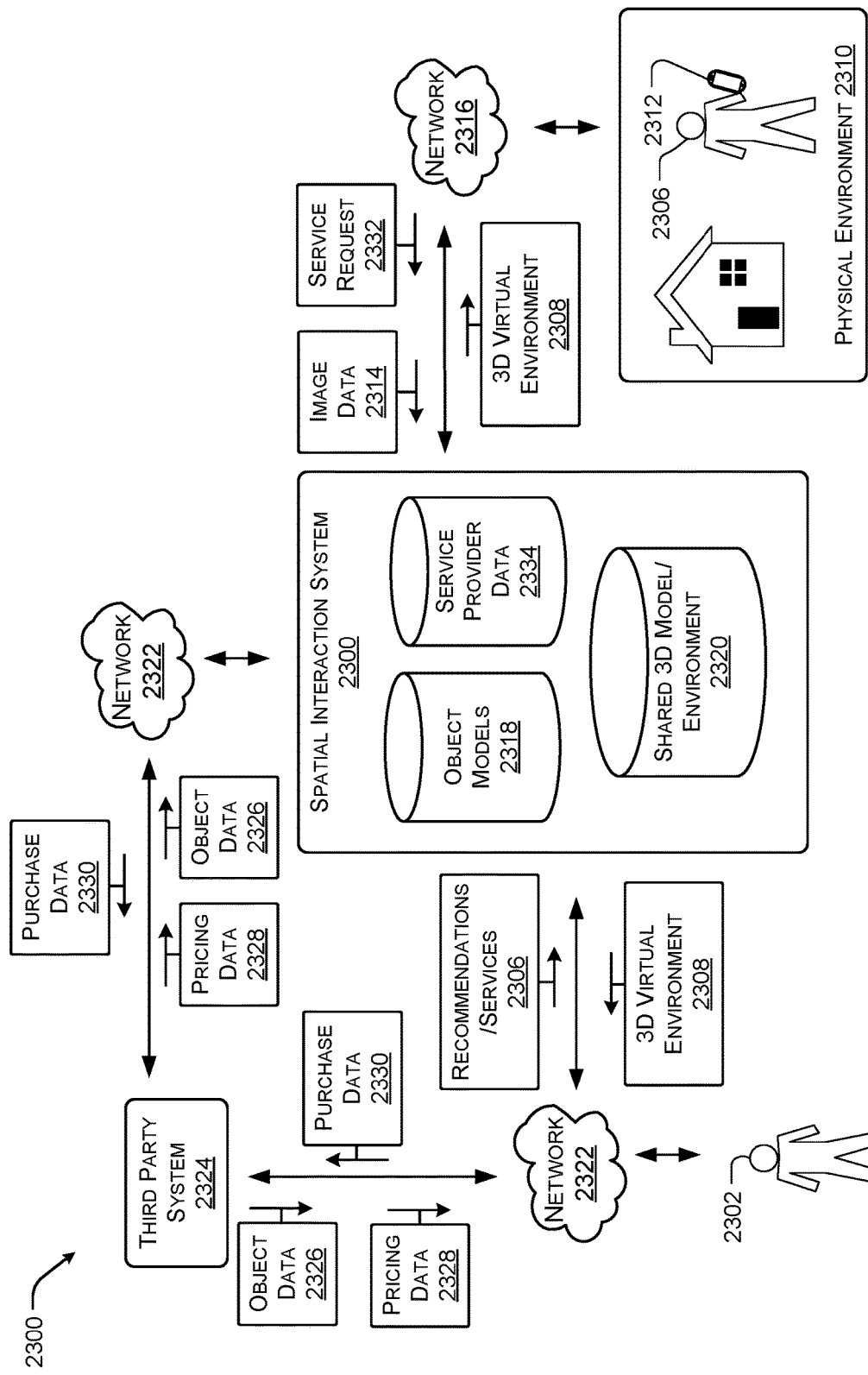
FIG. 23 illustrates an example spatial interaction system for allowing service providers to interact and provide services with the user via the 3D virtual environment according to some implementations.

FIG. 23 illustrates an example spatial interaction system 2300 for allowing service providers 2302 to interact and provide services 2304 to the user 2306 via the 3D virtual environment 2308 according to some implementations. In the current example, the user 2306 may capture a series of related images of the physical environment 2310 via an electronic device 2312. For instance, the user 2306 may utilize a camera of a smart phone or tablet to capture the series of images. The image data 2314 associated with the series of images may be provided to the spatial interaction system 2300 via a network 2316 (e.g., via the Internet®). In this example, it should be understood that the image data 2314 may be captured over one or more periods of time. For instance, the user 2306 may capture a number of images at a first time and then return to the physical environment 2310 at a later time and capture additional images that may be used by the spatial interaction system 2300. In some cases, the user 3210 may periodically or regularly capture image data 2314 of the physical environment 2310 such that the spatial interaction system 2300 may maintain update object models 2318 and/or a shared 3D model/environment 2320 of the physical environment 3210.

In the illustrated example, the 3D virtual representation or walkthrough 2308 may be provided to a system associated with a service provider 2302, such as a designer, interior decorator, CAD professional, furniture salesman, etc. In some cases, the service provider 2302 may access the shared 3D virtual environment 2308 via a network 2322 substantially simultaneously with the user 2306, such that the service provider 2302 may render the services in substantially real-time to the user 2306. For instance, the service provider 2302 may provide recommendations on upholstery for a potential sofa being added to the physical environment 2310 as the user 2306 is able to view the look and feel of the upholstery via the 3D virtual environment 2306. Thus, the spatial interaction system 2300 may provide for real-time communication (such as voice) and recommendations 2306 between the user 2306 and the service provider 2306.

In the example above, the service provider 2302 may access objects available via the spatial interaction system 2300 (e.g., the object models 2318 stored on the spatial interaction system 2300) as well as via third party systems 2324. For example, the third-party system 2324 may include a selection of products that may be viewed as objects within the 3D virtual environment generated by the spatial interaction system 2300. In this case, the object data 2326 and the pricing data 2328 may be provided to the spatial interaction system 2300 from the third-party system 2324 or via the service provider 2302, as shown.

In general, the spatial interaction system 2300 may allow either the user 2306 or the service provider 2302 to purchase the object from, for instance, the third-party system 2324 or other retailers. In some cases, the third-party system 2324 would receive purchase data 2330 to place the order and the items purchased would be delivered to the physical environment 2310.

In some cases, the user 2306 may be seeking a service or a quote for services via the 3D virtual environment 2308 or the spatial interaction system 2300. For example, the user 2306 may send a service request 2332 to the spatial interaction system 2300 for services, such as an appraisal. In this example, the service provider 2302 may access the 3D virtual environment 2308 and view the object or environment being appraised (e.g., a home appraisal), such as view multiple viewpoints and provide the appraisal without ever setting foot within the physical environment 2310. In this example, the spatial interaction system 2300 may be configured to make recommendations on service providers and/or provide pricing and quality metrics (such as reviews) within the shared 3D model/environment 2320 via stored service provider data 2334.

In some examples, the service request 2332 may be generated by the device 2312 in response to detecting an object within the physical environment 2310. For instance, the device 2310 may capture image data of the physical environment 2310 and detect an object within the environment 2310 that is old or out of date. In this case, the device 2312 may generate the service request 2332 on behalf of the user. In some cases, the device 2332 may also append additional information to a service request 2332. For instance, the device 2312 may detect an object within the physical environment 2310 and information about the object may be relevant to the service provider 2302. In this case, the device 2312 may include information related to the detected object in the service request 2332 to help support the service provider 2302 in handling the service request 2332.

While example above, illustrates a distributed system including off-device processing, it should be understood that in some cases, the electronic device 2312 may be configured to host an on-device application, such as an app, that may perform the operations of system 2300. For example, the image data 2314 may be captured and processed by a processor of the electronic device 1312 to generate the 3D model/environment 2320. In some instances, the generated 3D model/environment 2320 may be uploaded to the spatial interaction system 2300 or other cloud-based services. Once uploaded, the system 2300 may process the service requests 2332 as discussed above. The system 2300 may also be implemented as part of the third-party system 2324, such as part of a service provider system, a combination of an application on the device 2312 and the third-party system 2324 or other distributed systems. Further, in some cases, the system 2300 may be computer implemented, computer-assisted, or human-assisted.

Figure 24:
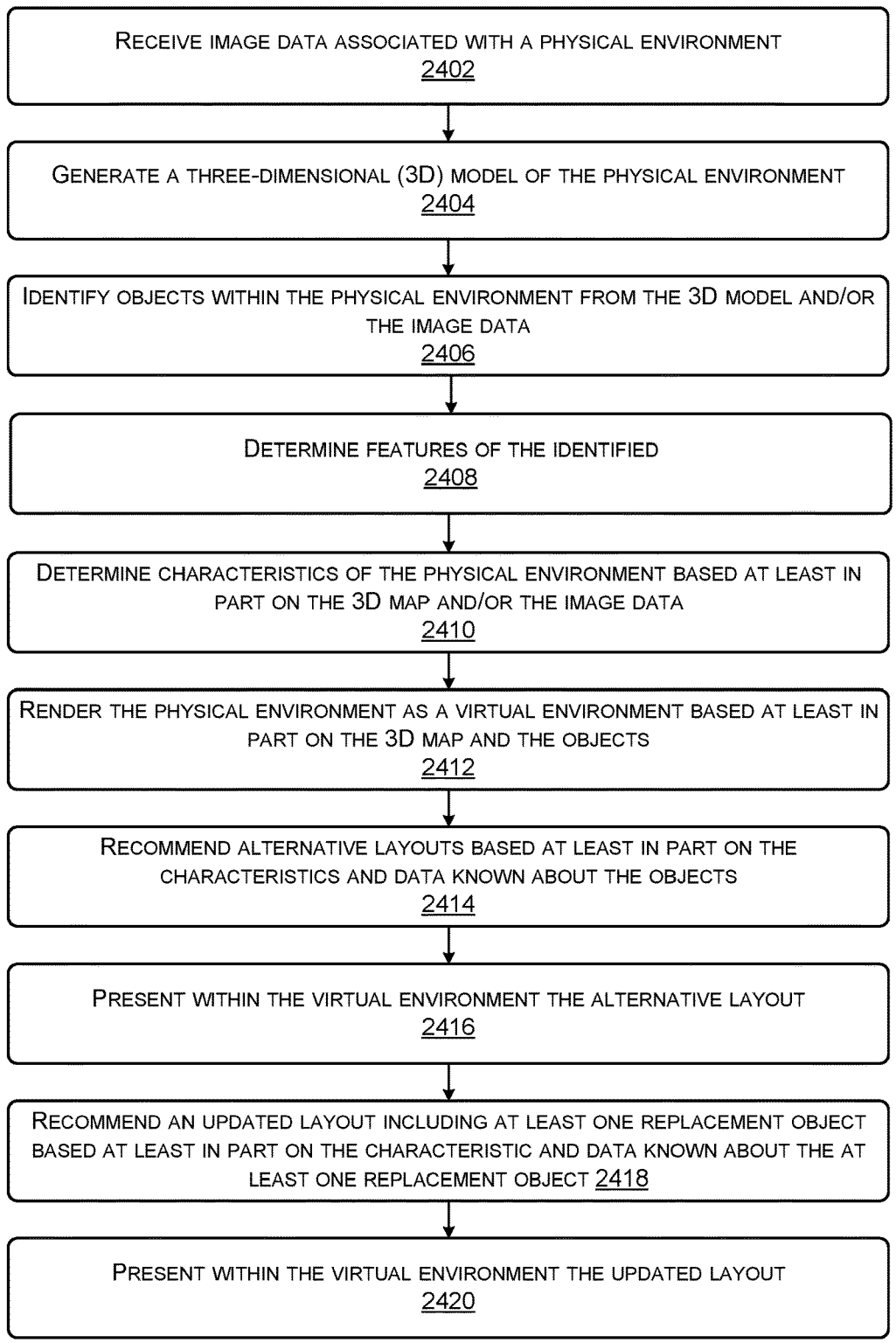
FIG. 24 illustrates another example process for suggesting replacement objects within a 3D virtual environment according to some implementations.

FIG. 24 illustrates another example process 2400 for suggesting replacement objects within a 3D virtual environment according to some implementations. For example, in some cases, the spatial interaction system may be configured to recommend different products and/or arrangement of products based on the physical geometry or characteristics of a physical environment, user information, and/or features of various products available for purchase. In some cases, the physical geometry, characteristics, and/or user information may be obtained by analyzing the image data and/or 3D models associated with or captured from the physical environment.

At 2402, the spatial interaction system may receive image data associated with a physical environment. For example, the input image data may include high dynamic range data or video data captured as the user moves throughout the physical environment.

At 2404, the system may generate a 3D model of the physical environment. In some cases, the image data may be related to an existing 3D model or mesh while in other cases the image data may be used to generate a new model of a physical environment unknown to the system, as discussed above. For instance, the system may generate a plurality of viewpoints and/or combine multiple sub-models to form a larger 3D model of a larger physical environment.

At 2406, the spatial interaction system may identify objects within the physical environment from the 3D model and/or the image data. In some cases, the 3D model may include one or more object model of objects or items physically present in the environment. For example, the system may detect and identify various objects using one or more databases including models of known objects and the image data received. In some cases, the system may identify objects that have been removed or moved within the physical environment from the image data and cause a corresponding update to the 3D model.

At 2408, the system may determine features of the identified objects. For example, the system may determine any damage, issues, manufactures or customer comments/notification related to the objects, age, capabilities, colors, textures, patterns, among other features from the image data and/or from publicly accessible information, such as blogs, websites, datastore, etc.

At 2410, the system may determine characteristics of the physical environment based at least in part on the 3D model and/or the image data. For example, the system may derive textures, patterns, colors, geometries, square footage, lighting and occlusion effects, damage, age, level of upkeep, among other characteristics of the physical environment.

At 2412, the system may render the physical environment as a virtual environment or 3D virtual environment based at least in part on the 3D model and the objects. For example, the system may generate a walkthrough or stepthrough of viewpoints and/or a 3D mesh that is navigable by the user. In some cases, the user may view the virtual environment while traversing the physical environment and interact with physical objects in the physical environment within the virtual environment as a mixed reality system.

At 2414, the system may determine and recommend an alternative layout based at least in part on the characteristics and data known about the objects. For example, the objects may be one or more wireless routers and the alternative layout may be alternative placement of the routers to improve coverage within the physical environment.

At 2416, the system may present within the virtual environment the alternative layout. For example, the system may provide a layout view or overhead view of the virtual environment, within the system, and display how arranging the routers in the alternative layout affects the wireless coverage within the physical environment. In some cases, the system may present both the current wireless coverage and the alternative coverage provided by the alternative layout.

At 2418, the spatial interaction system may recommend an updated layout including at least one replacement object based at least in part on the characteristics and data known about at least one replacement object. For example, the current router may be unable to cover the entire physical environment and, thus, the system may select a replacement router based on the features or technical capabilities of routers available for purchase. In some cases, the system may recommend different routers and different placements of the routers to provide the user with options related to coverage, usability (e.g., features such as bandwidth and throughput in this case), and cost.

At 2420, the system may present, within the virtual environment, the updated layout. For example, the system may provide multiple overlays with annotations which the user may use to visualize the wireless coverage from multiple routers at various locations. In one specific example, the system may allow the user to traverse a walkthrough having viewpoints of the physical environment that includes indication of the coverage, such as shading. In another particular example, the system may allow the user to traverse the physical environment while viewing the 3D virtual representation associated with the model and view the indication of coverage.

In the current example, the user may select the routers (e.g., objects) and layout or arrangement desired and the system may place an order for the router to be deliver to the physical environment on behalf of the user. Thus, in this process 2400, the system provides the user with a plurality of recommended objects having capabilities or features that are demonstrated to the user in a visual manner. Therefore, in addition, to inserting objects into the 3D environment in a manner that the user can visual the look and feel of the object given particular lighting conditions, colors, geometries, and other objects within the physical environment, the system is able to visualize functional capabilities of the objects to the user.

Figure 25:
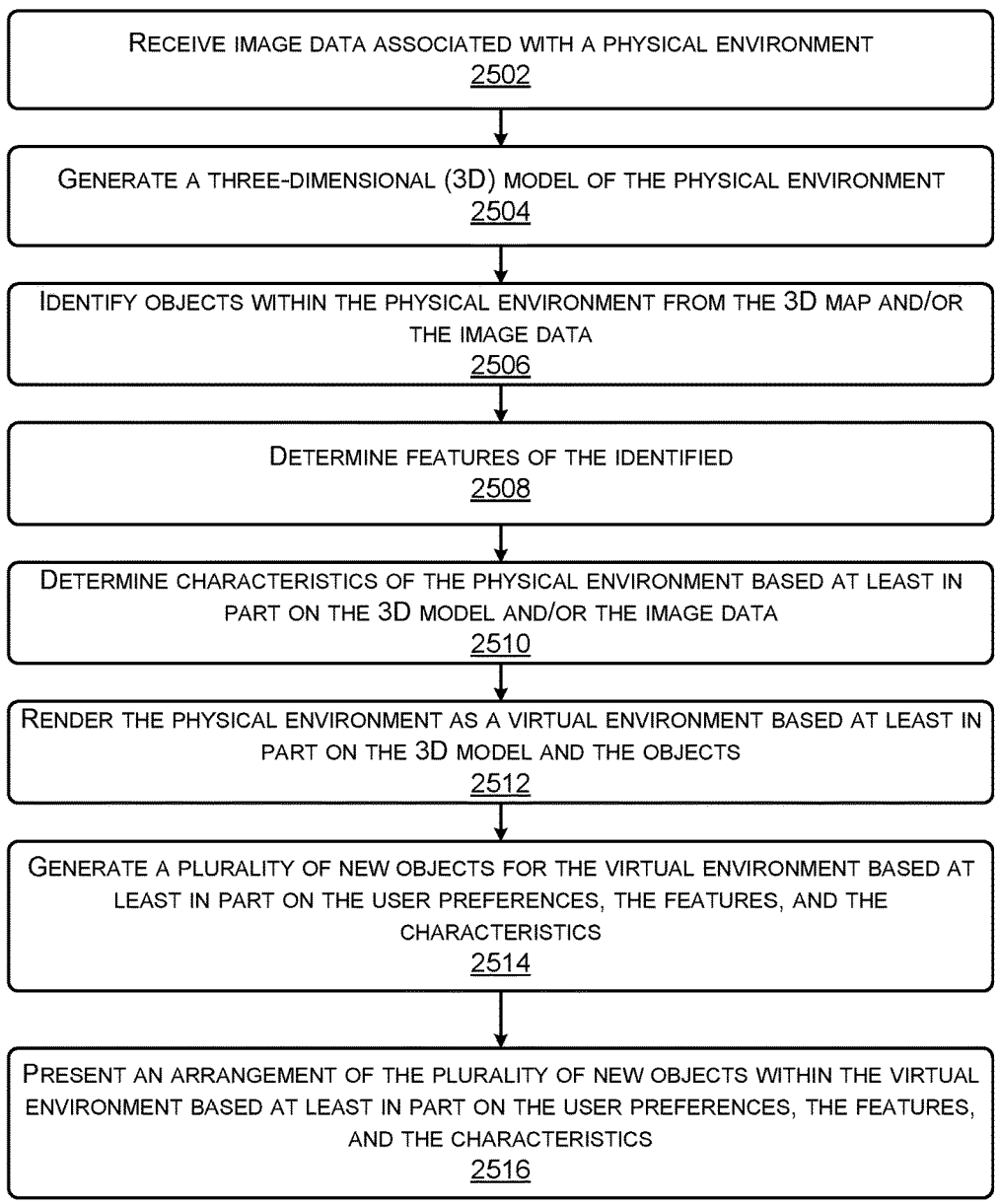
FIG. 25 illustrates an example process for suggesting and testing a redesign or redecorating of a physical environment according to some implementations.

FIG. 25 illustrates an example process 2500 for suggesting and testing a redesign or redecorating of a physical environment according to some implementations. In the current example, the user may decide that the physical environment should be refreshed or be updated with a new look and feel. In other cases, the system may recommend a full redesign of an interior environment or an exterior environment. In some cases, the system may allow the user to view a physical environment with different aesthetic styles applied (e.g., modern, classic, lodge, New England, etc.).

At 2502, the spatial interaction system may receive image data associated with a physical environment. For example, the input image data may include high dynamic range data or video data captured as the user moves throughout the physical environment.

At 2504, the system may generate a 3D model of the physical environment. In some cases, the image data may be related to an existing 3D model or mesh while in other cases the image data may be used to generate a new model of a physical environment unknown to the system, as discussed above. For instance, the system may generate a plurality of viewpoints and/or combine multiple sub-models to form a larger 3D model of a larger physical environment.

At 2506, the spatial interaction system may identify objects within the physical environment form the 3D model and/or the image data. In some cases, the 3D model may include one or more object model of objects or items physically present in the environment. For example, the system may detect and identify various objects using one or more databases including models of known objects and the image data received. In some cases, the system may identify objects that have been removed or moved within the physical environment from the image data and cause a corresponding update to the 3D model.

At 2508, the system may determine features of the identified objects. For example, the system may determine any damage, issues, manufactures or customer comments/notification related to the objects, age, capabilities, colors, textures, patterns, among other features from the image data and/or from publicly accessible information, such as blogs, websites, datastore, etc.

At 2510, the system may determine characteristics of the physical environment based at least in part on the 3D model and/or the image data. For example, the system may derive textures, patterns, colors, geometries, square footage, lighting and occlusion effects, damage, age, level of upkeep, among other characteristics of the physical environment.

At 2512, the system may render the physical environment as a virtual environment or 3D virtual environment based at least in part on the 3D model and the objects. For example, the system may generate a walkthrough or stepthrough of viewpoints and/or a 3D mesh that is navigable by the user. In some cases, the user may view the virtual environment while traversing the physical environment and interact with physical objects in the physical environment within the virtual environment as a mixed reality system.

At 2514, the system may generate a plurality of new objects for the virtual environment based at least in part on the user preferences, the features, and the characteristics. For example, the user or the system may select an ascetic genera and the system may select objects that fit the genera based on the characteristics of the physical environment, features of the objects, and the user information or presences. For instance, the system may select lighter colors within a modern ascetic as the user furniture purchase history is typical white upholstered items. In some cases, the system may select the ascetic genera based on user preferences and known fashion or building trends. In some cases, a third-party service provider, such as an interior decorator, may select the genera and/or provide insight or recommendations on the objects as well as the system.

At 2516, the system may present an arrangement of the plurality of new objects within the virtual environment based at least in part on the user preferences, the features, and the characteristics. In some cases, the system may replace each of the existing objects with new objects within the 3D virtual environment. In some instances, the system may remove the objects and fill the physical environment with new objects unrelated to the current objects within the physical environment. In other cases, the system may replace some objects while removing some object and adding some new objects.

In some implementations, the user may then walkthrough via a series of viewpoints the physical environment to view the redecoration of the physical environment. The user may mark or rate objects based on the user's desire to purchase each item. In some implementations, the system may replace objects that receive a rating below a threshold level. In one particular example, the system may update unviewed portions of the physical environment with new objects based on the rating applied to one or more currently displayed object. In some cases, the system may generate a plurality of different remodels for each room or physical environment such that the user may experience the look and feel of the physical environment with various different genera's applied.

In some cases, the system may allow the user to purchase one or more of the objects or the entire object selection via the 3D virtual environment. For example, the system may present annotations with pricing and retail options together with a purchase now option.

Figure 26:
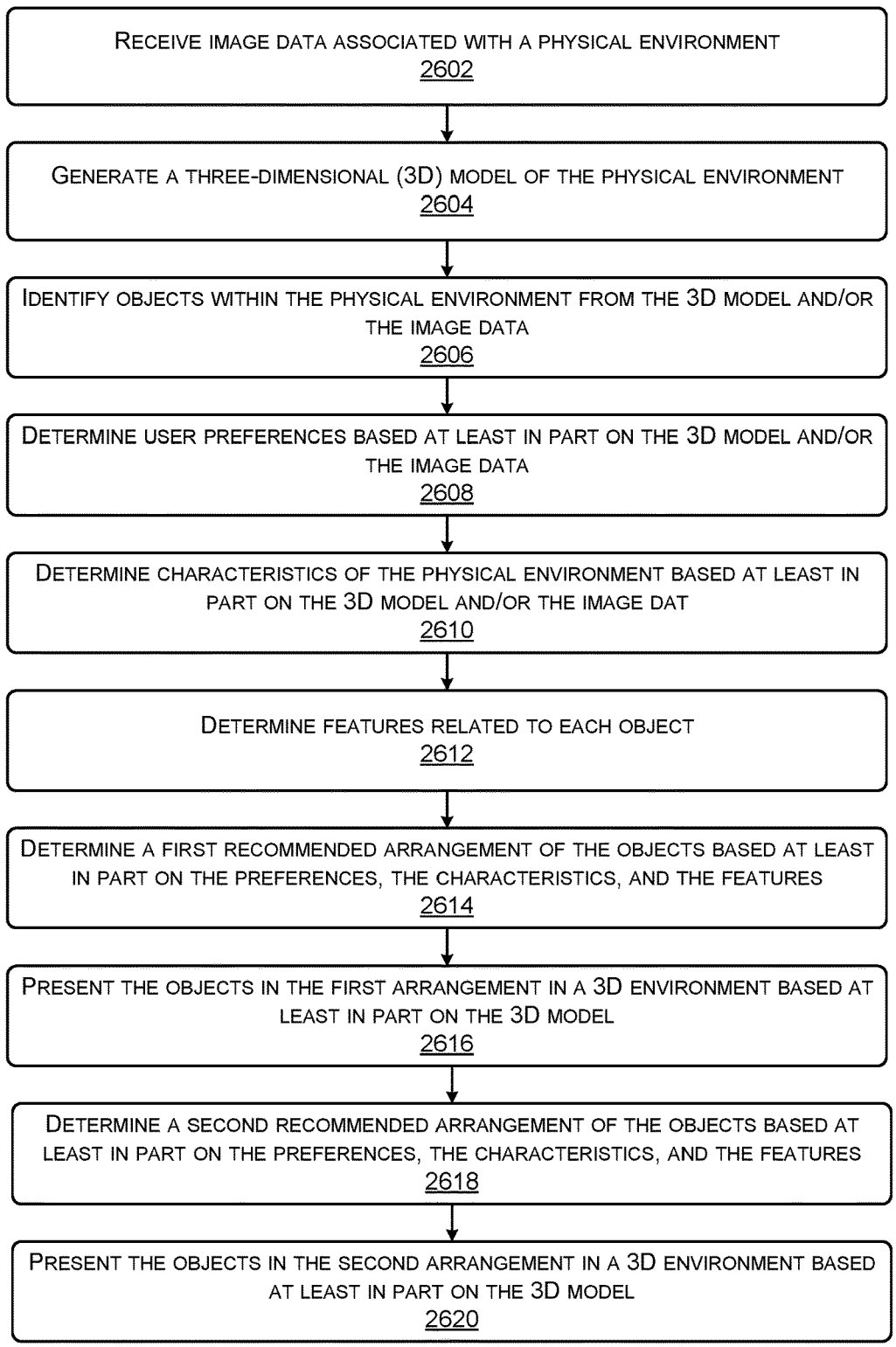
FIG. 26 illustrates another example process for suggesting and testing a redesign or redecorating of a physical environment according to some implementations.

FIG. 26 illustrates another example process 2600 for suggesting and testing a redesign or redecorating of a physical environment according to some implementations. In some cases, the system may select objects for a redesign or new look for a physical environment. In these cases, the system may desire to present the user with multiple arrangements for the objects based on, for instance, the geometry or square footage of the physical environment.

At 2602, the spatial interaction system may receive image data associated with a physical environment. For example, the input image data may include high dynamic range data or video data captured as the user moves throughout the physical environment.

At 2604, the system may generate a 3D model of the physical environment. In some cases, the image data may be related to an existing 3D model or mesh while in other cases the image data may be used to generate a new model of a physical environment unknown to the system, as discussed above. For instance, the system may generate a plurality of viewpoints and/or combine multiple sub-models to form a larger 3D model of a larger physical environment.

At 2606, the spatial interaction system may identify objects within the physical environment form the 3D model and/or the image data. In some cases, the 3D model may include one or more object model of objects or items physically present in the environment. For example, the system may detect and identify various objects using one or more databases including models of known objects and the image data received. In some cases, the system may identify objects that have been removed or moved within the physical environment from the image data and cause a corresponding update to the 3D model.

At 2610, the system may determine user preferences based at least in part on the 3D model and/or the image data. For example, the system may determine form the image data or the 3D model the ascetic tastes or preferences of the user based on analyzing the image data associated with furniture, artwork, clothing, or other objects currently or previously present in a physical environment. For example, if a user has been replacing blue objects in the environment with purple objects, the system may over time determine the user prefers purple to blue. In other cases, the user may entire preferences (e.g., the user indicates via a user interface that they prefer purple to blue), or based on past purchase history (e.g., the user typical purchase purple items).

In another example, the system may determine a price range or quality range associated with the user. For example, the system may detect tags, designer items, models, etc. associated with objects in the physical environment by analyzing the received image data. Thus, the system may be able to recommend items within the user's price range or quality standards and/or recommend upgraded items.

At 2610, the system may determine features of the identified objects. For example, the system may determine any damage, issues, manufactures or customer comments/notification related to the objects, age, capabilities, colors, textures, patterns, among other features from the image data and/or from publicly accessible information, such as blogs, websites, datastore, etc.

At 2612, the system may determine characteristics of the physical environment based at least in part on the 3D model and/or the image data. For example, the system may derive textures, patterns, colors, geometries, square footage, lighting and occlusion effects, damage, age, level of upkeep, among other characteristics of the physical environment.

At 2614, the spatial interaction system may determine a first recommended arrangement of the objects based at least in part on the preferences, the characteristics, and the features. For example, the system may determine the recommended arrangements to provide the user with different perspectives on how their objects may be arranged within a physical environment. In some cases, the arrangement may be designed with usability, capabilities, functionality, etc. of the objects or based on known desires or goals of the user derived from the user information. For instance, the first arrangement may be selected to increase the distance between a viewing position and a television to a proper distance in order to reduce strain on the user's eye when watching television. In another example, the first arrangement may be selected to optimize or maximize the floor space within the physical environment.

At 2616, the system may present the objects in the first arrangement in a 3D environment based at least in part on the 3D model. For example, the system may generate one or more walkthrough having viewpoints and/or allow the user to traverse a 3D virtual representation of the 3D model, such as via a mixed reality headset system.

At 2618, the spatial interaction system may determine a second recommended arrangement of the objects based at least in part on the preferences, the characteristics, and the features. For example, the system may determine the additional recommended arrangements to provide the user with different perspectives or to optimize different goals within the physical environment. In some cases, the system may utilize the geometries of the physical environment and known dimensions of the objects to determine arrangements that considers spatial restraints and optimizations.

At 2620, the system may present the objects in the second arrangement in a 3D environment based at least in part on the 3D model. As discussed above, the system may generate one or more walkthrough having viewpoints and/or allow the user to traverse a 3D virtual representation of the 3D model, such as via a mixed reality headset system.

Figure 27:
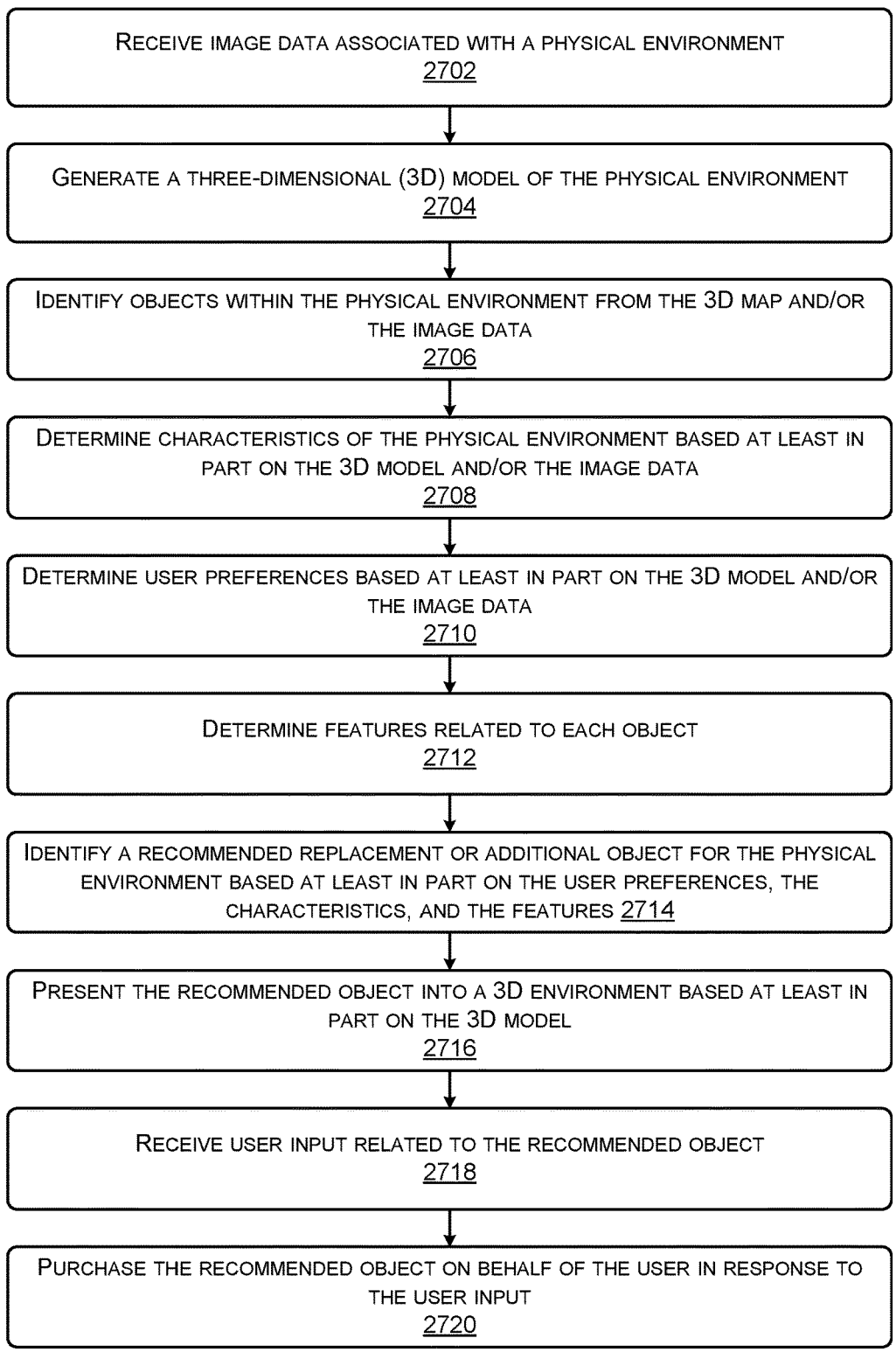
FIG. 27 illustrates an example process for suggesting, viewing, and purchasing an object recommended by a spatial interaction system redesign or redecorating of a physical environment according to some implementations.

FIG. 27 illustrates an example process 2700 for suggesting, viewing, and purchasing an object recommended by a spatial interaction system redesign or redecorating of a physical environment according to some implementations. For example, the system may allow the user to visual different arrangement of the physical environment and the objects within the environment without having to move the objects or manually measure. In this manner, the system may save time and effort of a user when in the process of remolding, redesigning, or rearranging a physical environment.

At 2702, the spatial interaction system may receive image data associated with a physical environment. For example, the input image data may include high dynamic range data or video data captured as the user moves throughout the physical environment.

At 2704, the system may generate a 3D model of the physical environment. In some cases, the image data may be related to an existing 3D model or mesh while in other cases the image data may be used to generate a new model of a physical environment unknown to the system, as discussed above. For instance, the system may generate a plurality of viewpoints and/or combine multiple sub-models to form a larger 3D model of a larger physical environment.

At 2706, the spatial interaction system may identify objects within the physical environment form the 3D model and/or the image data. In some cases, the 3D model may include one or more object model of objects or items physically present in the environment. For example, the system may detect and identify various objects using one or more databases including models of known objects and the image data received. In some cases, the system may identify objects that have been removed or moved within the physical environment from the image data and cause a corresponding update to the 3D model.

At 2708, the system may determine user preferences based at least in part on the 3D model and/or the image data. For example, the system may determine form the image data or the 3D model the ascetic tastes or preferences of the user based on analyzing the image data associated with furniture, artwork, clothing, or other objects currently or previously present in a physical environment. For example, if a user has been replacing blue objects in the environment with purple objects, the system may over time determine the user prefers purple to blue. In other cases, the user may entire preferences (e.g., the user indicates via a user interface that they prefer purple to blue), or based on past purchase history (e.g., the user typical purchase purple items).

In another example, the system may determine a price range or quality range associated with the user. For example, the system may detect tags, designer items, models, etc. associated with objects in the physical environment by analyzing the received image data. Thus, the system may be able to recommend items within the user's price range or quality standards and/or recommend upgraded items.

At 2710, the system may determine characteristics of the physical environment based at least in part on the 3D model and/or the image data. For example, the system may derive textures, patterns, colors, geometries, square footage, lighting and occlusion effects, damage, age, level of upkeep, among other characteristics of the physical environment.

At 2712, the system may determine features of the identified objects. For example, the system may determine any damage, issues, manufactures or customer comments/notification related to the objects, age, capabilities, colors, textures, patterns, among other features from the image data and/or from publicly accessible information, such as blogs, websites, datastore, etc.

At 2714, the system may identify a recommended replacement or additional object for the physical environment based at least in part on the user preferences, the characteristics, and the features. For instance, in one specific example, the spatial interaction system may be configured to recommend objects, such as a heating or air conditioning unit, based on the square footage and layout of the physical environment. For example, the spatial interaction system may select the replacement or additional object such that the object is able to provide proper heating and/or cooling based on conditions of the physical location (e.g., is the physical environment in Texas or Montana), the size of the physical environment (e.g., the square footage), and the product data provided by a manufacture or seller of the product. In some cases, the system may collaborate or disprove recommendations made by various service providers to assist with ensuring that proper products/units are installed and that the user is not overpaying for unneeded capabilities.

At 2716, the system may present the recommended object into a 3D environment based at least in part on the 3D mode. For example, the system may generate one or more walkthrough having viewpoints and/or allow the user to traverse a 3D virtual representation of the 3D model, such as via a mixed reality headset system.

At 2718, the system may receive a user input related to the recommended object. For example, the user may request additional information related to the object, purchase the object, or to be connected to a service provider to receive additional feedback on the object.

At 2720, the system may purchase the recommended object on behalf of the user in response to the user input. For example, the system may place an order with a selected retailer to ship the object to the physical environment. In this manner, the system may allow the user to order objects without exciting the virtual environment.

Figure 28:
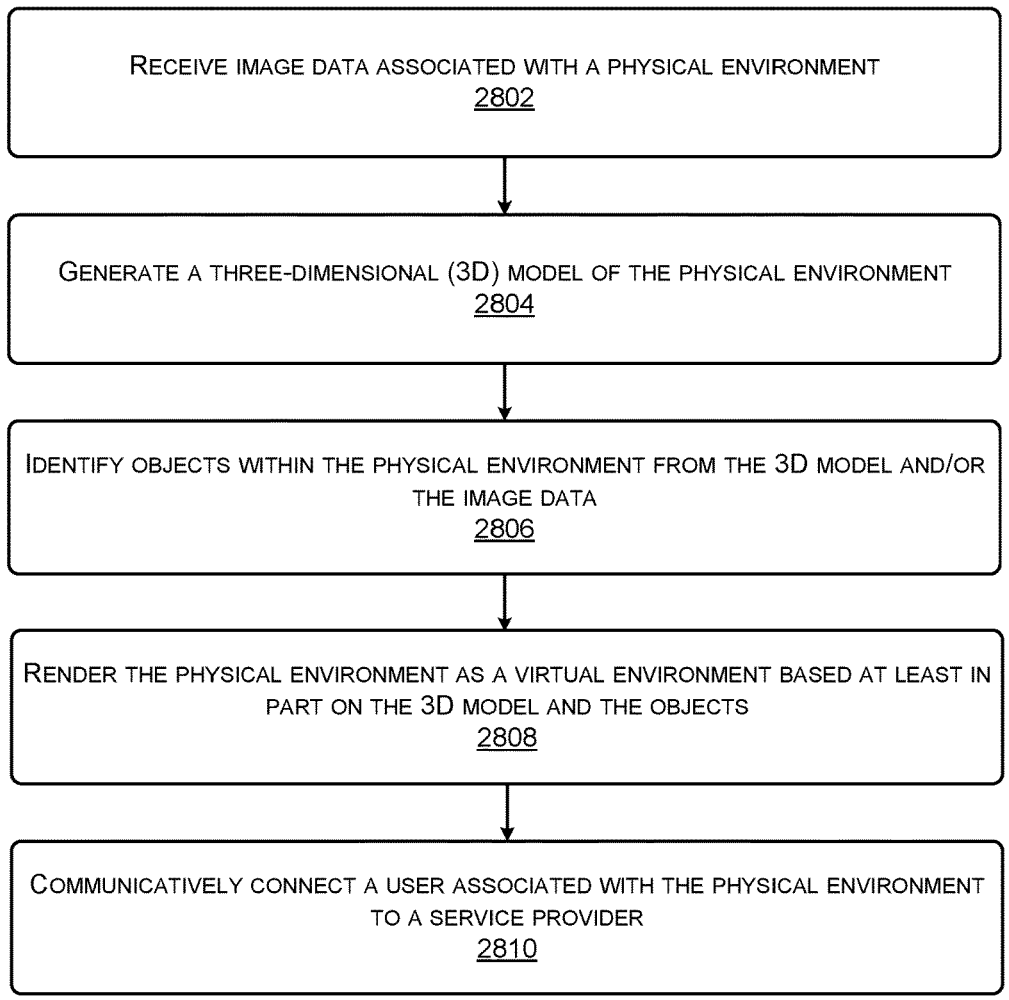
FIG. 28 illustrates an example process for receiving support or services associated with an object or potential object for a physical environment via a 3D virtual environment according to some implementations.

FIG. 28 illustrates an example process 2800 for receiving support or services associated with an object or potential object for a physical environment via a 3D virtual environment according to some implementations. In some examples, the spatial interaction system may be configured to provide a user with access to service providers in addition to product purchasing. For instance, the 3D model of a physical environment may be used to provide an appraisal, a redesign, a quote for repairs on damaged items or property, customer support, etc.

At 2802, the spatial interaction system may receive image data associated with a physical environment. For example, the input image data may include high dynamic range data or video data captured as the user moves throughout the physical environment.

At 2804, the system may generate a 3D model of the physical environment. In some cases, the image data may be related to an existing 3D model or mesh while in other cases the image data may be used to generate a new model of a physical environment unknown to the system, as discussed above. For instance, the system may generate a plurality of viewpoints and/or combine multiple sub-models to form a larger 3D model of a larger physical environment.

At 2806, the spatial interaction system may identify objects within the physical environment form the 3D model and/or the image data. In some cases, the 3D model may include one or more object model of objects or items physically present in the environment. For example, the system may detect and identify various objects using one or more databases including models of known objects and the image data received. In some cases, the system may identify objects that have been removed or moved within the physical environment from the image data and cause a corresponding update to the 3D model.

At 2808, the system may render the physical environment as a virtual environment based at least in part on the 3D model and the objects. For example, the system may generate a series of viewpoints that are navigable by a user and/or a 3D environment that may be traversed by the user by walking through the physical environment while engaged in a mixed reality system.

At 2810, the system may communicatively connect a user associated with the physical environment to a service provider. For instance, both the use rand the service provider may be in audio and visual communication via the 3D virtual environment, such that the user and service provider may view and/or edit the physical environment as a virtual environment while discussing any changes as if both physically present in the physical environment. In some cases, either the user or the service provider may cause the system to insert, replace, or remove objects from the 3D model or 3D virtual environment, as discussed above.

Once the use and the service provider are communicatively connected, the service provider may use information associated with the 3D virtual environment to inform on the service provider's services or to otherwise carry out the service requested.

Figure 29:
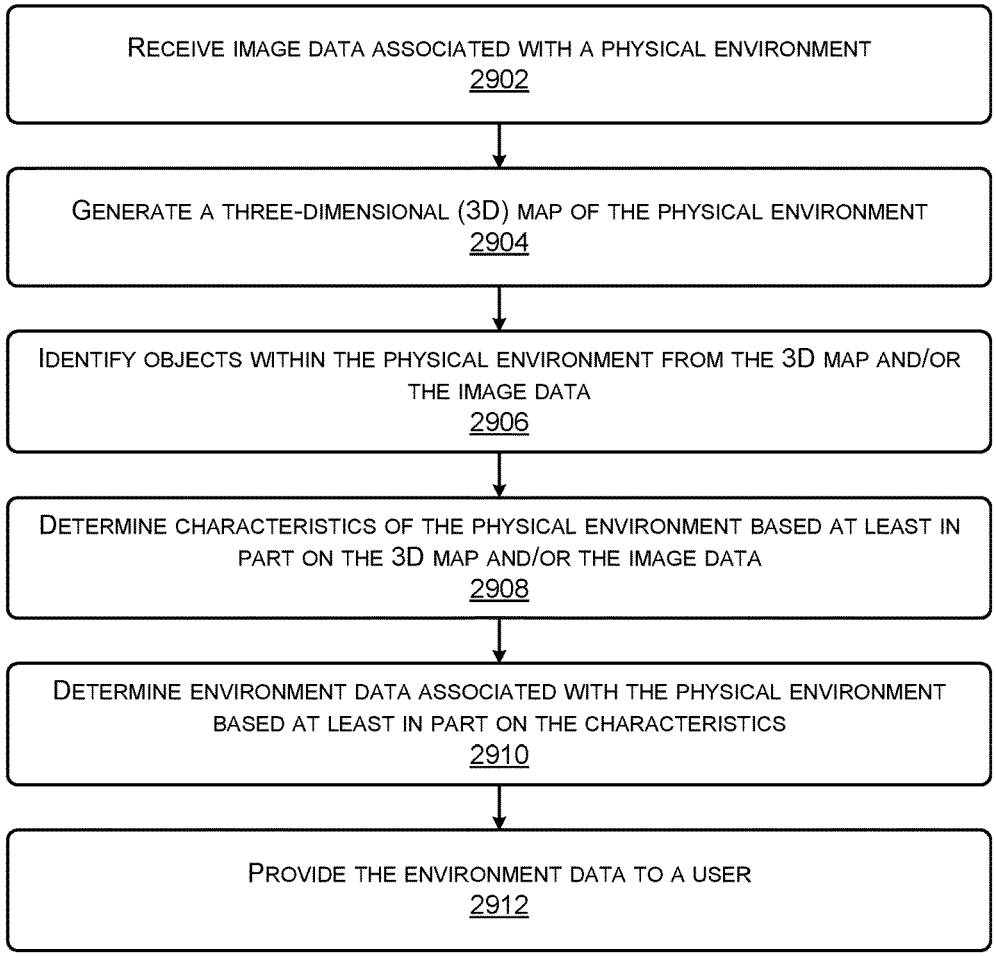
FIG. 29 illustrates an example process for estimating usage via 3D virtual environment according to some implementations.

FIG. 29 illustrates an example process for estimating usage via 3D virtual environment according to some implementations. For example, in some case, since the spatial interaction system is able to determine characteristics of a physical environment from image data, the system may be able to estimate usage data, such as water, electric, gas, and make recommendations to improve (e.g., reduce) the usage amount or maintain a desired budget.

At 2902, the spatial interaction system may receive image data associated with a physical environment. For example, the input image data may include high dynamic range data or video data captured as the user moves throughout the physical environment.

At 2904, the system may generate a 3D model of the physical environment. In some cases, the image data may be related to an existing 3D model or mesh while in other cases the image data may be used to generate a new model of a physical environment unknown to the system, as discussed above. For instance, the system may generate a plurality of viewpoints and/or combine multiple sub-models to form a larger 3D model of a larger physical environment.

At 2906, the spatial interaction system may identify objects within the physical environment form the 3D model and/or the image data. In some cases, the 3D model may include one or more object model of objects or items physically present in the environment. For example, the system may detect and identify various objects using one or more databases including models of known objects and the image data received. In some cases, the system may identify objects that have been removed or moved within the physical environment from the image data and cause a corresponding update to the 3D model.

At 2908, the system may determine characteristics of the physical environment based at least in part on the 3D model and/or the image data. For example, the system may derive textures, patterns, colors, geometries, square footage, lighting and occlusion effects, damage, age, level of upkeep, among other characteristics of the physical environment.

At 2910, the spatial interaction system may determine environment data associate with the physical environment based at least in part on the characteristics. For example, the system may first detect a number of individuals living within the physical environment. The system may then utilize the amount of square footage, a location, a build material (e.g., floors, ceilings, exterior), volume of the interior, etc. of the physical environment and third party data on average consumption metrics based on the physical characteristics and number of occupants of the physical environment to estimate the environment data, such as utility usage, living space, etc. In some cases, the system may also determine over time the amount of occupancy (number of hours, such as for an office). The system may also receive input of actual usage per month and continue to update the usage estimates using the actual data and the predicted usage. The system may also access third-party data, such as fee sheets published by utilities.

At 2912, the system may provide the usage data to the user. For instance, the system may include an annotation within the 3D virtual environment or may notify the user via other methods, such as email or text messages.

Figure 30:
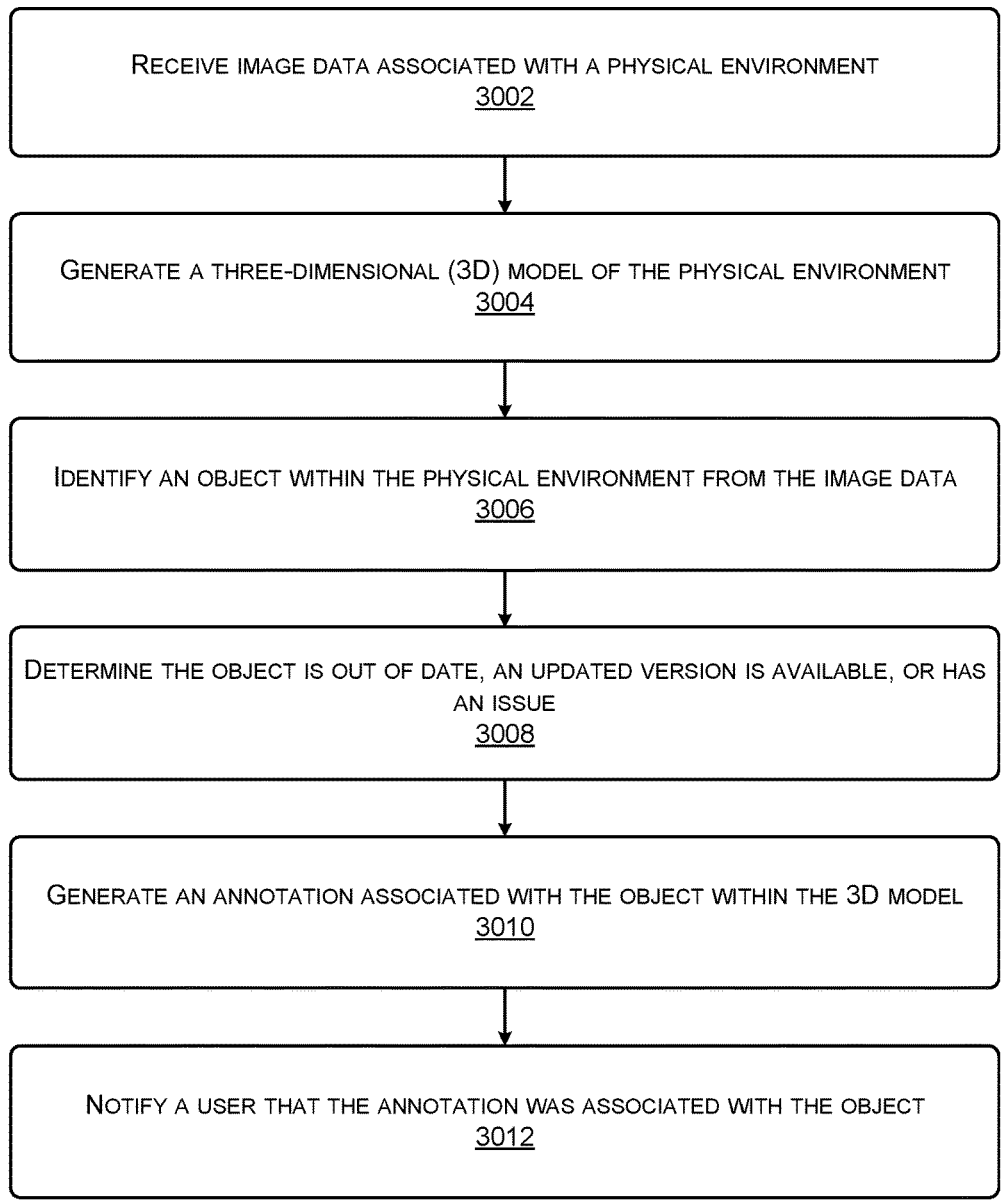
FIG. 30 illustrates an example process for providing alerts related to objects in a physical environment via a 3D virtual environment according to some implementations.

FIG. 30 illustrates an example process 3000 for providing alerts related to objects in a physical environment via a 3D virtual environment according to some implementations. In some cases, as the system is able to detect objects or items within a physical environment, customer complaints/issues, or updated versions and to provide information related to customer complaints/issues, or updated versions to the user via annotations within a 3D virtual representation of the physical environment.

At 3002, the spatial interaction system may receive image data associated with a physical environment. For example, the input image data may include high dynamic range data or video data captured as the user moves throughout the physical environment.

At 3004, the system may generate a 3D model of the physical environment. In some cases, the image data may be related to an existing 3D model or mesh while in other cases the image data may be used to generate a new model of a physical environment unknown to the system, as discussed above. For instance, the system may generate a plurality of viewpoints and/or combine multiple sub-models to form a larger 3D model of a larger physical environment.

At 3006, the spatial interaction system may identify objects within the physical environment form the 3D model and/or the image data. In some cases, the 3D model may include one or more object model of objects or items physically present in the environment. For example, the system may detect and identify various objects using one or more databases including models of known objects and the image data received. In some cases, the system may identify objects that have been removed or moved within the physical environment from the image data and cause a corresponding update to the 3D model.

At 3008, the system may determine the object is out of date, an updated version is available, or has an issue. For example, the system may detect that the object is out of date or a newer version is available, a related product to the object is available, similar objects are available, etc. In some cases, the system may detect damage, such as rust, mold, decay, etc.

At 3010, the system may generate an annotation associated with the object within the 3D model. For example, the annotation may be displayed to the user as the user traverses the 3D environment. In some cases, the annotation may include option to purchase a replacement, to be connected with a service provider to receive a quote for repair, and/or information on how to affect a home repair of the object. In some cases, the annotation within the 3D virtual representation of the physical environment may include a danger warning such as when mold is detected.

At 3012, the system may notify a user of the system, that the annotation was associated with the object. For example, the system may email, text, or otherwise alert the user via an electronic notification. In some cases, the system may include indications, such as audio or visual cues, within the virtual environment that the annotation is new or recently added.

Figure 31:
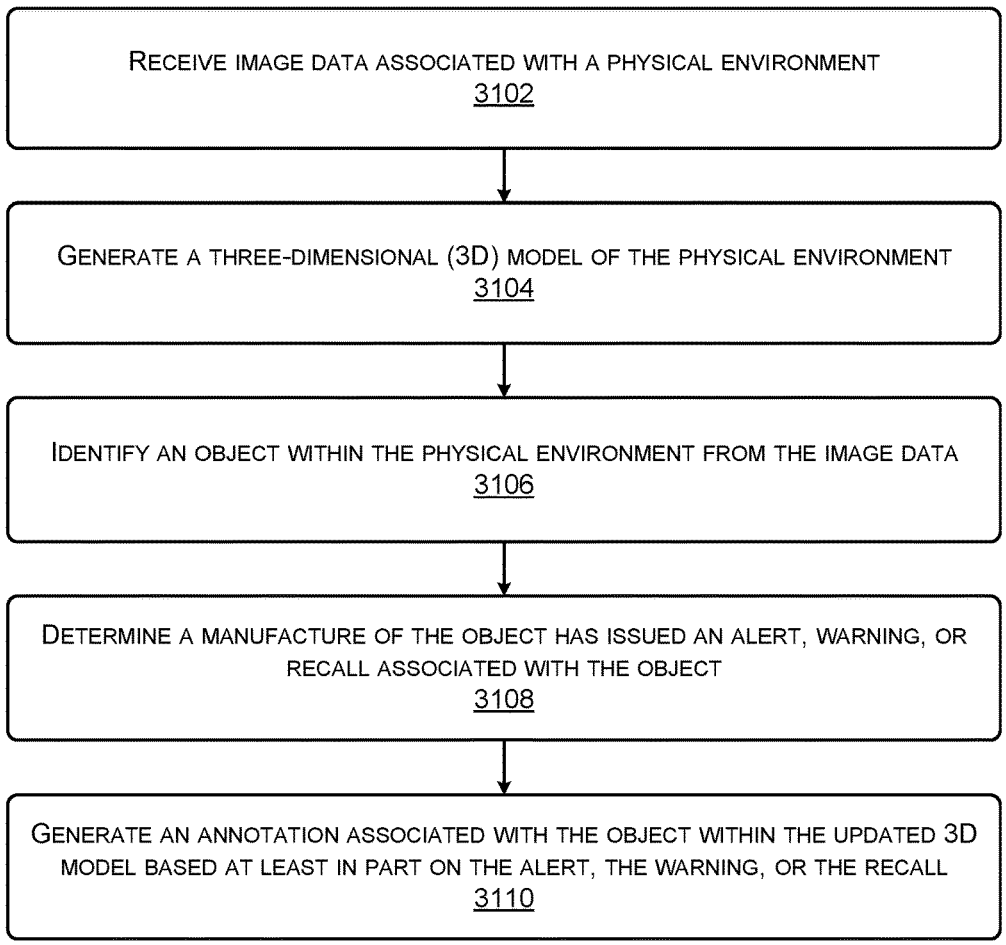
FIG. 31 illustrates another example process for providing alerts related to objects in a physical environment via a 3D virtual environment according to some implementations.

FIG. 31 illustrates another example process 3100 for providing alerts related to objects in a physical environment via a 3D virtual environment according to some implementations. In some cases, the system may identify or detect products within the physical environment using the 3D model and the image data that may pose a health or safety risk. For instance, the system may receive a recall or warning from a third party such as the manufacture and provide the recall or warning to the user via an annotation within the 3D representation.

At 3102, the spatial interaction system may receive image data associated with a physical environment. For example, the input image data may include high dynamic range data, depth data, still images, or video data captured as the user moves throughout the physical environment. In some cases, the image data may be newly captured while in other cases the image data may be stored or already incorporated into a 3D model.

At 3104, the system may generate a 3D model of the physical environment. In some cases, the image data may be related to an existing 3D model or mesh while in other cases the image data may be used to generate a new model of a physical environment unknown to the system, as discussed above. For instance, the system may generate a plurality of viewpoints and/or combine multiple sub-models to form a larger 3D model of a larger physical environment.

At 3106, the spatial interaction system may identify objects within the physical environment form the 3D model and/or the image data. In some cases, the 3D model may include one or more object model of objects or items physically present in the environment. For example, the system may detect and identify various objects using one or more databases including models of known objects and the image data received. In some cases, the system may identify objects that have changed, such as become broken, damage, or moved. In some cases, the system may identify the object by detecting a bar code, other code, serial number, or other identifier on the object. In other cases, the object may be identified based on its physical characteristics as compared to the model objects.

At 3108, the system may determine a manufacture of the object has issued an alert, warning, or recall associated with the object. For example, the system may detect identify an object, such as a space heater, within the image data and/or 3D model. The system may also determine that the space heater has a recall due to potential fire hazards. The system may then insert an annotation visible to a user viewing the 3D model warning the user as to the recall and fire hazard.

At 3110, the system may generate an annotation associated with the object within the 3D model. For example, the annotation may be displayed to the user as the user traverses the 3D environment. In some cases, as the system is able to monitor the item for recalls and to provide information related to the recalls to the user via annotations within a 3D virtual representation of the physical environment.

Figure 32:
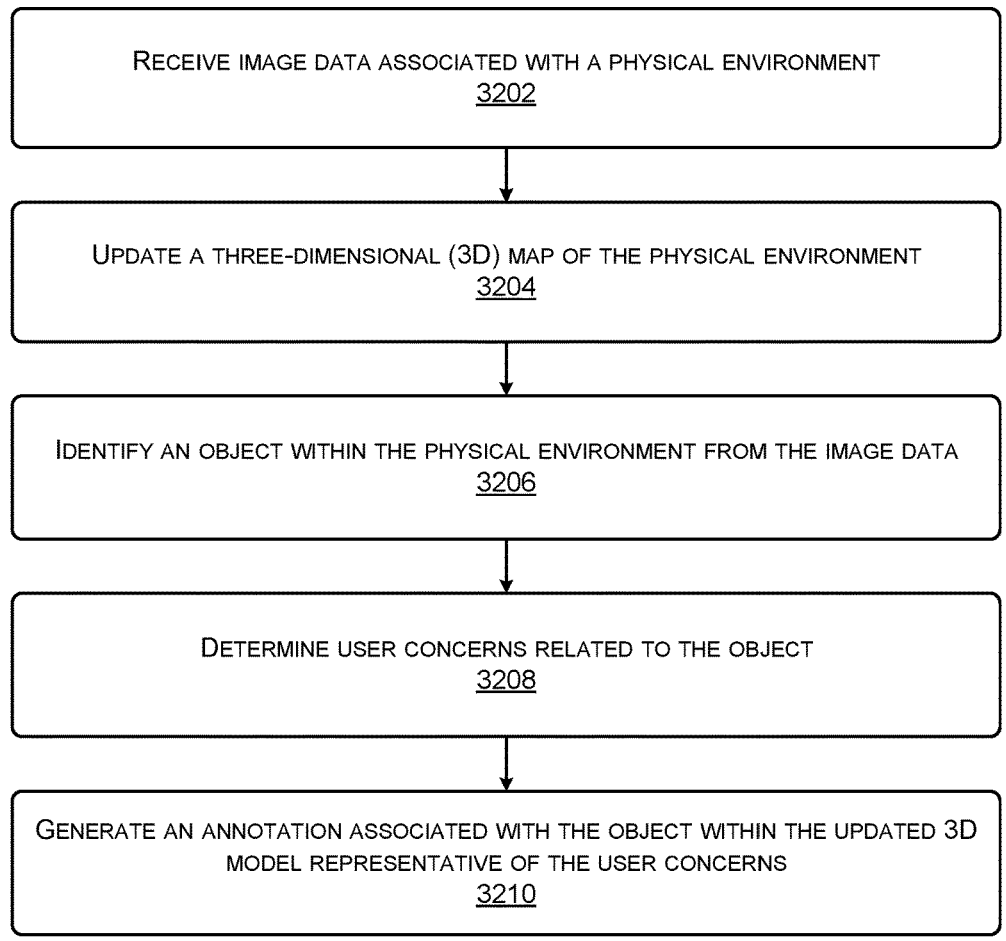
FIG. 32 illustrates another example process for providing alerts related to objects in a physical environment via a 3D virtual environment according to some implementations.

FIG. 32 illustrates another example process for providing alerts related to objects in a physical environment via a 3D virtual environment according to some implementations. In some cases, the system may detect or identify reviews or customer comments and concerns related to products identified within the physical environment. For example, the system may aggerate reviews of products from third-party sites or collect user generated annotations within the system.

At 3202, the spatial interaction system may receive image data associated with a physical environment. For example, the input image data may include high dynamic range data, depth data, still images, or video data captured as the user moves throughout the physical environment. In some cases, the image data may be newly captured while in other cases the image data may be stored or already incorporated into a 3D model.

At 3204, the system may generate a 3D model of the physical environment. In some cases, the image data may be related to an existing 3D model or mesh while in other cases the image data may be used to generate a new model of a physical environment unknown to the system, as discussed above. For instance, the system may generate a plurality of viewpoints and/or combine multiple sub-models to form a larger 3D model of a larger physical environment.

At 3206, the spatial interaction system may identify objects within the physical environment form the 3D model and/or the image data. In some cases, the 3D model may include one or more object model of objects or items physically present in the environment. For example, the system may detect and identify various objects using one or more databases including models of known objects and the image data received. In some cases, the system may identify objects that have changed, such as become broken, damage, or moved. In some cases, the system may identify the object by detecting a bar code, other code, serial number, or other identifier on the object. In other cases, the object may be identified based on its physical characteristics as compared to the model objects.

At 3208, the system may determine user concerns related to the object. For example, the system may access reviews of the object available via third party system or sites. In other cases, the system may aggregate annotations within the spatial interaction system that are associated with the object. For example, the system may identify reviews, comments, or posts associated with the object. In one specific example, the system may identify a dishwasher within the physical environment using the 3D model and/or the image data and when identified determine from the object model that owners of the dishwasher complain that the dishwasher begins to leak after approximately two years of use.

In some specific cases, the system may also compare the object with information known or collected about the physical environment. The system may then make suggestions or generate annotations based on the information known about the physical environment. For example, the system may know the thickness of the walls or the materials to the walls of the physical environment and the object may be a wireless device. In this case, the system may generate an annotation notifying the user that the walls of the physical environment are thick or formed from a material that interferes with wireless signals and, therefore, should select a different device. In a related case, the object may be a router and the system may determine from the reviews or information related to the object, that the object fails to function in home with walls thicker than 6 inches. The system may also determine the thickness of the walls in the physical environment to be 12 inches and therefore provide an annotation alerting the user that the device is not suitable for the physical environment.

At 3210, the system may generate an annotation associated with the object within the 3D model. For example, the annotation may be displayed to the user as the user traverses the 3D environment. In this example, the system may present via an annotation within a 3D virtual representation an alert that based on owner comments, the user may desires to replace the dishwasher prior to two years of use to preventing leaking an floor damage.

Figure 33:
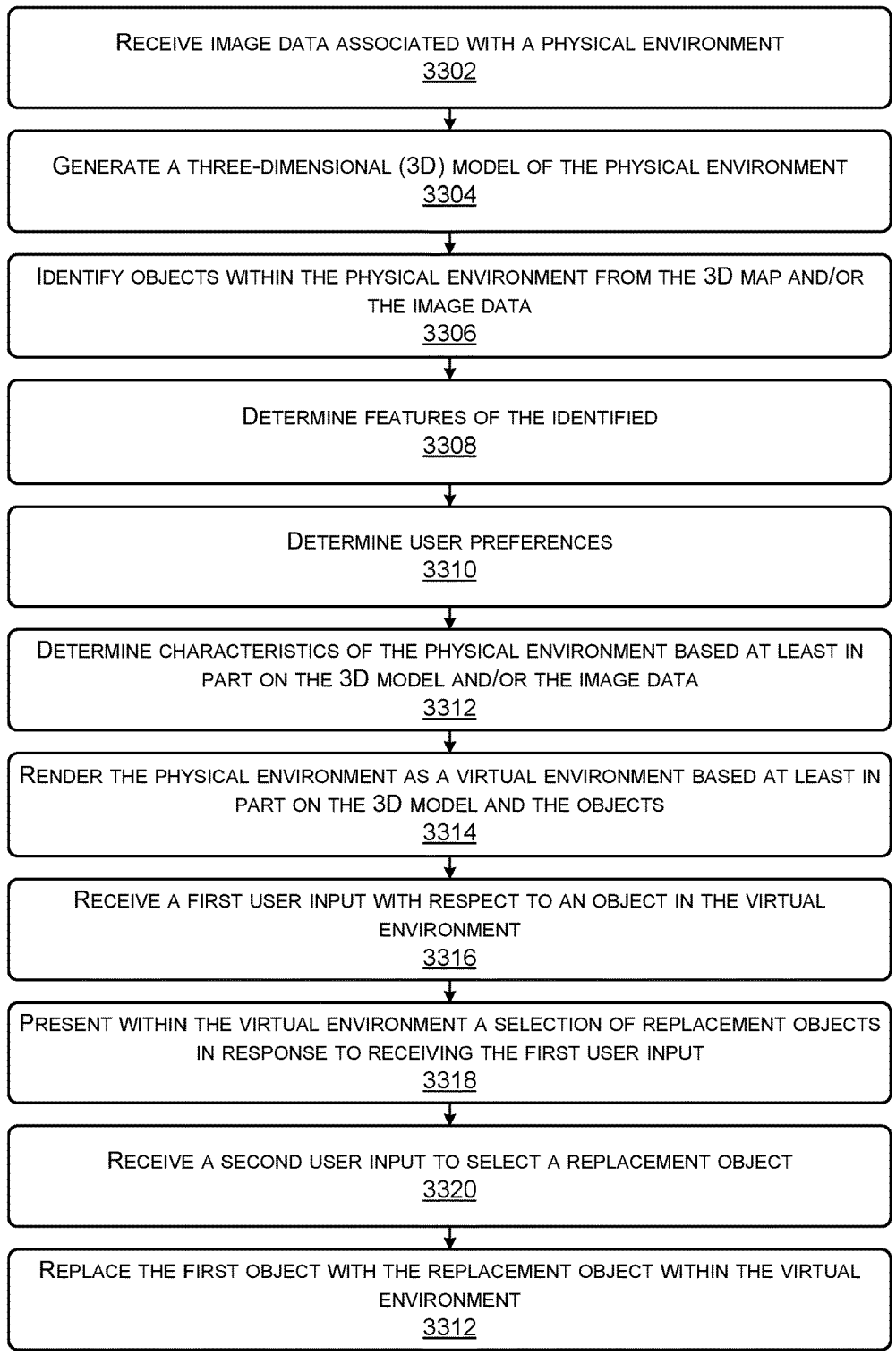
FIG. 33 illustrates an example process for suggesting recommended purchases via a 3D virtual environment according to some implementations.

FIG. 33 illustrates an example process 3300 for suggesting recommended purchases via a 3D virtual environment according to some implementations. In some cases, the system may allow the user to enter or select the objects to be replaced and the system may generate a recommendation. For example, within the 3D virtual environment, the user may select a lamp within the virtual representation of the physical environment. In response to the selection the system may provide the user with one or more replacement lamps. The system may select the replacement lamp based on the characteristics of the table (e.g., surface area, size, height, stain or color, texture, etc.) the lamp is placed on, characteristics of the replacement lamp (e.g., size, height, wattage, colors, textures, etc.), characteristic of the physical environment (e.g., paint color, wall paper, height, volume, area of the physical environment, etc.), and/or characteristic of other objects (e.g., pairings, colors, arrangement or placement, occlusion effects, etc.) in the physical environment. In some cases, the replacement objects may be alternative to the lamp.

At 3302, the spatial interaction system may receive image data associated with a physical environment. For example, the input image data may include high dynamic range data or video data captured as the user moves throughout the physical environment.

At 3304, the system may generate a 3D model of the physical environment. In some cases, the image data may be related to an existing 3D model or mesh while in other cases the image data may be used to generate a new model of a physical environment unknown to the system, as discussed above. For instance, the system may generate a plurality of viewpoints and/or combine multiple sub-models to form a larger 3D model of a larger physical environment.

At 3306, the spatial interaction system may identify objects within the physical environment form the 3D model and/or the image data. In some cases, the 3D model may include one or more object model of objects or items physically present in the environment. For example, the system may detect and identify various objects using one or more databases including models of known objects and the image data received. In some cases, the system may identify objects that have been removed or moved within the physical environment from the image data and cause a corresponding update to the 3D model.

At 3310, the system may determine user preferences. For example, the system may determine form the image data or the 3D model the ascetic tastes or preferences of the user based on analyzing the image data associated with furniture, artwork, clothing, or other objects currently or previously present in a physical environment. In some cases, the user preferences may be obtained as user inputs, from social media or other accounts associated with the user and accessible to the spatial interaction system, or via access to purchase history via other third-party systems. In another example, the system may determine a price range or quality range associated with the user. For example, the system may detect tags, designer items, models, etc. associated with objects in the physical environment by analyzing the received image data. Thus, the system may be able to recommend items within the user's price range or quality standards and/or recommend upgraded items.

At 3310, the system may determine features of the identified objects. For example, the system may determine any damage, issues, manufactures or customer comments/notification related to the objects, age, capabilities, colors, textures, patterns, among other features from the image data and/or from publicly accessible information, such as blogs, websites, datastore, etc.

At 3312, the system may determine characteristics of the physical environment based at least in part on the 3D model and/or the image data. For example, the system may derive textures, patterns, colors, geometries, square footage, lighting and occlusion effects, damage, age, level of upkeep, among other characteristics of the physical environment.

At 3314, the system may render the physical environment as a virtual environment based at least in part no the 3D model and the objects. For example, the system may generate a walkthrough having viewpoints render from the perspective of the image data. In other cases, the system may generate a 3D environment that is traversable in a free form manner.

At 3316, the system may receive a first user input with respect to an object in the virtual environment. For example, the user may select or otherwise indicate, within the virtual environment, that the user desires to replace the selected object, such as the lamp discussed above.

At 3318, the system may present within the virtual environment a selection of replacement objects in repose to receiving the first user input. For example, the system may select the replacement objects based on the features of the current object, features of the selected replacement objects, features of other objects in the environment, and/or known user preferences.

At 3320, the spatial interaction system may receive a second user input to select a replacement object. For example, the user may select one of the presented replacement objects.

At 3322, the system may replace the object with the selected replacement object within the virtual environment. For example, the system may render the replacement object using the high dynamic range data, high dynamic range textures, color characteristics, lighting characteristics, and occlusion characteristics associated with the 3D model of the physical environment and/or of the object captured in a different physical environment. In some particular implementations, the high dynamic range data, high dynamic range textures, color characteristics, lighting characteristics, and occlusion characteristics utilized to render the object may be based on a particular date and time associated with the received images or as selected by the user. Thus, the system may render the object as if the object was present in the physical environment at the time the images were captured.

In one specific example, the spatial interaction system may render the replacement object from a perspective associated with each viewpoint of q walkthrough with the correct coloring, lighting, and occlusion effects that would be experienced if the selected object were captured in the image data from the perspective of the camera. Additionally, it should be understood, that by utilizing a walkthrough formed from images captured by the user, the system may render replacement objects as well as background information in a manner that provides a realistic representation of the virtual replacement object within the physical environment as the background information (e.g., the non-rendered objects or everything other than the replacement object in this example) may be supplied in a photorealistic quality.

FIG. 34 illustrates an example object model 3400 of a spatial interaction system according to some implementations. The system may maintain a store of objects that are available for purchase or may be associated with one or more virtual/physical environments. In these cases, the system may be configured to store features of the objects that allow the system to arrange, place, and determine desirability of the object with respect to one or more physical environments having a corresponding 3D model.

In the illustrated example, the system may store the object model 3400 of a chair 3402 on one or more electronic devices 3406. The object model 3400 may include surfaces 3406. For instance, the surface 3406 may include textures, colors, angles, or other data related to the surface of the object. The object models 34000 may also include area/geometries 3408. For example, the area/geometries 3408 may include size, shape, spacing requirements (e.g., required distance from other objects), etc. In one specific example, the area/geometries 3408 of the chair 3402 may include the space around the chair 3402 to allow the chair 3402 to be used comfortably by a seated individual. The object model 3400 may also include data on object pairing 3410. For instance, the pairing 3410 may include list of colors, textures, objects that may match or look astatically pleasing with the chair 3402. In other cases, the pairing 3410 may include objects that enhance or synergize with the features of the chair 3402 such as a table.

The object model 3400 may also include orientation 3412 or the direction the object should face with respect to other object, an indication of the front, back, sides, etc., and proper placement based on design ascetics. In some case, the object model 3400 may include placement restrictions 3414, such as placement of a microwave next to a plastic vase. The object model may also include demographic information 3416 such as locations (e.g., states, climates, countries, etc.) that typically utilize the object, sex of purchasers, age of purchasers, targeted audience, etc. The model 3400 may also include seller and manufacture information 3418. The seller and manufacture information 3418 may include who retails the object, who manufactures the object, the cost of the object at each retailer or via the manufacture, among other information about the sellers and manufactures. In some cases, the object model 3400 may also include reviews and sales information, such as customer reviews, ratings, customer feedback, number sold, average price, etc.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
one or more processors;
non-transitory computer-readable media storing computer-executable instructions, which when executed by the one or more processors cause the one or more processors to perform operations comprising:
determining physical characteristics of a physical environment from a three dimensional (3D) virtual model of the physical environment;
identifying one or more objects within the physical environment based at least in part on the 3D virtual model and one or more stored object models;
determining features of individual ones of the one or more objects;
determining user preferences based at least in part on the 3D virtual model;
identifying a recommended object for the physical environment based at least in part on the characteristics of the physical environment, the features of the individual one or more objects, and the user preferences;
selecting a location for the recommended object within the 3D virtual model;
rendering the recommended object within the 3D virtual model at the location;
annotating the 3D virtual model at the location, the annotation including information related to the recommended object and a purchase option;
receiving a user selection of the purchase option; and
placing an order for the recommended object on behalf of the user.

2. The system as recited in claim 1, wherein the physical characteristics of the physical environment include geometrics of the physical environment, materials associated with the physical environment, lighting conditions, proximity to objects, stylistic similarity to other objects, or stylistic similarity to the physical environment.

3. The system as recited in claim 1, wherein the operations further comprise:
obtaining a plurality of first images of a physical environment; and
generating the 3D virtual model based at least partly on the plurality of first images, prior to determining the physical characteristics of the physical environment.

4. The system as recited in claim 1, wherein the operations further comprises displaying the 3D virtual model to the user as a 3D virtual representation of the physical environment.

5. The system as recited in claim 1, wherein identifying a recommended object includes determining the recommended object fits within the available geometries of the physical environment.

6. The system as recited in claim 1, wherein identifying the recommended object and selecting the location is based at least in part on at least one of:
- one or more stylistic similarities between the recommended object and the one or more objects;
- climate or environmental related data;
- geolocation of the physical environment;
- age of the one or more objects;
- age of the physical environment;
- physical properties of the recommended object;
- physical properties of the one or more objects;
- proximity between surfaces in the physical environment, the one or more objects, and the location; or
- physical properties of the physical environment.

7. The system as recited in claim 1, wherein selecting a location includes identifying a first object of the one or more objects to replace with the recommended object and setting the location as the location of the first object.

8. The system as recited in claim 1, wherein:
- identifying a recommended object includes receiving an object input from a service provider within the 3D model; and
- selecting a location includes receiving a location input from the service provider.

9. A non-transitory computer-readable medium storing computer instructions which when executed by one or more processors, cause the one or more processors to perform operations comprising:
- receiving image data associated with a physical environment;
- generating a 3D virtual model of the physical environment;
- communicatively coupling a user of a 3D virtual model with a service provider, the communicatively coupling allowing both the user and the service provider to interact with the 3D virtual model and each other within the 3D virtual model;
- receiving an input to alter at least one of an object or a characteristic of a surface within the 3D model from the service provider; and
- re-rendering the 3D virtual model based at least in part on the input.

10. The non-transitory computer-readable medium as recited in claim 9, storing additional computer instructions which when executed by the one or more processors, cause the one or more processors to perform operations comprising:
- receiving a user request for a service via the 3D virtual model;
- generating a list of service providers based at least in part on the service and data known about the user;
- presenting the list of service providers to the user via the 3D virtual model;
- receiving a selection of a particular service provider included on the list of service provider from the user via the 3D virtual model; and
- wherein communicatively coupling the user of a 3D virtual model with the service provider includes communicatively coupling the user of a 3D virtual model with particular service provider.

11. The non-transitory computer-readable medium as recited in claim 9, storing additional computer instructions which when executed by the one or more processors, cause the one or more processors to perform operations comprising placing an order behalf of the user with a third-party system, the order related to at least one of the object or the surface.

12. The non-transitory computer-readable medium as recited in claim 9, storing additional computer instructions which when executed by the one or more processors, cause the one or more processors to perform operations comprising providing at least one statistic or metric related to the physical environment associated with the 3D virtual model to the service provider, prior to receiving the input.

13. The non-transitory computer-readable medium as recited in claim 9, storing additional computer instructions which when executed by the one or more processors, cause the one or more processors to perform operations comprising at least one of:
- estimating changes to a usage metric about the physical environment, caused by the input to 3D virtual model over time; or
- re-rendering effects of the changes within the 3D virtual model to illustrate the effects on the physical environment.

14. The non-transitory computer-readable medium as recited in claim 9, storing additional computer instructions which when executed by the one or more processors, cause the one or more processors to perform operations comprising receiving a second input to alter a object, set of objects, or theme of the physical environment; and re-rendering the 3D virtual model to include those changes while the 3D virtual model is being viewed by the user and the service provider.

15. The non-transitory computer-readable medium as recited in claim 9, storing additional computer instructions which when executed by the one or more processors, cause the one or more processors to perform operations comprising highlighting the object or the characteristic of the surface to bring the object or the characteristic of the surface to the attention of the service provider, the highlighting indicating damage to the object or the surface.

16. A non-transitory computer-readable medium storing computer instructions which when executed by one or more processors, cause the one or more processors to perform operations comprising:
- communicatively coupling a user of the 3D virtual model with a service provider, the communicatively coupling allowing both the user and the service provider to interact with the 3D virtual model and each other within the 3D virtual model;
- providing user data and physical environment data to the service provider via the 3D virtual model;
- receiving a recommendation related to an object within the physical environment from the service provider;
- re-rendering the object within the 3D virtual model based at least in part on the recommendation; and
- placing an order based on the recommendation related to the object on behalf of the user with a third-party system.

17. The non-transitory computer-readable medium as recited in claim 16, storing additional computer instructions which when executed by the one or more processors, cause the one or more processors to perform operations comprising:
- determining physical characteristics of a physical environment from a three dimensional (3D) virtual model of the physical environment;
- identifying one or more objects within the physical environment based at least in part on the 3D virtual model and one or more stored object models;
- determining features of individual ones of the one or more objects; and
- wherein the recommendation is related to the features.

18. The non-transitory computer-readable medium as recited in claim 16, storing additional computer instructions which when executed by the one or more processors, cause the one or more processors to perform operations comprising:
  selecting the service provider to communicatively couple to the user via the 3D virtual model based at least in part on user preferences associated with the user.

19. The non-transitory computer-readable medium as recited in claim 18, storing additional computer instructions which when executed by the one or more processors, cause the one or more processors to perform operations comprising:
  receiving selecting of a location for the recommended object within the 3D virtual model; and
  wherein re-rendering the object within the 3D virtual model based at least in part on the recommendation includes rendering the recommended object at the location.

20. The non-transitory computer-readable medium as recited in claim 19, storing additional computer instructions which when executed by the one or more processors, cause the one or more processors to perform operations comprising:
  receiving an input from the service provider related to the object; and
  annotating the 3D virtual model at the location, the annotation including information related to the input from the service provider.

* * * * *